United States Patent
Nair

(10) Patent No.: US 11,120,328 B1
(45) Date of Patent: Sep. 14, 2021

(54) SYSTEMS AND METHODS FOR REDUCING POWER CONSUMPTION OF CONVOLUTION OPERATIONS FOR ARTIFICIAL NEURAL NETWORKS

(71) Applicant: Facebook, Inc., Menlo Park, CA (US)

(72) Inventor: Krishnakumar Narayanan Nair, Newark, CA (US)

(73) Assignee: Facebook, Inc., Menlo Park, CA (US)

( * ) Notice: Subject to any disclaimer, the term of this patent is extended or adjusted under 35 U.S.C. 154(b) by 259 days.

(21) Appl. No.: 16/354,665

(22) Filed: Mar. 15, 2019

(51) Int. Cl.
 *G06N 3/04* (2006.01)
 *G06N 3/08* (2006.01)
 *G06N 3/10* (2006.01)
 *G06F 17/16* (2006.01)

(52) U.S. Cl.
 CPC .......... *G06N 3/04* (2013.01); *G06F 17/16* (2013.01); *G06N 3/08* (2013.01); *G06N 3/10* (2013.01)

(58) Field of Classification Search
 CPC . G06F 17/16; G06N 3/08; G06N 3/10; G06N 3/04
 USPC .......................................................... 708/308
 See application file for complete search history.

(56) References Cited

U.S. PATENT DOCUMENTS

| 10,528,864 | B2 * | 1/2020 | Dally | G06N 3/04 |
|---|---|---|---|---|
| 2018/0101750 | A1 * | 4/2018 | Soldevila | G06K 9/4628 |
| 2018/0129937 | A1 * | 5/2018 | Bradbury | G06N 3/04 |
| 2019/0087713 | A1 * | 3/2019 | Lamb | G06N 3/0454 |
| 2020/0074269 | A1 * | 3/2020 | Trygg | G06N 7/00 |
| 2020/0210520 | A1 * | 7/2020 | Akyamac | G06F 40/177 |

OTHER PUBLICATIONS

Hadjis et al., "Caffe con Troll: Shallow Ideas to Speed Up Deep Learning", Proc Fourth Workshop Data Anal Scale Danac, May 26, 2015, pp. 1-19.
Loukadakis et al., "Accelerating Deep Neural Networks on Low Power Heterogeneous Architectures", URL: https://www.researchgate.net/publication/327070011, Jan. 24, 2018, 14 pages.
Chen et al., "Eyeriss: A Spatial Architecture for Energy-Efficient Dataflow for Convolutional Neural Networks", ACM/IEEE 43rd Annual International Symposium on Computer Architecture, Jun. 18-22, 2016, pp. 367-379.
Warden, Pete, "Why GEMM is at the heart of deep learning", URL: https://petewarden.com/2015/04/20/why-gemm-is-at-the-heart-of-deep-learning/, Apr. 20, 2015, 12 pages.

* cited by examiner

*Primary Examiner* — Tan V Mai
(74) *Attorney, Agent, or Firm* — FisherBroyles, LLP

(57) ABSTRACT

A computer-implemented method may include maintaining, within a local memory device (LMD) in a hardware accelerator (1) a filter matrix that may include a set of filter vectors corresponding to a filter location in each of a set of filters of a convolutional layer of an artificial neural network, and (2) an activation matrix that may include a primary and a secondary set of activation vectors, each activation vector included in an activation volume. The method may also include (1) directing a matrix multiplication unit (MMU) in the hardware accelerator to execute a matrix multiplication operation (MMO) using the filter matrix and the activation matrix, (2) replacing (i) the filter matrix with an additional filter matrix, and (ii) the secondary set of activation vectors with an additional set of activation vectors, and (3) directing the MMU to execute an additional MMO using the additional filter matrix and the activation matrix.

20 Claims, 27 Drawing Sheets

*FIG. 9*

SYSTEMS AND METHODS FOR REDUCING POWER CONSUMPTION OF CONVOLUTION OPERATIONS FOR ARTIFICIAL NEURAL NETWORKS

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIGS. 6-12 illustrate determining, via an MMU included in a hardware accelerator, a set of output activation values for a convolutional layer of an artificial neural network using a set of filter matrices, an activation volume, and a stride of 1 as described herein.

Figure 1:
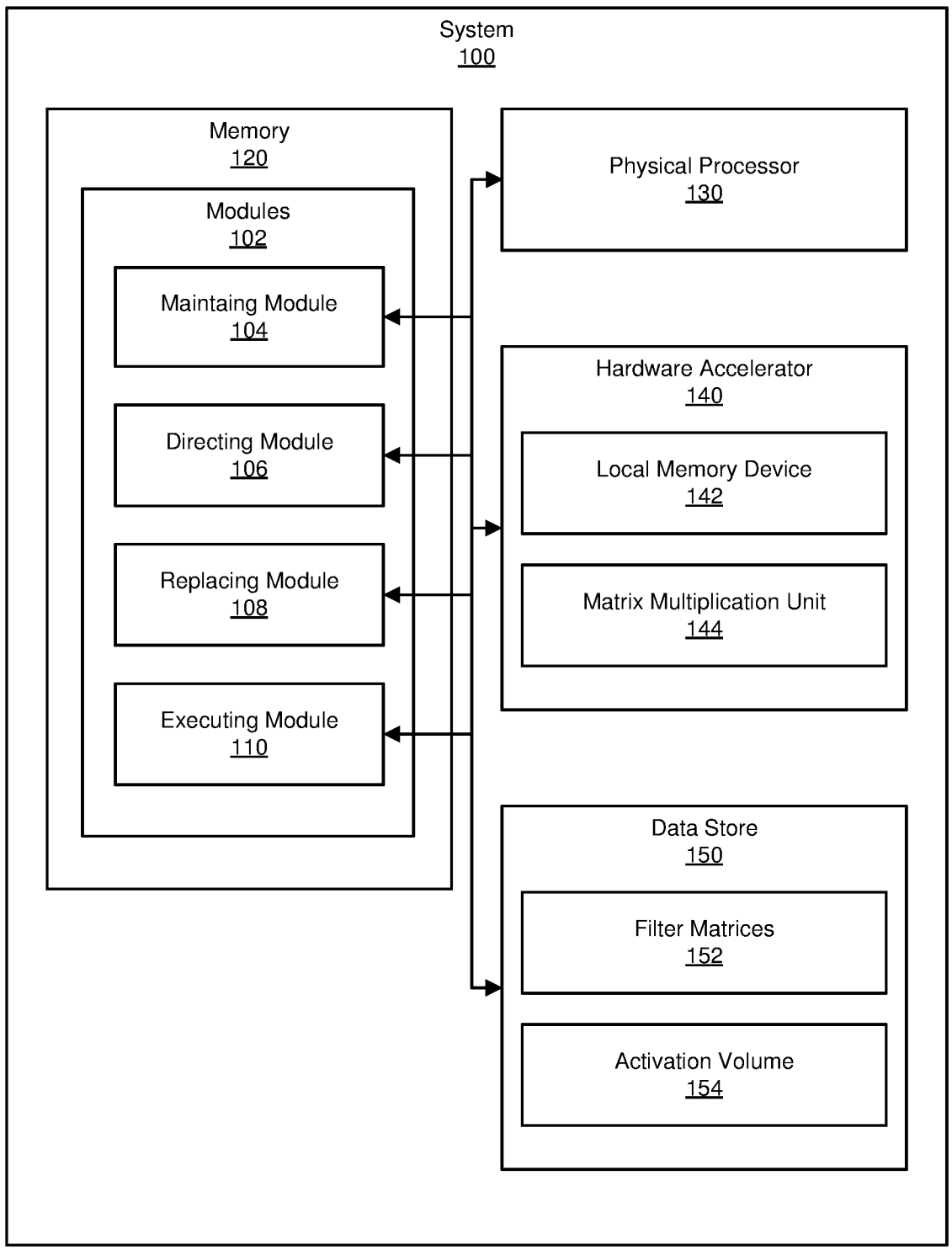
FIG. 1 is a block diagram of an example system for reducing power consumption of convolution operations for artificial neural networks.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Artificial intelligence (AI) may enable computers to perform various complicated tasks, such as those related to cognitive functions that are typically associated with humans. These functions often involve making predictions or assessments based on real-world inputs. Several approaches to AI are prevalent, including machine learning techniques. Machine learning systems, in at least some examples, may be trained using known data sets rather than employing a specific predetermined algorithm to perform a task.

One machine learning model, referred to as an artificial neural network (ANN), may be inspired by the interconnections of neurons in a biological brain. Typically, ANNs may include multiple computational nodes arranged in interconnected layers, with each node modeling a neuron that may receive one or more inputs, process the inputs, and pass an output to the next layer, with the final layer producing a desired output. One such layer that may be included in an ANN may be a convolutional layer. A convolutional layer may apply a convolution operation to an input and may pass the result to another layer.

Unfortunately, traditional approaches to performing such convolution operations may require and/or consume high amounts of computing and/or power resources. For example, traditional approaches may require and/or utilize components and/or computing techniques that may consume a high amount of power resources. Additionally, such power-hungry hardware components and/or computing techniques may complicate designs of systems that may utilize such convolutional layers. Hence, the present application identifies and addresses a need for new systems and methods for reducing power consumption of convolution operations for ANNs.

The present disclosure is generally directed to systems and methods for reducing power consumption of convolution operations for ANNs. As will be explained in greater detail below, an example embodiment may include a hardware accelerator that may include a local memory device (LMD) and an MMU. The example embodiment may maintain a filter matrix within the LMD. The filter matrix may include a set of filter vectors, each corresponding to a filter location included in each filter included in a set of filters associated with a convolutional layer of an ANN.

The example embodiment may also maintain an activation matrix within the LMD. In some examples, the activation matrix may include (1) a primary set of activation vectors included in an activation volume, and (2) a secondary set of activation vectors included in the activation volume. Each activation vector may correspond to a location within an activation volume, such as a pixel within an image, and may include values corresponding to channels of the activation volume.

The example embodiment may direct the MMU to execute an MMO using the filter matrix (e.g., as a multiplier matrix) and the activation matrix (e.g., as a multiplicand matrix). The example embodiment may then replace (e.g., within the LMD), the filter matrix with an additional filter matrix that may include an additional set of filter vectors corresponding to an additional filter location included in each filter included in the set of filters. The example embodiment may further replace (e.g., within the LMD) the secondary set of activation vectors with an additional set of activation vectors included in the activation volume. The example embodiment may then direct the MMU to execute an additional MMO using the additional filter matrix and the activation matrix, such that the MMU reuses the primary set of activation vectors during the additional MMO. In some examples, the example embodiment may further determine, based on a primary result matrix that may include a result of the MMO and a secondary result matrix that may include a result of the additional MMO, a set of output activation values for the convolutional layer of the ANN. Additionally, some example embodiments may also employ outer product multiplication operations in order to realize additional reuse.

As mentioned above, traditional and/or conventional options for performing convolution operations may have many drawbacks. For example, such conventional and/or traditional options for performing convolution operations may involve rearranging image blocks into columns, such as via one or more "im2col" operations. This may require steering at an element-wise level, necessitating elaborate uses of multiplexers ("muxes") that may consume power and complicate designs of such systems. Additionally, large sizes of rearranged image blocks and/or columns may lead to large data transfers between system components (e.g., between a processor and a memory device), thereby further increasing power consumption. Furthermore, such conventional and/or traditional systems may fail to take advantage of spatial reuse that may be available for convolution operations.

As will be made apparent by the following description, the systems and methods described herein may provide many benefits over conventional methods for performing convolution operations for ANNs. For example, by vastly increasing reuse of values stored in fast, power-efficient memory local to a hardware accelerator, the systems and methods described herein may provide significant power savings over conventional solutions for performing convolution operations that may require a higher number of power-consuming data access and/or transfer operations.

Additionally, the systems and methods described herein may translate strides of convolution operations into simple line reads, thereby obviating a requirement for one or more complicated hardware and/or software muxing schemes that may be employed by conventional solutions for performing convolutions. This may enable both simplified memory organization schemes as well as reduced power consumption while performing convolution operations.

Furthermore, depending upon a size of an MMU included in a hardware accelerator, the systems and methods described herein may efficiently perform convolutions involving multiple filters in parallel via the hardware accelerator rather than in sequence and/or in parallel via multiple processors, which may result in more efficient (e.g., in terms of power consumption, execution time, processor usage, memory usage, etc.) computation of convolutions of multiple filters than conventional systems and methods for performing convolutions of multiple filters.

The following will provide, with reference to FIGS. 1-2 and 4-26, detailed descriptions of systems for reducing power consumption of convolution operations for ANNs. Detailed descriptions of corresponding computer-implemented methods will also be provided in connection with FIG. 3.

FIG. 1 is a block diagram of an example system 100 for reducing power consumption of convolution operations for artificial neural networks. As illustrated in this figure, example system 100 may include one or more modules 102 for performing one or more tasks. As will be explained in greater detail below, modules 102 may include a maintaining module 104 that may maintain, within an LMD included in a hardware accelerator, a filter matrix that may include a set of filter vectors. Each filter vector included in the set of filter vectors may correspond to a filter location included in each filter included in a set of filters associated with a convolutional layer of an artificial neural network. In some examples, maintaining module 104 may also maintain, within the LMD, an activation matrix that may include (1) a primary set of activation vectors included in an activation volume, and (2) a secondary set of activation vectors included in the activation volume.

As further shown in FIG. 1, example system 100 may additionally include a directing module 106 that may direct an MMU included in the hardware accelerator to execute an MMO using the filter matrix (e.g., as a multiplier matrix) and the activation matrix (e.g., as a multiplicand matrix).

Example system 100 may also include a replacing module 108 that may replace (e.g., within the LMD), the filter matrix with an additional filter matrix that may include an additional set of filter vectors corresponding to an additional filter location included in each filter included in the set of filters. Additionally, replacing module 108 may replace (e.g., within the LMD) the secondary set of activation vectors with an additional set of activation vectors included in the activation volume.

Furthermore, example system 100 may also include an executing module 110 that may direct the MMU to execute an additional MMO using the additional filter matrix as the multiplier matrix and the activation matrix as the multiplicand matrix, such that the MMU reuses the primary set of activation vectors during the additional MMO. In some examples, executing module 110 may further determine, based on a primary result matrix that may include a result of the MMO and a secondary result matrix that may include a result of the additional MMO, a set of output activation values for the convolutional layer of the ANN.

As further illustrated in FIG. 1, example system 100 may also include one or more memory devices, such as memory 120. Memory 120 generally represents any type or form of volatile or non-volatile storage device or medium capable of storing data and/or computer-readable instructions. In one example, memory 120 may store, load, and/or maintain one or more of modules 102. Examples of memory 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As further illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 120. Additionally or alternatively, physical processor 130 may execute one or more of modules 102 to facilitate reducing power consumption of convolution operations for artificial neural networks. Examples of physical processor 130 include, without limitation, microprocessors, microcontrollers, central processing units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As also shown in FIG. 1, example system 100 may also include a hardware accelerator 140. In some examples, a "hardware accelerator" may include a hardware component or device that performs one or more specialized computing tasks more efficiently, in hardware, than the computing task would be performed in software by a general-purpose central processing unit (i.e., a computing chip that is structured to execute a range of different programs as software). In some examples, "hardware acceleration" may refer to the execution of a computing task in application-specific hardware circuitry that occurs in the absence of a software module intermediary or other layer of abstraction, such that the performance of the application is more efficient than when executed otherwise.

In some examples, as shown in FIG. 1, hardware accelerator 140 may include an LMD 142. LMD 142 generally represents any type or form of volatile or non-volatile storage device or medium capable of storing data and/or computer-readable instructions and that may be included in a hardware accelerator. In one example, LMD 142 may store, load, receive, and/or maintain one or more matrices that may be local to (e.g., communicatively coupled via a high-speed, low-power, and/or low-latency bus), accessed, and/or utilized by one or more MMUs included in hardware accelerator 140. Examples of LMD 142 may include, without limitation, one or more RAM devices included in a hardware accelerator, one or more physical memory devices organized in one or more cache levels, a general cache, an instruction cache, variations or combinations of one or more of the same, and/or any other suitable storage memory device local to an MMU included in a hardware accelerator. In some examples, it may be more efficient (e.g., in terms of power usage, processing resource usage, etc.), for one or more components of system 100 and/or hardware accelerator 142 to access data and/or computer-readable instructions from LMD 142 than another data storage device that may not be included in hardware accelerator 140 (e.g., memory 120, data store 150, etc.).

In one example, hardware accelerator 140 may include application-specific hardware circuitry designed to perform a specific computing task. For example, as shown in FIG. 1, hardware accelerator 140 may include an MMU 144 (shown in FIGS. 1 and 2 as "matrix multiplication unit 144"). MMU 144 may include any hardware component designed to execute one or more MMOs. For example, as will be described in greater detail below, MMU 144 may be designed to, when provided with a multiplier matrix and a multiplicand matrix, execute an MMO using the multiplier matrix and the multiplicand matrix. Examples of MMUs may include, without limitation, programmable matrix-multiply-and-accumulate units, microprocessors that implement MMOs, FPGAs that implement MMOs, ASICs that implement MMOs, portions of one or more of the same, variations or combinations of one or more of the same, and/or or any other suitable hardware designed and/or configured to perform MMOs. In some examples, an MMO may include a generalized matrix multiplication (GEMM) operation.

In one or more examples, a multiplier matrix may be in a form of m×k and a multiplicand matrix may be in a form of n×k, where m may represent a number of rows in the multiplier matrix, k may represent a number of columns in the multiplier matrix and a number of rows in the multiplicand matrix, and n may represent a number of columns in the multiplicand matrix. In some examples, this form may be referred to as m×k×n (e.g., 8×8×8, 16×16×16, 8×16×8, and so forth).

In some examples, MMU 144 may be designed to efficiently execute MMOs using multiplier and/or multiplicand matrices having predetermined and/or specified dimensions. For example, as will be described in greater detail below, MMU 144 may be designed and/or configured to efficiently execute MMOs using multiplier and multiplicand matrices with combined dimensions, in accordance with an m×k×n form as described above, of 8×8×8, 16×16×16, 32×32×32, 64×64×64, 8×16×8, 16×32×16, and so forth.

As also shown in FIG. 1, example system 100 may also include one or more data stores, such as data store 150, that may receive, store, and/or maintain data. Data store 150 may represent portions of a single data store or computing device or a plurality of data stores or computing devices. In some embodiments, data store 150 may be a logical container for data and may be implemented in various forms (e.g., a database, a file, a file system, a data structure, etc.). Examples of data store 150 may include, without limitation, files, file systems, data stores, databases, and/or database management systems such as an operational data store (ODS), a relational database, a NoSQL database, a NewSQL database, and/or any other suitable organized collection of data.

In at least one example, data store 150 may include (e.g., store, host, access, maintain, etc.) filter matrices 152. As will be explained in greater detail below, in some examples, filter matrices 152 may include information including and/or associated with one or more filters associated with a convolutional layer of an ANN. In some examples, data store 150 may additionally include (e.g., store, host, access, maintain, etc.) an activation volume 154. As will be described in greater detail below, activation volume 154 may include any set of data that may serve as input (e.g., an input volume) to a convolutional layer of an ANN, such as one or more digital images.

Figure 2A:
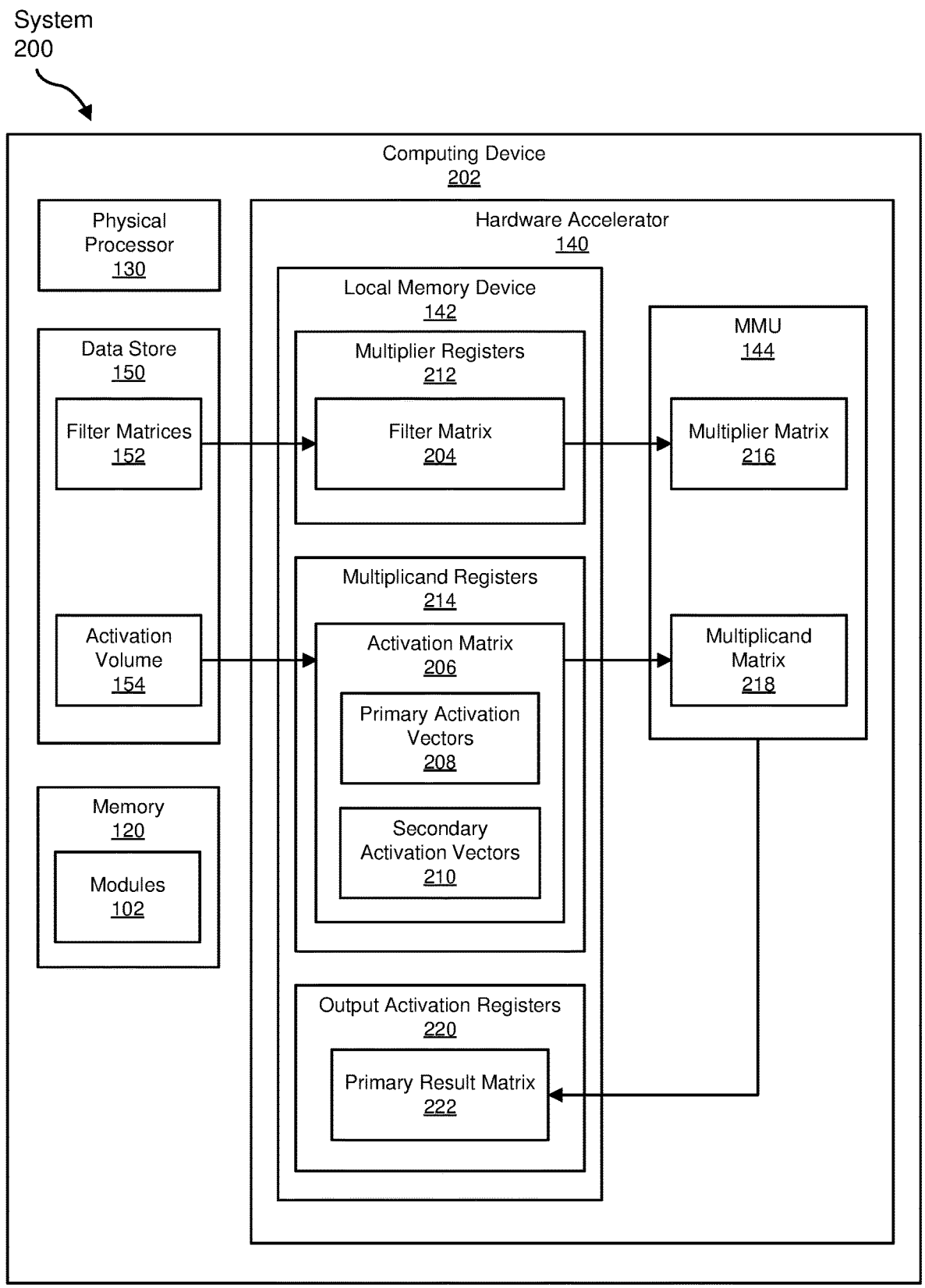
FIGS. 2A-2B are block diagrams of an example implementation of a system for reducing power consumption of convolution operations for artificial neural networks.
Figure 2B:
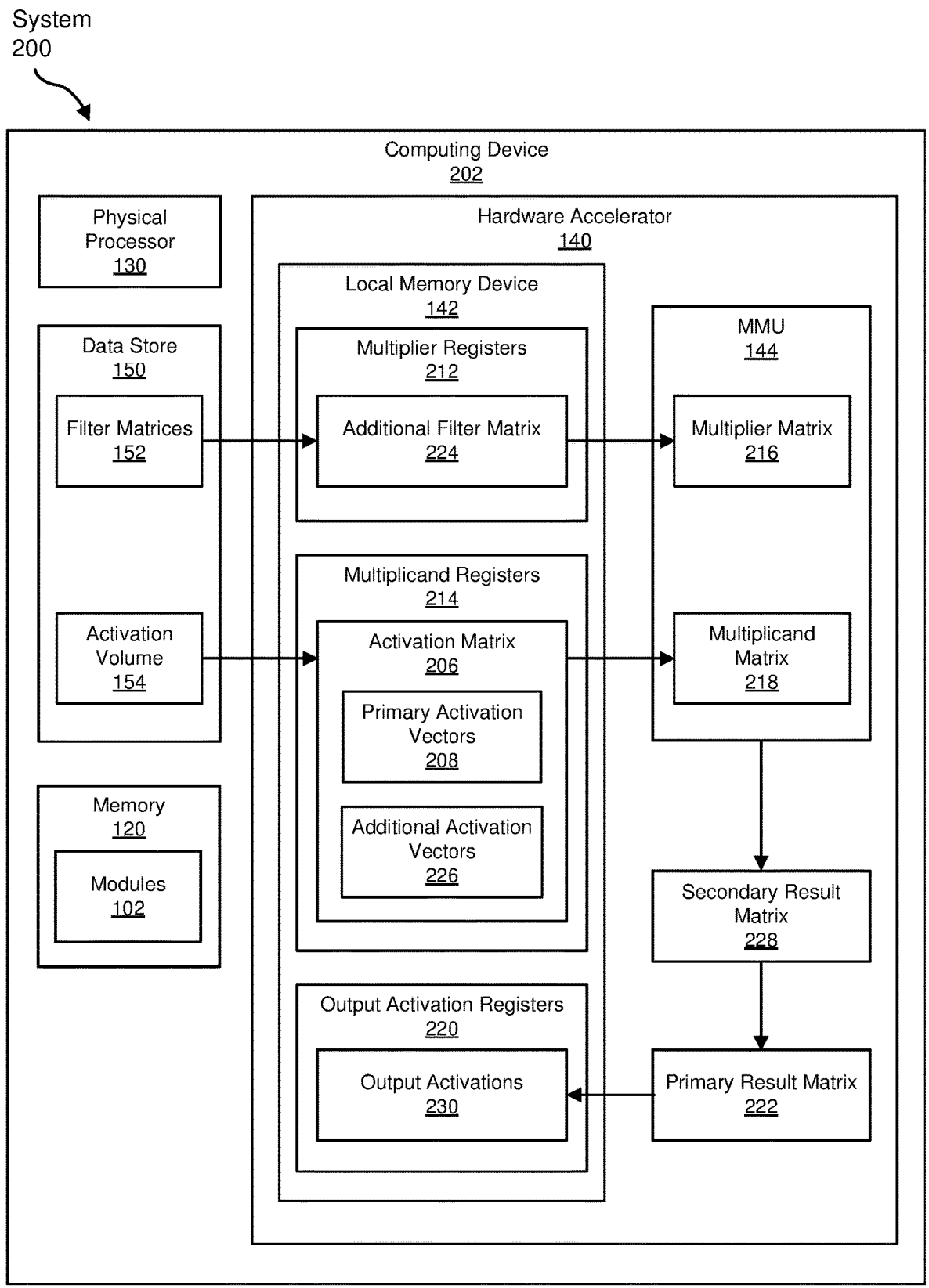

Example system 100 in FIG. 1 may be implemented in a variety of ways. For example, all or a portion of example system 100 may represent portions of an example system 200 ("system 200") in FIGS. 2A and 2B (collectively, FIG. 2). As shown in FIG. 2, system 200 may include a computing device 202. In at least one example, computing device 202 may be programmed with one or more of modules 102.

In at least one embodiment, one or more of modules 102 from FIG. 1, when executed by computing device 202, may enable computing device 202 to perform one or more operations to reduce power consumption of convolution operations as described herein. For example, as will be described in greater detail below, maintaining module 104 may, when executed by computing device 202, cause computing device 202 to maintain, within an LMD (e.g., LMD 142) included in a hardware accelerator (e.g., hardware accelerator 140), a filter matrix (e.g., filter matrix 204). The filter matrix may include a set of filter vectors that may each correspond to a filter location included in each filter included in a set of filters associated with a convolutional layer of an artificial neural network. an activation matrix (e.g., activation matrix 206). In some examples, the activation matrix may include (1) a primary set of activation vectors (e.g., primary activation vectors 208) included in an activation volume (e.g., activation volume 154) inputted into the convolutional layer, and (2) a secondary set of activation vectors (e.g., secondary activation vectors 210) included in the activation volume inputted into the convolutional layer.

In some examples, the LMD may include a set of multiplier registers (e.g., multiplier registers 212) associated with the MMU and a set of multiplicand registers (e.g., multiplicand registers 214). In some examples, maintaining module 104 may maintain the filter matrix within the LMD by retrieving, from a data store (e.g., from filter matrices 152 included in data store 150), the filter matrix to the set of multiplier registers. Maintaining module 104 may further maintain the activation matrix within the LMD by retrieving, from the data store (e.g., from activation volume 154 included in data store 150), the activation matrix to the set of multiplicand registers.

Furthermore, in some examples, directing module 106 may, when executed by computing device 202, cause computing device 202 to direct an MMU (e.g., MMU 144) included in the hardware accelerator to execute an MMO using the filter matrix and the activation matrix. In at least one example, directing module 106 may direct the MMU to execute the MMO using the filter matrix as a multiplier matrix (e.g., multiplier matrix 216) and the activation matrix as a multiplicand matrix (e.g., multiplicand matrix 218).

In some examples, the hardware accelerator may further include a set of output activation registers (e.g., output activation registers 220) associated with the MMU. In at least one example, directing module 106 may generate a primary result matrix (e.g., primary result matrix 222) by directing the MMU to execute the MMO using the filter matrix as a multiplier matrix (e.g., multiplier matrix 216) and the activation matrix as a multiplicand matrix (e.g., multiplicand matrix 218). Directing module 106 may also store the primary result matrix within the set of output activation registers.

In at least one embodiment, replacing module 108 may, when executed by computing device 202, cause computing device 202 to replace (e.g., within the LMD) the filter matrix (e.g., filter matrix 204) with an additional filter matrix (e.g., additional filter matrix 224) corresponding to an additional filter location. In some embodiments, replacing module may also replace (e.g., within the LMD) the secondary set of activation vectors (e.g., secondary activation vectors 210) with an additional set of activation vectors (e.g., additional activation vectors 226) included in the activation volume (e.g., activation volume 154).

Furthermore, executing module 110 may, when executed by computing device 202, cause computing device 202 to direct the MMU to execute an additional MMO using the additional filter matrix and the activation matrix. In some examples, executing module 110 may direct the MMU to execute the additional MMO by directing the MMU to execute the additional MMO using the additional filter matrix (e.g., additional filter matrix 224) as the multiplier matrix (e.g., multiplier matrix 216) and the activation matrix (e.g., activation matrix 206) as the multiplicand matrix (e.g., multiplicand matrix 218).

Additionally, as mentioned above, in some examples, the hardware accelerator (e.g., hardware accelerator 140) may further include the set of output activation registers (e.g., output activation registers 220) associated with the MMU. In at least one example, executing module 110 may direct the MMU to execute the additional MMO using the additional filter matrix (e.g., additional filter matrix 224) and the activation matrix (e.g., activation matrix 206) by producing a secondary result matrix (e.g., secondary result matrix 228). Executing module 110 may produce the secondary result matrix by directing the MMU to execute the additional MMO using the additional filter matrix (e.g., additional filter matrix 224) as the multiplier matrix (e.g., multiplier matrix 216) and the activation matrix as the multiplicand matrix (e.g., multiplicand matrix 218). Directing module 106 may further accumulate the secondary result matrix and the primary result matrix and may store a result of accumulating the secondary result matrix and the primary result matrix within the set of output activation registers (e.g., output activation registers 220).

Moreover, in at least one embodiment, one or more of modules 102 (e.g., maintaining module 104, directing module 106, replacing module 108, executing module 110, etc.) may further determine, based on the result of accumulating the secondary result matrix and the primary result matrix, a set of output activation values (e.g., output activations 230) for the convolutional layer of the ANN.

Computing device 202 generally represents any type or form of computing device capable of reading and/or executing computer-executable instructions and/or hosting executables. Examples of computing device 202 may include, without limitation, application servers, storage servers, database servers, web servers, and/or any other suitable computing device configured to run certain software applications and/or provide various application, storage, and/or database services.

In at least one example, computing device 202 may be a computing device programmed with one or more of modules 102. All or a portion of the functionality of modules 102 may be performed by computing device 202 and/or any other suitable computing system. As will be described in greater detail below, one or more of modules 102 from FIG. 1 may, when executed by at least one processor of computing device 202, may enable computing device 202 to reduce power consumption of convolution operations for artificial neural networks.

Many other devices or subsystems may be connected to example system 100 in FIG. 1 and/or example system 200 in FIG. 2. Conversely, all the components and devices illustrated in FIGS. 1 and 2 need not be present to practice the embodiments described and/or illustrated herein. The devices and subsystems referenced above may also be interconnected in different ways from those shown in FIG. 2. Example system 100 and example system 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

Figure 3:
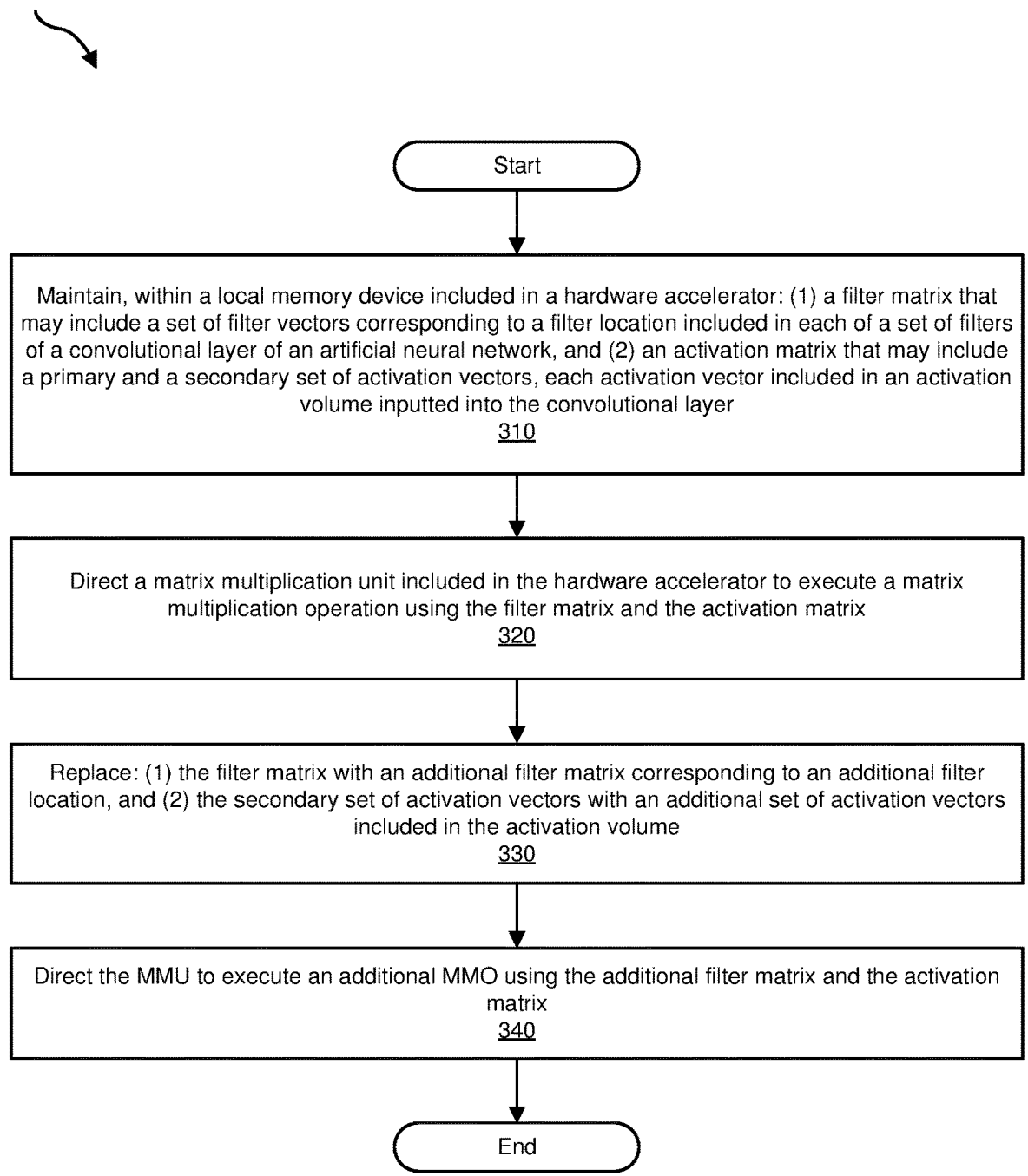
FIG. 3 is a flow diagram of an example method for reducing power consumption of convolution operations for artificial neural networks.

FIG. 3 is a flow diagram of an example computer-implemented method 300 for allocating shared resources in multi-tenant environments. The steps shown in FIG. 3 may be performed by any suitable computer-executable code and/or computing system, including example system 100 in FIG. 1, example system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310, one or more of the systems described herein may maintain, within an LMD included in a hardware accelerator, (1) a filter matrix including a set of filter vectors, each filter vector included in the set of filter vectors corresponding to a filter location included in each filter included in a set of filters associated with a convolutional layer of an artificial neural network, and (2) an activation matrix including (a) a primary set of activation vectors included in an activation volume inputted into the convolutional layer, and (b) a secondary set of activation vectors included in the activation volume inputted into the convolutional layer.

For example, maintaining module 104 may, as part of computing device 202, cause computing device 202 to maintain, within LMD 142 included in hardware accelerator 140, (1) filter matrix 204, and (2) activation matrix 206. Activation matrix 206 may include (a) primary activation vectors 208 and (b) secondary activation vectors 210.

In some examples, a "filter" may include an array or matrix of weight values that may, as part of a convolution operation, be convolved with an input volume (e.g., an activation volume, an image, etc.) to generate an output activation map and/or output volume associated with the filter and the input volume.

In some examples, an "activation volume" may include any set of data that may serve as input (e.g., an input volume) to a convolutional layer of an ANN as described herein. In some examples, an activation volume may include a set of data that may be represented as one or more channels or channel matrices. In some examples, a "channel" or a "channel matrix" may include data associated with a portion of a filter or a portion of an activation volume.

For example, an activation volume may include a digital image that may be represented as one or more matrices, where each matrix may correspond to a different color channel of the image. A color digital image may include a red channel, a green channel, and/or a blue channel. Likewise, a monochrome image may include only a single channel (e.g., a brightness channel). Hence, an activation volume that includes a digital representation of a color image may include a red channel matrix, a blue channel matrix, and a green channel matrix. In such examples, the red channel matrix may include data associated with a red channel of the image, the green channel matrix may include data associated with a green channel of the image, and the blue channel matrix may include data associated with the blue channel.

An activation volume may also include one or more pixels that may include one or more values corresponding to one or more channels at a particular location within the activation volume. For example, an activation volume may include a digital image that may be represented by a red channel matrix, a blue channel matrix, and a green channel matrix. A pixel at a location x within the image (e.g., $x_{1,1}$, $x_{1,2}$, $x_{1,3}$, etc.) may include a red channel value, a green channel value, and a blue channel value.

Likewise, filters may include one or more channels, where each channel may be convolved with a corresponding channel in the activation volume. In such examples, an output value may be determined by accumulating each result of a channel convolution with the results of the other channel convolutions. For example, if a convolution of a filter with a portion of an input volume resulted in a red channel value of 4, a green channel value of 3, and a red channel value of 5, an output value for the convolution of the filter with the portion of the input volume may be 12.

While examples of red, green, and blue channels of color images may be convenient for descriptive and conceptual purposes, these are examples only, and not intended to be limiting. In other examples, filters and/or activation volumes may include any number of channels and/or channel matrices.

In some examples, an activation volume and a filter that may be convolved with the activation volume may have a common channel depth. In some examples, a "channel depth" may include a number of channels shared by the activation volume and the filter. For example, an activation volume may include sixteen channels and a filter that may be convolved with the activation volume may include sixteen channels.

Figure 4:
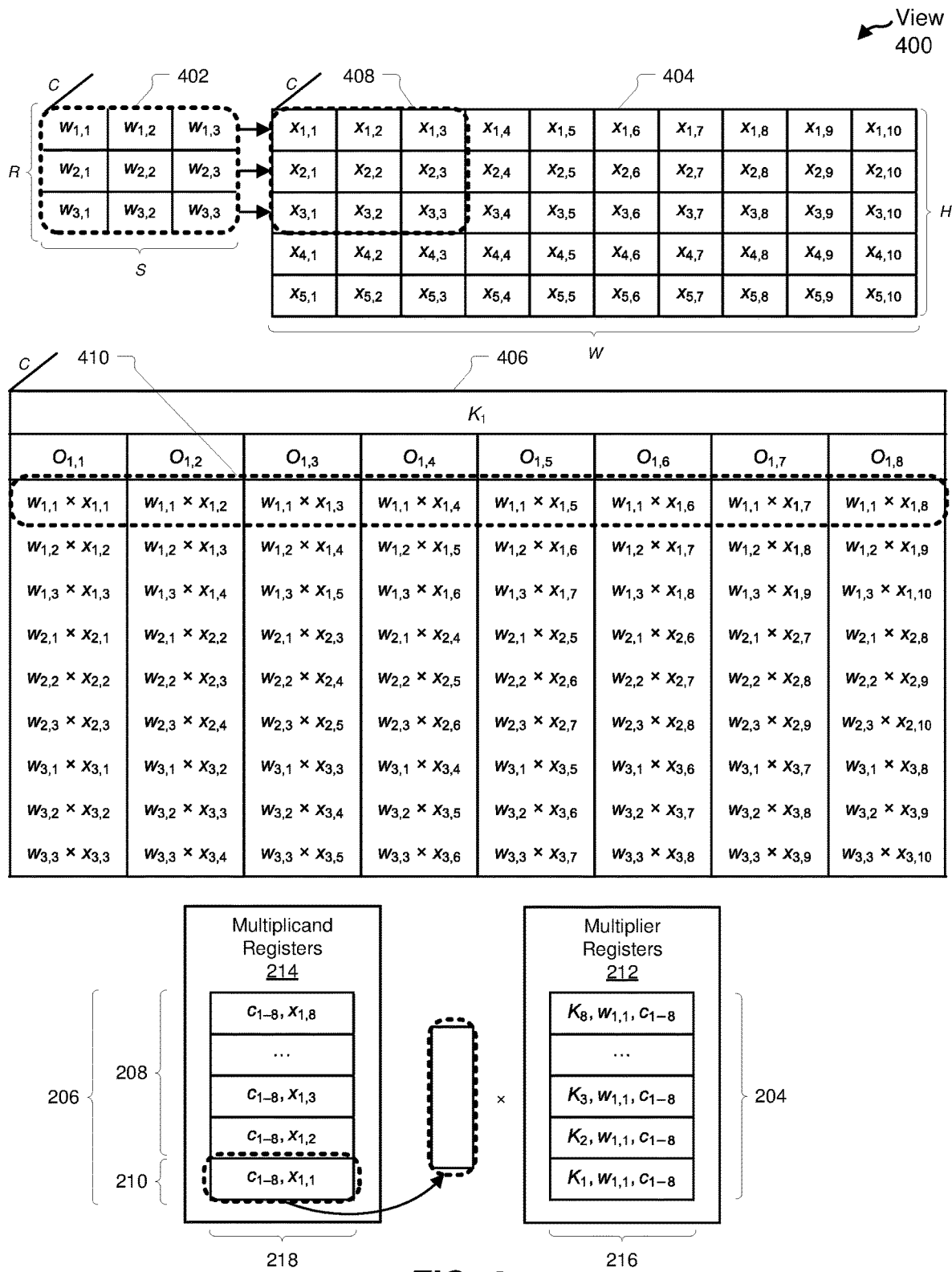
FIGS. 4-5 illustrate generating a result matrix by directing a matrix multiplication unit (MMU) included in a hardware accelerator to execute a matrix multiplication operation (MMO) using a filter matrix as a multiplier matrix and an activation matrix as a multiplicand matrix as described herein.

By way of illustration, FIG. 4 shows a view 400 of a filter 402 and an activation volume 404. As shown, filter 402 may be represented by a two-dimensional matrix having R=3 rows and S=3 columns. Each value in filter 402 may be a weight value and may be represented by its location within filter 402. For example, $w_{1,1}$ represents a weight value at a first row and first column of filter 402. Although filter 204 may only show 3×3 weight values (e.g., filter vectors) in FIG. 4, filter matrix 204 may have any suitable dimensions and/or may extend any distance in any direction.

Note that, in some examples, an ANN and/or a convolutional layer of an ANN may include and/or be associated with more than one filter. For example, filter 402 may be one of multiple filters associated with a convolutional layer of an ANN and may therefore be designated as $K_1$. Likewise, a second filter associated with a convolutional layer of the ANN may be designated as $K_2$, a third filter may be designated as $K_3$, and so forth.

Activation volume 404 may be represented by a two-dimensional matrix having H=5 rows and W=10 columns. Each value in activation volume 404 may be a pixel value and may be represented by its location within filter 402. For example, $x_{1,1}$ may represent a pixel value at a first row, first column of activation volume 404. Although activation volume 404 may only show 5×10 pixels (e.g., activation vectors) in FIG. 4, activation volume 404 may have any suitable dimensions and/or may extend any distance in any direction.

As further shown in FIG. 4, both filter 402 and activation volume 404 may also have an associated channel depth C. This may indicate that both filter 402 and activation volume 404 may include and/or are associated with C channels. For example, filter 402 and activation volume 404 may each include and/or be associated with a red channel, a green channel, and a blue channel. For simplicity of presentation and explanation, filter 402 and activation volume 404 only show one of the C channels that may be included in and/or may be associated with filter 402 and activation volume 404. Notwithstanding this appearance, a filter (e.g., filter 402) and/or an activation volume (e.g., activation volume 404) may include any suitable number of channels.

Particular values (e.g., weight values, pixel values, etc.) corresponding to locations within filters, activation volumes, and/or channels may be denoted herein in a variety of ways. For example, suppose a particular convolutional layer of an ANN is associated with eight filters (e.g., $K_1$ to $K_8$, also denoted herein as $K_{1-8}$) that may be convolved with an activation volume. Further suppose that each filter has a width R, a height S, and a channel depth of C. An upper left corner of a first channel may be referred to as ($w_{1,1}$, $c_1$), which may denote a weight value within a first row and a first column of a first channel of the filter. Likewise, a weight value within a first row and a first column of a second channel of the filter may be denoted as ($w_{1,1}$, $c_2$).

Furthermore, a pixel value in a first row and first column of an activation volume may be denoted by $x_{1,1}$. Likewise, a pixel value in a first row, first column, and first channel of an activation volume may be denoted by $x_{1,1}$, $c_1$ and/or ($x_{1,1}$, $c_1$). In some examples, an activation vector or set of pixel values associated with a first row and first column of an activation volume having eight channels may be denoted by $x_{1,1}$, $c_{1-8}$, ($x_{1,1}$, $c_{1-8}$), ($x_{1,1}$, $c_1$ $c_8$), and/or ($x_{1,1}$, $c_1$) to ($x_{1,1}$, $c_8$). In some examples, an "activation vector" may include a vector that includes a set of pixel values associated with a location and a set of channels included in an activation volume, such as ($x_{1,2}$, $c_{1-8}$), ($x_{10,20}$, $c_{3-10}$), and so forth.

Note that, in many examples involving matrices herein, matrix elements may be listed in a "row, column" format. Hence, when a matrix includes pixel locations arranged in rows of the matrix and channels arranged in columns of the matrix, pixel locations may be listed before channels (e.g., ($x_{1,1}$, $c_2$)). Likewise, when a matrix includes channels arranged in rows of the matrix and pixel locations arranged in columns of the matrix, channels may be listed before pixel locations (e.g., ($c_2$, $x_{1,1}$)). Furthermore, an asterisk may be used herein to refer to whole rows or columns in a matrix. For example, may refer to the i-th row of matrix A, $b_{*,j}$ may refer to the j-th column of matrix B, and so forth.

In some examples, a "convolution" or "convolution operation" may include an operation during which a filter (e.g., filter 402) may be virtually "placed" at a set of locations within the activation volume, and an output value may be determined for each location based on the weight values included in the filter and the pixel values that may correlate with the location of the filter. For example, at each location, element-wise products for the filter and activation volume may be calculated and summed, thereby producing an output value for the location. A 2-dimensional set of output values produced by convolving a filter and an activation volume may be referred to as a "feature map," an "activation map," an "output activation," or an "output activation value" for the filter.

In some examples, the set of locations within an activation volume that a filter may be placed during a convolution operation may be governed by a "stride" or "stride length" of the filter, which may indicate a number of pixels between each location. For example, a stride of one may indicate that the filter may be moved one pixel at a time across the input volume, with a convolution operation being executed at each location. As another example, a stride of two may indicate that the filter is moved two pixels at a time across the input volume. Hence, in some embodiments, one or more of modules 102 (e.g., maintaining module 104, directing module 106, replacing module 108, executing module 110, etc.) may select a primary set of activation vectors (e.g., primary activation vectors 208), a secondary set of activation vectors (e.g., secondary activation vectors 210), an additional filter matrix (e.g., additional filter matrix 224) and/or an additional set of activation vectors (e.g., additional activation vectors 226) based on a predetermined stride length associated with a filter and/or a convolutional layer of an ANN. Additional examples and explanations of strides and stride length will be provided below in reference to FIGS. 13-16.

By way of illustration, FIG. 4 includes an output table 406 that includes calculations corresponding to a pass of filter 402 across the W dimension of activation volume 404 with a stride of one pixel. As shown, to determine output values for a first row of activation volume 404 and filter 402 (e.g., values $O_{1,1}$ to $O_{1,8}$), filter 402 may be virtually placed at a set of locations within activation volume 404. At each location, an element-wise multiplication may be performed between the weight values included in filter 402 and a portion of activation volume 404 that corresponds to the location of filter 402. These partial products may then be summed to determine an output value corresponding to the location of filter 402 (e.g., values $O_{1,1}$ to $O_{1,8}$).

For example, when filter 402 is at location 408, output value $O_{1,1}$ may be a sum of nine values corresponding to the weight values included in filter 402: $w_{1,1} \times x_{1,1}$, $w_{1,2} \times x_{1,2}$, $w_{1,3} \times x_{1,3}$, $w_{2,1} \times x_{2,1}$, $w_{2,2} \times x_{2,2}$, $w_{2,3} \times x_{2,3}$, $w_{3,1} \times x_{3,1}$, $w_{3,2} \times x_{3,2}$, and $w_{3,3} \times x_{3,3}$. Furthermore, in examples where a filter and a corresponding activation volume include a plurality of channels, output values for each channel may be summed to determine a final output value. For example, if an output value of a particular location is {10, 20, 5}, in a red channel, green channel, and blue channel, respectively, an overall output value for the particular location (e.g., $O_{i,j}$) may be 10+20+5=35.

As shown in FIG. 4, a row 410 of constituent values of each of output values $O_{1,1}$ through $O_{1,8}$ in output table 406 is highlighted. Row 410 may indicate a set of calculations that share a common factor of $w_{1,1}$, as will be described in greater detail below.

In some examples, a "filter vector" may include a vector that includes a set of weight values corresponding to a location within a filter and to a set of channels associated with the filter. For example, a filter vector that corresponds to weight values associated with a first row and a first column of a filter having a channel depth of eight channels may be denoted by $(w_{1,1}, c_{1-8})$. Likewise, in a set of filters, a filter vector that corresponds to weight values associated with a first row and a first column of a first filter having a channel depth of eight channels may be denoted by $(K_1, w_{1,1}, c_{1-8})$.

In some examples, a "filter matrix" may include a set of filter vectors that each correspond to a filter location (e.g., one of $w_{1,1}, w_{1,2}, w_{1,3}, \ldots w_{R,S}$) included in a set of filters (e.g., filters $K_1$ through $K_m$). Each filter vector may include a set of weight values that each correspond to a different channel included in a set of channels associated with a filter included in the set of filters. The set of filter vectors may include up to a multiplier matrix width dimension (e.g., m) of filter vectors. Each filter vector may include a predetermined number of channel values that is at most a multiplier matrix height dimension (e.g., k).

Figure 5:

To illustrate, FIG. 5 is a view 500 that shows a filter matrix 502 with m rows and k columns. As shown, each row of filter matrix 502 may include a filter vector corresponding to a filter location $w_{1,1}$ included in each filter K included in a set of m filters. Furthermore, each filter vector in filter matrix 502 may include k weight values corresponding to each channel c included in each filter $K_1$ to $K_m$. For example, a weight value included in a first row and first column of filter matrix 502 may correspond to a filter $K_1$, a filter location $w_{1,1}$, and a channel $c_1$. Likewise, a weight value included in a last row and a last column of filter matrix 204 may correspond to a filter $K_m$, the filter location $w_{1,1}$, and a channel $c_k$.

In some examples, an "activation matrix" may include a set of activation vectors. Each activation vector may correspond to a location within an activation volume (e.g., $x_{1,1}$, $x_{1,2}, x_{1,3}, \ldots x_{H,W}$) and may include a set of pixel values corresponding to a set of channels included in the activation volume. For example, an activation vector that corresponds to a location $x_{1,1}$ within an activation volume that includes up to eight channels may be expressed as $(x_{1,1}, c_{1-8})$. In some examples, a total number of activation vectors included in an activation matrix (e.g., a total number of primary activation vectors 208 and secondary activation vectors 210 included in activation matrix 206) may be at most the multiplicand matrix width dimension (e.g., n). Likewise, in some examples, each activation vector included in an activation matrix (e.g., primary activation vectors 208 or secondary activation vectors 210 included in activation matrix 206) may include at most the multiplicand matrix width dimension (e.g., k) of activation channel values.

As an illustration, FIG. 5 also includes an activation matrix 504 with n rows and k columns. As shown, each column of activation matrix 504 may correspond to an activation vector that may include a set of k activation channel values $c_1$ to $c_k$ corresponding to a location (e.g., $x_{i,j}$) included in an activation volume. For example, an activation channel value (e.g., a pixel value) included in a first row and first column of activation matrix 504 may correspond to a first channel $c_1$ and a location $x_{1,1}$ of an activation volume. Likewise, an activation channel value included in a last row and a last column of activation matrix 504 may correspond to a channel $c_k$ and a location of $x_n$ (e.g., an n-th member of $(x_{1,1}, x_{1,2}, x_{1,3}, \ldots x_{H,W})$) within an activation volume.

Maintaining module 104 may cause computing device 202 to maintain, within LMD 142 included in hardware accelerator 140, filter matrix 204 and activation matrix 206 in a variety of contexts. For example, as mentioned above, in some embodiments, LMD 142 may include multiplier registers 212 and multiplicand registers 214. Maintaining module 104 may maintain filter matrix 204 and activation matrix 206 by storing filter matrix 204 within multiplier registers 212 and activation matrix 206 within multiplicand registers 214.

Additionally or alternatively, in some examples, maintaining module 104 may maintain filter matrix 204 and activation matrix 206 by retrieving, from data store 150 (e.g., from filter matrices 152 and/or activation volume 154), filter matrix 204 to multiplier registers 212 and activation matrix 206 to multiplicand registers 214. Maintaining module 104 may retrieve filter matrix 204 and/or activation matrix 206 from data store 150 to multiplier registers 212 and/or multiplicand registers 214 in any suitable way. For example, maintaining module 104 may access data store 150 and may identify filter matrix 204 and/or activation matrix 206. Maintaining module 104 may then cause computing device 202 to transfer, via a suitable data path (e.g., a data bus that may communicatively couple LMD 142 and data store 150), filter matrix 204 into multiplier registers 212 and activation matrix 206 into multiplicand registers 214.

In some examples, a "multiplier register" may include one or more memory registers included in LMD 142 that may store and/or maintain data that MMU 144 may utilize as a multiplier matrix (e.g., multiplier matrix 216) in an MMO. Likewise, a "multiplicand register" may include one or more registers included in LMD 142 that may store and/or maintain data that MMU 144 may utilize as a multiplicand matrix (e.g., multiplicand matrix 218) in an MMO.

By way of example, FIG. 4 includes an illustration of multiplier registers 212 that may be storing and/or maintaining filter matrix 204. In this example, MMU 144 may be configured to execute MMOs in a form of 8×8×8. Hence, filter matrix 204 may include eight filter vectors, each filter vector corresponding to a filter location (e.g., $w_{1,1}$) included in each filter included in a set of eight filters (e.g., K1 through $K_8$).

Additionally, FIG. 4 also shows an illustration of multiplicand registers 214 that may be storing and/or maintaining activation matrix 206 that may include a set of seven primary activation vectors (e.g., primary activation vectors 208) and a set of one secondary activation vector (e.g., secondary activation vectors 210). In this example, where MMU 144 may be configured to execute MMOs in a form of 8×8×8, activation matrix 206 may include eight activation vectors, each activation vector including eight activation channel values corresponding to eight different channels (e.g., $x_{1,1}$, $c_{1-8}$ to $x_{1,8}$, $c_{1-8}$).

Returning to FIG. 3, at step 320, one or more of the systems described herein may direct an MMU included in a hardware accelerator to execute an MMO using a filter matrix (e.g., as a multiplier matrix) and an activation matrix (e.g., as a multiplicand matrix). For example, directing module 106 may, as part of computing device 202, cause computing device 202 to direct MMU 144 included in hardware accelerator 140 to execute an MMO using filter matrix 204 as multiplier matrix 216 and activation matrix 206 as multiplicand matrix 218.

Directing module 106 may cause computing device 202 to direct MMU 144 to execute the MMO using filter matrix 204 and activation matrix 206 in a variety of ways. In some embodiments, directing module 106 may cause computing device 202 to generate a primary result matrix (e.g., primary result matrix 222) by directing MMU 144 to execute an MMO using filter matrix 204 as multiplier matrix 216 and activation matrix 206. For example, as noted above, MMU 144 may be configured to perform a an MMO (e.g., a GEMM) using a multiplier matrix (e.g., multiplier matrix 216) having dimensions of m×k and a multiplicand matrix (e.g., multiplicand matrix 218) having dimensions of n×k. Hence, in some examples, directing module 106 may cause computing device 202 to generate a result matrix (e.g., primary result matrix 222) by directing MMU 144 to execute an MMO (e.g., a GEMM) using filter matrix 204 as a multiplier matrix having dimensions of m×k and activation matrix 206 as a multiplicand matrix having dimensions of n×k.

In some examples, a "generalized matrix multiplication operation" may include any matrix operation whereby a multiplier matrix (e.g., multiplier matrix 216) is multiplied by a multiplicand matrix (e.g., multiplicand matrix 218) to produce a matrix product (also referred to as a result matrix herein, such as primary result matrix 222, secondary result matrix 228, etc.). As further shown in FIG. 5, filter matrix 502 may be a multiplier matrix A having dimensions of m×k and activation matrix 504 may be a multiplicand matrix B having dimensions of n×k. A matrix product AB=C (e.g., primary result matrix 222) may be a matrix having dimensions of m×n such that element $c_{i,j}$ may be obtained by multiplying, term-by-term, the entries of the i-th row of A and the j-th column of B and summing these partial products. In other words, element $c_{i,j}$ of matrix C may be a dot product of the i-th row of A and the j-th column of B. A dot product of two vectors a and b may be expressed as:

$$a \cdot b = \sum_{i=1}^{n} a_i b_i = a_1 b_1 + a_2 b_2 + \cdots + a_n b_n,$$

where Σ denotes summation and n is the dimension of the vector space.

Hence, as shown in FIG. 5, an element within the first row and first column of output matrix C (e.g., primary result matrix 222) may be a dot product of elements included in a first row (e.g., $a_{1,*}$) of filter matrix 502 and elements included in a first column (e.g., $b_{*,1}$) of activation matrix 504. Likewise, an element within the first row and second column of output matrix C may be a dot product of elements included in a first row $a_{1,*}$ of filter matrix 502 and elements included in a second column $b_{*,1}$ of activation matrix 504. Furthermore, an element within an m-th row and an n-th column of output matrix C may be a dot product of elements included in an m-th row $a_{m,*}$ of filter matrix 502 and elements included in an n-th column $b_{*,n}$ of activation matrix 504.

MMU 144 may execute an MMO, using a filter matrix (e.g., filter matrix 204, filter matrix 502, etc.) as a multiplier matrix and an activation matrix (e.g., activation matrix 206, activation matrix 504, etc.) as a multiplicand matrix in any suitable way. For example, returning to FIG. 4, during each cycle associated with hardware accelerator 140, MMU 144, and/or computing device 202, MMU 144 may access a set of registers included in multiplicand registers 214 that may include a row of multiplicand matrix 218 (e.g., primary activation vectors 208, secondary activation vectors 210, and/or additional activation vectors 226 included in activation matrix 206). During the cycle, MMU 144 may then determine (e.g., calculate), for each column of values included in multiplier matrix 216, a dot product of the row of multiplicand matrix 218 and the column of values included in multiplier matrix 216. This may be referred to as "broadcasting" a pixel (e.g., a location $x_n$ having k channels) of activation matrix 206 to each of the filter vectors included in filter matrix 204.

This operation may be visualized as a convolution operation whereby a 1×1×k portion of an activation volume (e.g., activation volume 154, activation volume 404) is convolved with a 1×1×k portion of each filter included in a set of m filters.

To illustrate, in some examples, MMU 144 may be configured to execute GEMM operations in the form of m×k×n, where m=8, k=8, and n=8. Thus, MMU 144 may be configured to execute a GEMM using a multiplier matrix (e.g., multiplier matrix 216) having a dimensionality of m×k such that m=8 and k=8. MMU 144 may be further configured to execute the GEMM MMO using a multiplicand matrix (e.g., multiplicand matrix 218) having a dimensionality of k×n such that k=8 and n=8. In some examples, MMU 144 may be referred to as "a matrix multiplication block of 8×8×8" or "an 8×8×8 matrix multiplication block". Note that these are examples and illustrations only, as MMU 144 may be configured to execute MMOs of any dimensionality including, without limitation, 8×8×8, 16×16×16, 32×32×32, 64×64×64, 8×16×8, 8×32×8, 16×32×16, and so forth.

FIG. 4 also shows an example of multiplier registers 212 and multiplicand registers 214. Although not shown in FIG. 4, in the example illustrated by FIG. 4, MMU 144 may include an 8×8×8 matrix multiplication block. Multiplier registers 212 may be loaded with filter matrix 204 that may include eight filter vectors, with each filter vector corresponding to one of eight filters (e.g., $K_1$ to $K_8$) and a filter location included in each of the eight filters (e.g., $w_{1,1}$). Each filter vector may include eight filter channel values (e.g., $c_1$ to $c_8$) corresponding to the filter location (e.g., $w_{1,1}$). Each row m of filter matrix 204 may correspond to a different filter (e.g., one of $K_1$ to $K_8$), and each column k of filter matrix 204 may correspond to a different filter channel (e.g., $c_1$ to $c_8$) associated with a filter location included in each filter (e.g., $w_{1,1}$).

Likewise, as further shown in FIG. 4, multiplicand registers 214 may be loaded with activation matrix 206. Activation matrix 206 may include a total of eight activation vectors, with each activation vector corresponding to one of eight locations (e.g., $x_{1,1}$ to $x_{1,8}$) within activation volume 404. Each activation vector may include eight activation channel values (e.g., $c_1$ to $c_8$) corresponding to the location within activation volume 404. The activation vectors included in activation matrix 206 may be divided into a set of primary activation vectors (e.g., primary activation vectors 208) and a set of secondary activation vectors (e.g., secondary activation vectors 210). As shown in FIG. 4, primary activation vectors 208 may include a set of seven activation vectors (e.g., $c_{1-8}$, $x_{1,2}$ to $c_{1-8}$, $x_{1,8}$), and secondary activation vectors 210 may include a set of one activation vector (e.g., $c_{1-8}$, $x_{1,1}$). Each row k of activation matrix 206 may correspond to a different activation channel (e.g., $c_1$ to $c_8$) and each column n may correspond to a different location within activation volume 404 (e.g., $x_{1,1}$ to $x_{1,8}$).

Thus, MMU 144 may use filter matrix 204 as a multiplier matrix 216 and activation matrix 206 as a multiplicand matrix 218. Each row of multiplier matrix 216 may include a filter vector included in filter matrix 204, and each column of multiplicand matrix 218 may include an activation vector included in activation matrix 206.

In some examples, hardware accelerator 140 and/or one or more components of hardware accelerator 140 may operate in accordance with a clock or clock cycles. During each cycle, directing module 106 may direct MMU 144 to select and/or access a set of registers included in multiplicand registers 214 that may include and/or represent a column of multiplicand matrix 218 (e.g., an activation vector included in activation matrix 206). During the cycle, directing module 106 may further direct MMU 144 to determine (e.g., calculate), for each row of values included in multiplier matrix 216 (e.g., for each filter vector included in filter matrix 204), a dot product of the column of multiplicand matrix 218 and each row of values included in multiplier matrix 216. This may be referred to as "broadcasting" an activation vector (e.g., a pixel value associated with a location $x_{i,j}$ and having up to k channels) of activation matrix 206 to each of the filter vectors (e.g., weight values associated with a location in each of a set of filters) in filter matrix 204. This may be visualized as a convolution operation whereby a 1×1×k portion of an activation volume (e.g., activation volume 154, activation volume 404, etc.) is convolved with a 1×1×k portion of each filter included in a set of m filters.

Figure 6:
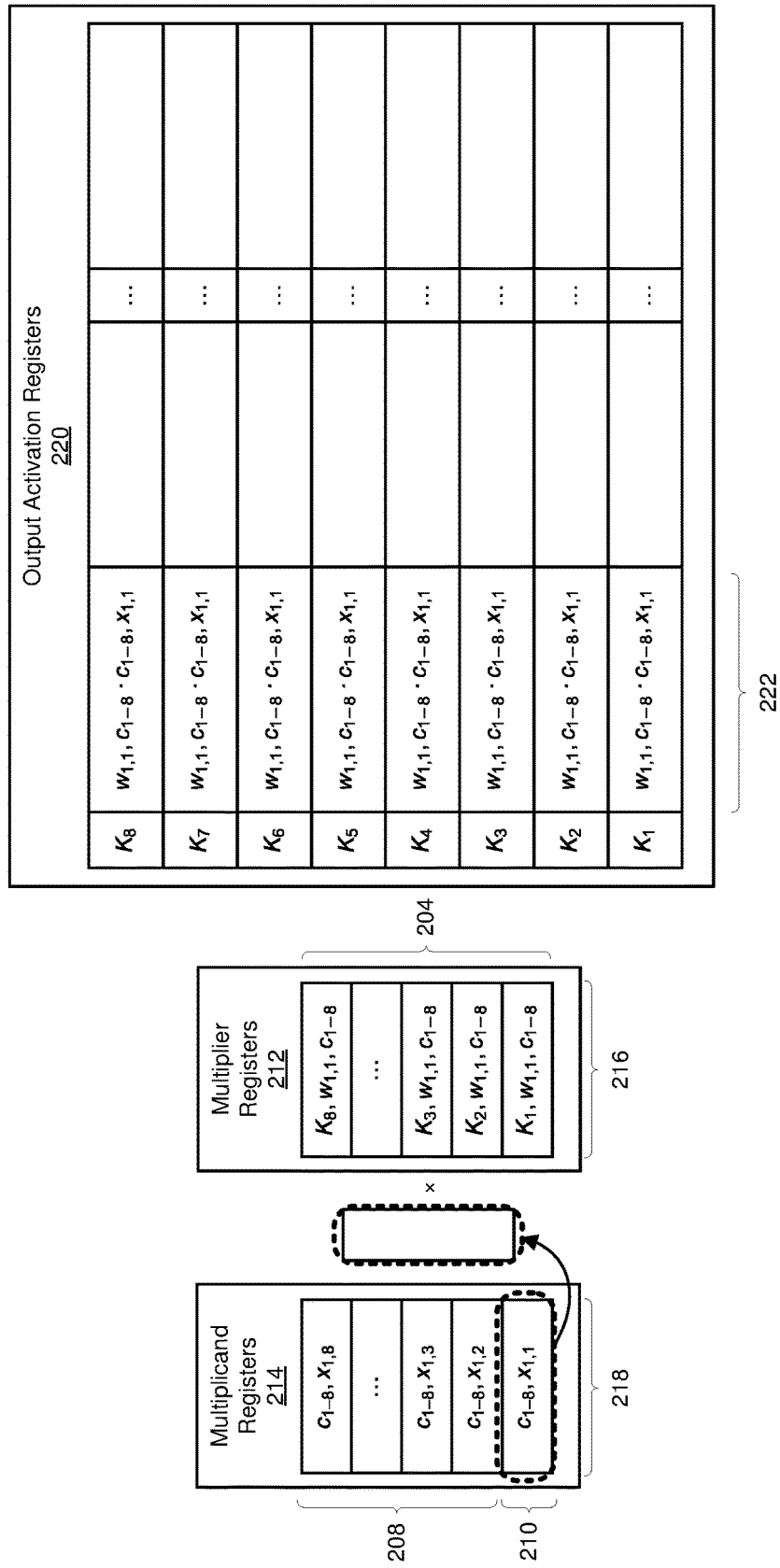

FIG. 6 shows a view 600 of a completed first cycle of an MMO executed by an MMU 144. In this example, MMU 144 may include an 8×8×8 matrix multiplication block. As shown, maintaining module 104 may have retrieved filter matrix 204 and activation matrix 206 (e.g., primary activation vectors 208 and secondary activation vectors 210) into multiplier registers 212 and multiplicand registers 214, respectively.

As noted above, in some examples, one or more of modules 102 (e.g., maintaining module 104, directing module 106, and/or replacing module 108) may select activation matrix 206 (e.g., primary activation vectors 208 and secondary activation vectors 210) and/or an additional set of activation vectors (e.g., additional activation vectors 226) based on a predetermined stride length associated with a convolutional layer of an ANN. In the examples illustrated by FIGS. 6-12, the stride length may be 1.

As shown in FIG. 6, directing module 106 has selected and/or accessed an activation vector included in secondary activation vectors 210: ($c_{1-8}$, $x_{1,1}$). The selected and/or accessed activation vector may be included as a column of activation matrix 206. The selected and/or accessed activation vector may further have eight channel values $c_1$ to $c_8$ associated with a location $x_{1,1}$. Directing module 106 may cause (e.g., direct) MMU 144, as part of an MMO, to "broadcast" these pixel values to each of eight filter vectors included in filter matrix 204 (e.g., $K_1$, $w_{1,1}$, $c_{1-8}$ to $K_8$, $w_{1,1}$, $c_{1-8}$). This may include determining, for each filter vector included in filter matrix 204, a dot product of the activation vector and the filter vector. For example, directing module 106 may direct MMU 144 to determine, as part of the MMO, a dot product including $K_1$, $w_{1,1}$, $c_{1-8} \cdot c_{1-8}$, $x_{1,1}$. Directing module 106 may further direct one or more components of hardware accelerator 140 (e.g., LMD 142, MMU 144, etc.) to store the result of the dot product operation as part of primary result matrix 222 within output activation registers 220.

As further shown in FIG. 6, during the first cycle, directing module 106 may further direct MMU 144 to determine, as part of the continued MMO, dot products of the activation vectors included in secondary activation vectors 210 and the filter vectors included in filter matrix 204. Directing module 106 may further cause (e.g., direct) hardware accelerator 140 (e.g., LMD 142, MMU 144, etc.) to store the results of the dot product operations as part of primary result matrix 222 within output activation registers 220. Overall, at a conclusion of the first cycle illustrated in FIG. 6, directing module 106 may have directed and/or caused MMU 144 (and/or any other component of hardware accelerator 140) to determine, and store as part of primary result matrix 222 within output activation registers 220, a total of eight dot products involving activation vector $c_{1-8}$, $x_{1,1}$ and each of the filter vectors included in filter matrix 204 (e.g., each of $K_1$, $w_{1,1}$, $c_{1-8}$ to $K_8$, $w_{1,1}$, $c_{1-8}$). These dot products may be indicated by the first column of primary result matrix 222 in FIG. 6.

Figure 7:
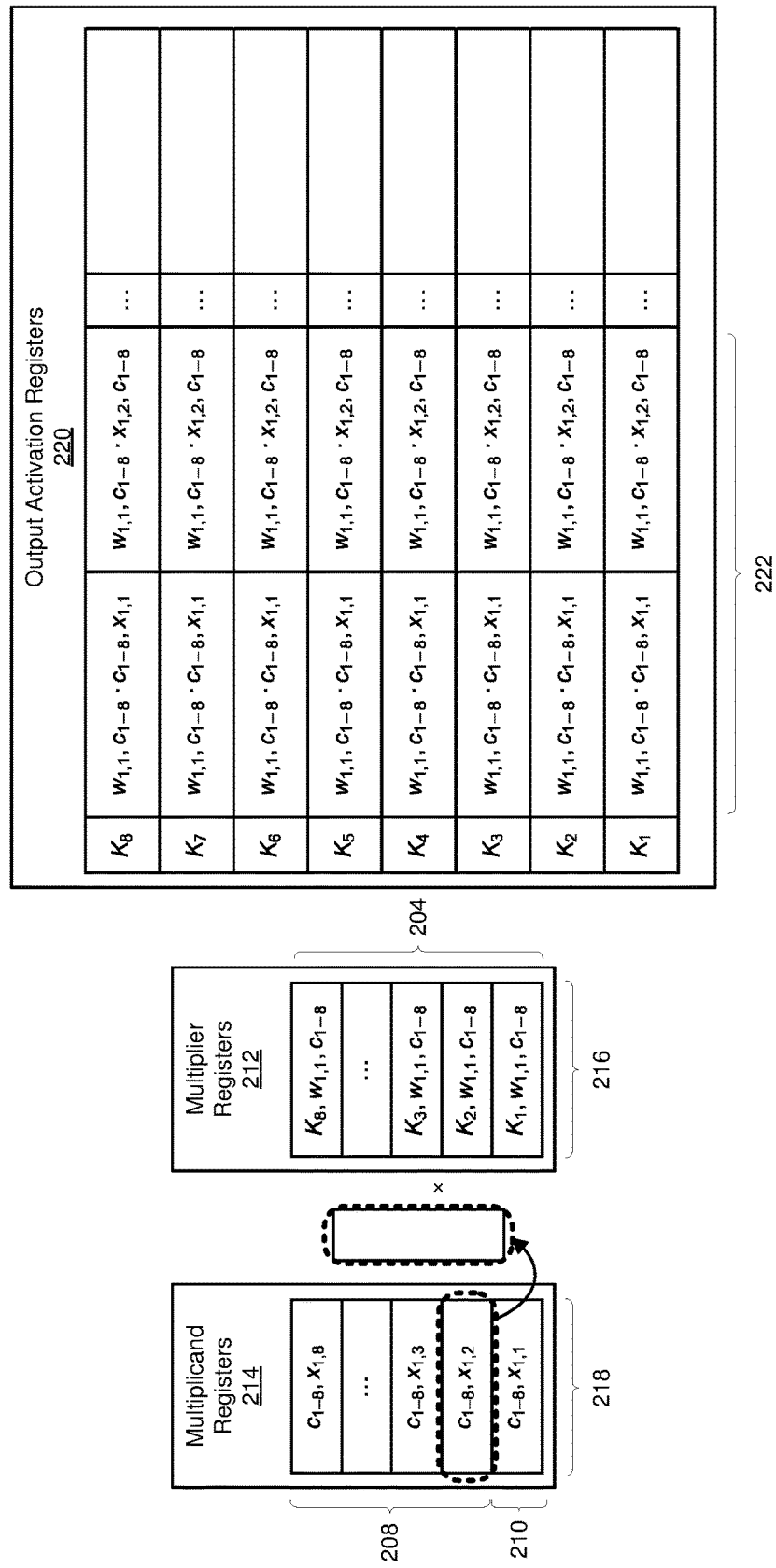

FIG. 7 shows a view 700 of a completed second cycle of an MMO executed by MMU 144. As shown, directing module 106 may have selected and/or accessed an activation vector included in primary activation vectors 208 (e.g., $c_{1-8}$, $x_{1,2}$), and may have caused MMU 144, as part of the continued MMO, to broadcast these pixel values to each of the eight filters included in filter matrix 204 (e.g., $K_1$, $w_{1,1}$, $c_{1-8}$ to $K_8$, $w_{1,1}$, $c_{1-8}$). This may have included determining, for each filter vector included in filter vector 204, a dot product of the activation vector and the filter vector. For example, directing module 106 may have directed MMU 144 to determine, as part of the MMO, a dot product including $K_1$, $w_{1,1}$, $c_{1-8} \cdot c_{1-8}$, $x_{1,2}$. Directing module 106 may further cause (e.g., direct) hardware accelerator 140 and/or MMU 144 to store the result of the dot product operation as part of primary result matrix 222 within output activation registers 220.

As further shown in FIG. 7, during the second cycle, directing module 106 may further direct MMU 144 to determine, as part of the continued MMO, dot products of the activation vector included in primary activation vectors 208 and the filter vectors included in filter matrix 204. Directing module 106 may further, during the second cycle, cause (e.g., direct) hardware accelerator 140 (e.g., LMD 142, MMU 144, etc.) to store the results of the dot product operations as part of primary result matrix 222 within output activation registers 220. Overall, at a conclusion of the second cycle illustrated in FIG. 7, directing module 106 may have caused (e.g., directed) MMU 144 and/or hardware accelerator 140 to determine, and store as part of primary result matrix 222 within output activation registers 220, a total of eight dot products involving activation vector $c_{1-8}$, $x_{1,2}$ and each of the filter vectors included in filter matrix 204 (e.g., each of $K_1$, $w_{1,1}$, $c_{1-8}$ to $K_1$, $w_{1,1}$, $c_{1-8}$). These eight dot products may be indicated by the second column of primary result matrix 222 in FIG. 7.

MMU 144 may continue the MMO in this fashion until MMU 144 has broadcast all activation vectors included in activation matrix 206 to all the filter vectors included in filter matrix 204. This may result in a result matrix (e.g., primary result matrix 222) having m rows, each row corresponding to a convolution of a 1×1×k portion of each of m filters with each of n 1×1×k locations included in an activation volume, where k represents a channel depth of the filters and activation volume.

Figure 8:
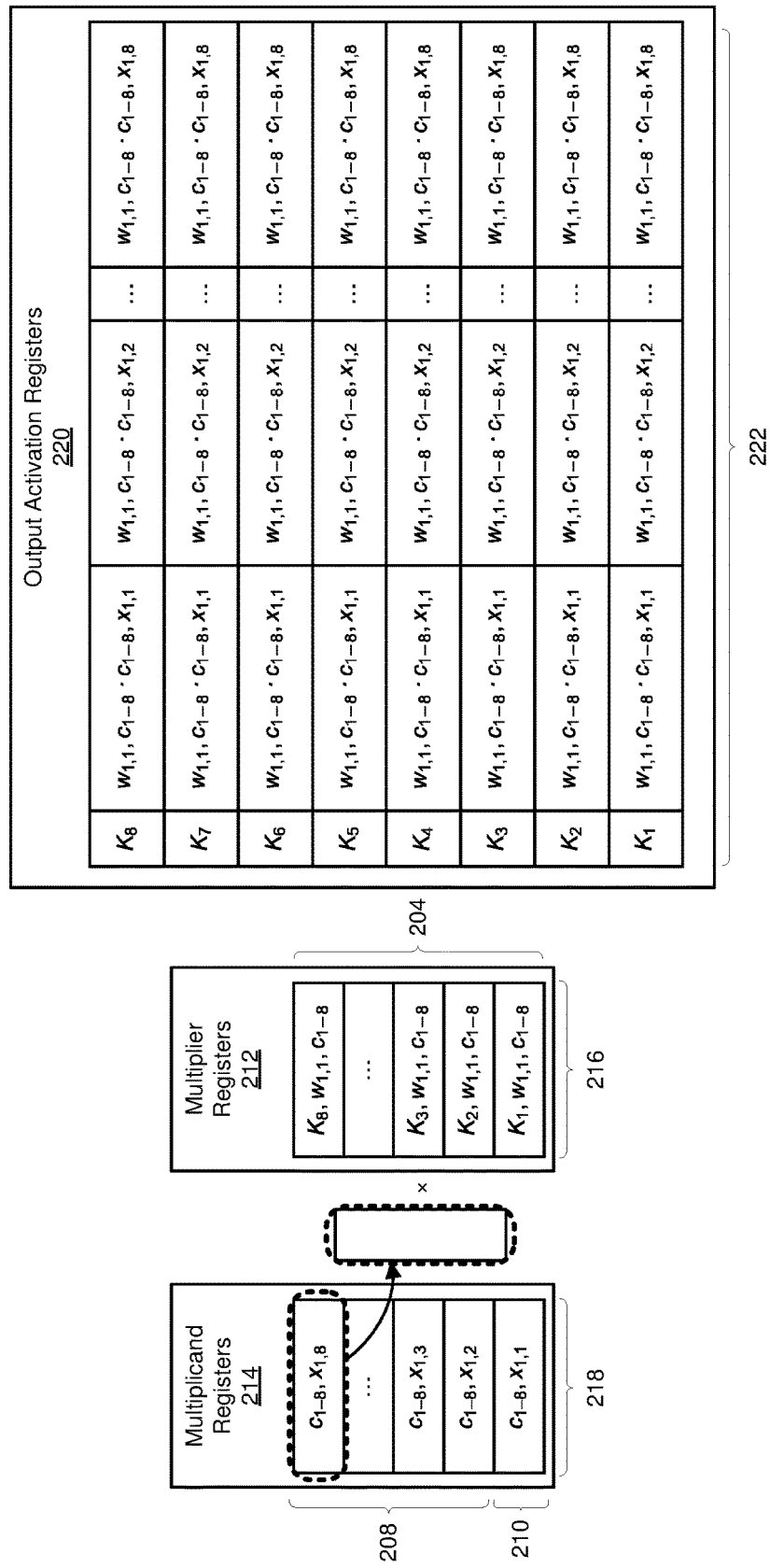
Figure 10:
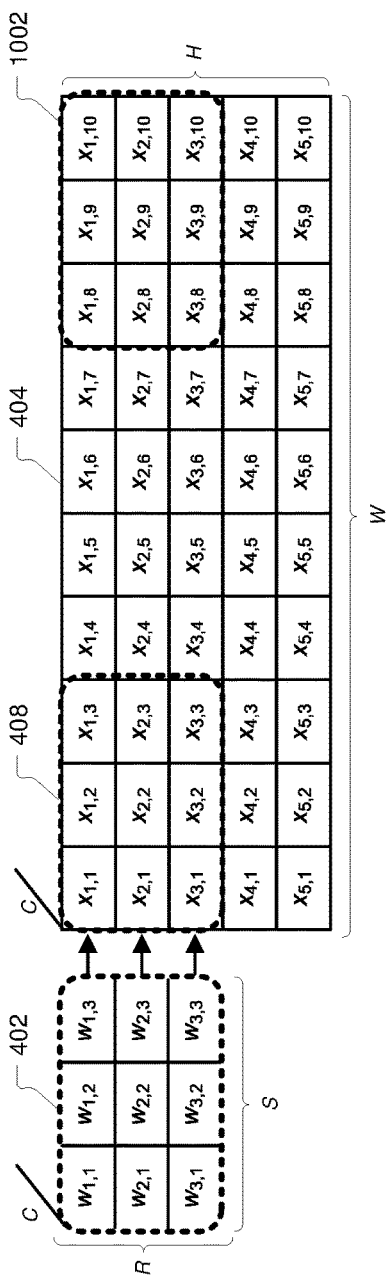

FIG. 8 shows a view 800 of a completed eighth cycle of an MMO executed by an MMU 144. As shown, directing module 106 may direct MMU 144 and/or hardware accelerator 140 to continue the MMO to an eighth cycle, selecting new activation vectors from activation matrix 206 until all activation vectors included in primary activation vectors 208 and secondary activation vectors 210 (e.g., e.g., $c_{1-8}$, $x_{1,1}$ to $c_{1-8}$, $x_{1,8}$) have been broadcast to all filter vectors included in filter matrix 204 (e.g., e.g., $K_1$, $w_{1,1}$, $c_{1-8}$ to $K_8$, $w_{1,1}$, $c_{1-8}$). This may result in primary result matrix 222 including eight rows, each row corresponding to a convolution of a 1×1×k portion of each of eight filters (e.g., $K_1$ to $K_8$) with each of 8 1×1×k locations included in an activation volume (e.g., $c_{1-8}$, $x_{1,1}$ to $c_{1-8}$, $x_{1,8}$), where k represents a common channel depth of the eight filters and the activation volume (e.g., C=8).

Figure 9:
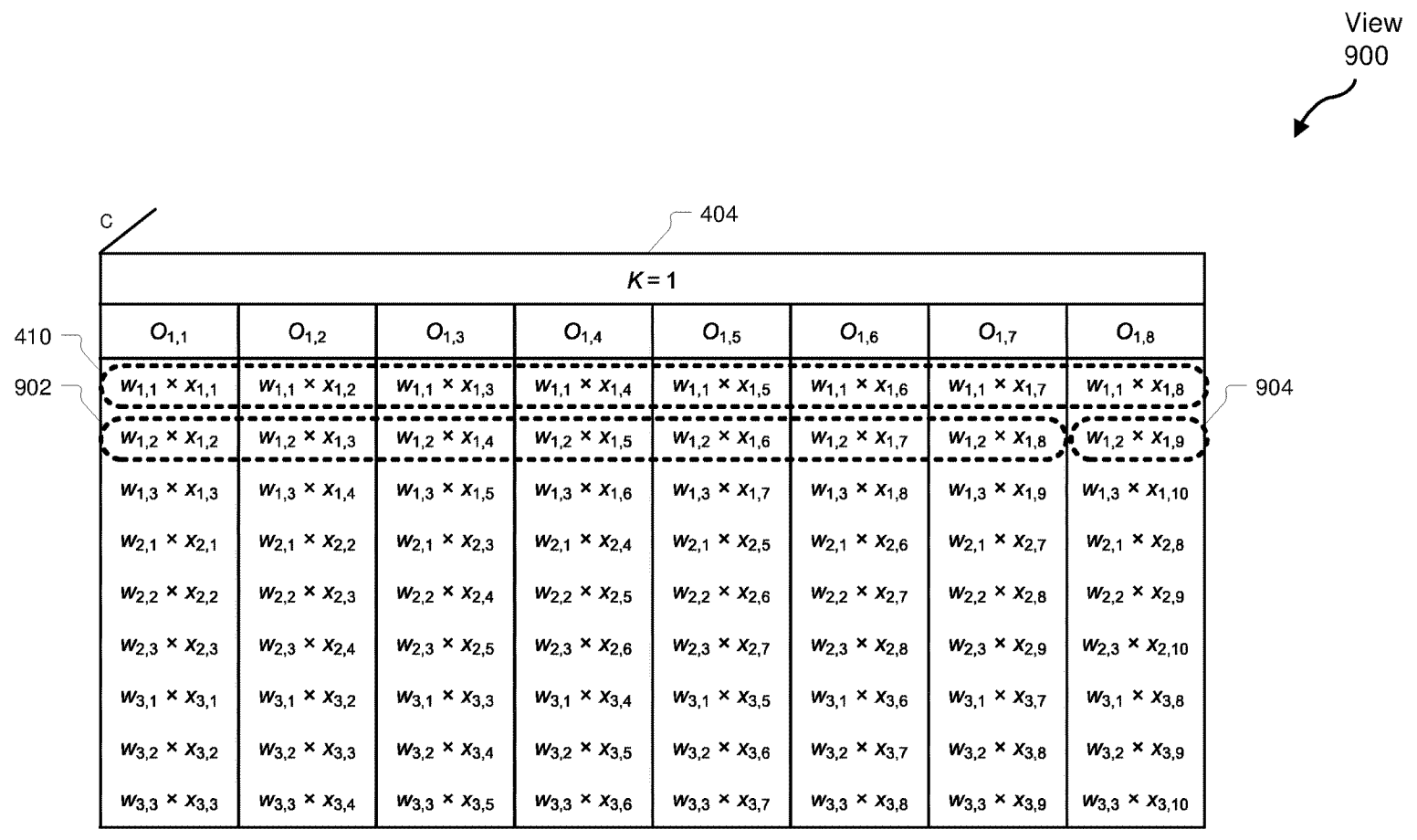

Upon a conclusion of the eighth cycle, output activation registers 220 may include a set of values (e.g., primary result matrix 222) that may correspond to a portion of a set of output values for a set of convolution operations. FIG. 9 shows a view 900 that includes output table 406 with row 410 of constituent values of each of values $O_{1,1}$ through $O_{1,8}$. When compared with primary result matrix 222 in FIG. 8, it may be apparent that primary result matrix 222 may include values corresponding to row 410 for each filter in $K_1$ to $K_8$, up to a channel depth of C=8. In examples where the filters and activation volume may include more than k channels, one or more additional loops and/or executions of MMOs as described herein may be added to determine and accumulate additional output values associated with the additional channels.

As further shown in FIG. 9, partial row 902, a part of a second row of constituent values of each of values $O_{1,1}$ through $O_{1,7}$, includes several values that share common factors (e.g., $x_{1,2}$ to $x_{1,8}$) with entries in row 410. Indeed, apart from entry 904, corresponding to an activation vector associated with location $x_{1,9}$ in activation volume 404, each activation vector included in partial row 902 (e.g., $x_{1,2}$ to $x_{1,8}$) is repeated from row 410. As will be described in greater detail below, hardware accelerator 140 may reuse the repeated activation vectors that are already loaded into LMD 142 in subsequent MMOs during a convolution operation. This reuse may result in significant power savings over conventional systems and methods that may access and/or retrieve more activation values more often from slower and/or more power-inefficient memory and/or data storage devices while performing convolution operations.

Returning to FIG. 3, at step 330, one or more of the systems described herein may replace (1) a filter matrix with an additional filter matrix corresponding to an additional filter location, and (2) a secondary set of activation vectors with an additional set of activation vectors included in the activation volume. For example, replacing module 108 may, as part of computing device 202, cause computing device 202 to replace (1) filter matrix 204 with additional filter matrix 224, and (2) secondary activation vectors 210 with additional activation vectors 226.

During a convolution operation, some portions of a filter may pass over the same locations within an activation volume as other portions of the filter. To illustrate, FIG. 10 includes a view 1000 of filter 402, activation volume 404, and location 408 from FIG. 4. As shown, when filter 402 is at location 408 (e.g., at the start of a convolution operation), weight value $w_{1,1}$ is positioned over activation volume location $x_{1,1}$ and weight value $w_{1,2}$ is positioned over activation volume location $x_{1,2}$. Likewise, when filter 402 is at location 1002, weight value $w_{1,1}$ is positioned over activation volume location $x_{1,8}$ and weight value $w_{1,2}$ is positioned over activation volume location $x_{1,9}$.

During a convolution operation, filter 402 may be conceptually moved across activation volume 404 one location at a time (e.g., in accordance with a stride of 1). Weight value $w_{1,1}$ may pass over locations $x_{1,1}$ to $x_{1,8}$, and weight value $w_{1,2}$ may pass over locations $x_{1,2}$ to $x_{1,9}$. In this example, the two weight values may share seven of the same activation locations within activation volume 404 (e.g., $x_{1,2}$ to $x_{1,8}$) during a convolution operation. As will be described in greater detail below, the systems and methods described herein may reuse these shared values in multiple convolution operations involving multiple filters to conserve power that may otherwise be used to access and/or transfer activation values from power-inefficient storage and/or memory devices.

However, some portions of a filter pass over different locations within an activation volume during a convolution operation. For example, weight value $w_{1,1}$ and weight value $w_{1,2}$ may pass over eight the same activation locations during a convolution operation involving a top row of activation volume 404. However, weight value $w_{1,1}$ may never pass over or intersect with activation location $x_{1,9}$, and weight value $w_{1,2}$ may never pass over or intersect with activation location $x_{1,1}$. Hence, in order to continue with the convolution operation, and to maximize reuse of activation values, replacing module 108 may cause computing device 202 to replace, within LMD 142, secondary activation vectors 210 (e.g., activation vectors that may correspond to activation location $x_{1,1}$) with additional activation vectors 226 (e.g., activation vectors that may correspond to activation location $x_{1,9}$) included activation volume 154. This may be accomplished through a simple, efficient line read operation, and may not require complex muxing mechanisms of conventional solutions.

As will be described in greater detail below, one or more of modules 102 (e.g., directing module 106) may then cause MMU 144 to execute an additional MMO using additional filter matrix 224 (e.g., corresponding to weight values $w_{1,2}$) and activation matrix 206, reusing the activation vectors corresponding to activation locations shared by the two filter locations. This may result in a power-efficient production of partial output values corresponding to partial row 902 and entry 904.

Additional filter matrix 224 may include any filter matrix that may correspond to a different location within filters $K_1$ to $K_m$ than filter matrix 204. In some examples, additional filter matrix 224 may correspond to a location within filters $K_1$ to $K_m$ that adjoins a location within filters $K_1$ to $K_m$ corresponding to filter matrix 204. For example, when filter matrix 204 corresponds to a location $w_{1,1}$ within filters $K_1$ to $K_m$, additional filter matrix 224 may correspond to a location $w_{1,2}$ within filters $K_1$ to $K_m$.

Additional activation vectors 224 may include any activation vectors that may correspond to a different location within activation volume 154 than primary activation vectors 208 or secondary activation vectors 210. In some examples, additional activation vectors 226 may correspond to one or more locations within activation volume 154 that at least partially adjoin a location included in primary activation vectors 208 or secondary activation vectors 210. For example, when primary activation vectors 208 correspond to locations $x_{1,2}$ to $x_{1,8}$ and an activation vector included in secondary activation vectors 210 may correspond to location $x_{1,1}$, an activation vector included in additional activation vectors 226 may correspond to a location $x_{1,9}$ within activation volume 154.

Replacing module 108 may cause computing device 202 to replace filter matrix 204 with additional filter matrix 224 and secondary activation vectors 210 with additional activation vectors 226 in a variety of contexts. For example, replacing module 108 may access filter matrices 152 in data store 150 and may identify additional filter matrix 224. Likewise, replacing module 108 may access activation volume 154 in data store 150 and may identify additional activation vectors 226. Replacing module 108 may then cause computing device 202 to transfer, via a suitable data path (e.g., a data bus that may communicatively couple LMD 142 and data store 150), additional filter matrix 224 into multiplier registers 212 and additional activation vectors 226 into multiplicand registers 214. In some examples, additional filter matrix 224 may replace filter matrix 204 within multiplier registers 212. In additional or alternative examples, additional activation vectors 226 may replace secondary activation vectors 210 within multiplicand registers 214.

As mentioned above, replacing of secondary activation vectors 210 with additional activation vectors 226 may be accomplished via a simple line read of additional activation vectors 226 from activation volume 154, which may be far more power-efficient than complex memory management and/or muxing schemes employed by conventional convolution solutions. In some examples, one or more of modules 102 (e.g., maintaining module 104, directing module 106, replacing module 108, executing module 110, etc.) may arrange, within data store 150, values included in activation volume 154 such that replacing module 106 may access and/or transfer additional activation vectors 226 via a line read of a portion of data store 150.

Returning to FIG. 3, at step 340, one or more of the systems described herein may direct an MMU to execute an additional MMO using an additional filter matrix and an activation matrix. For example, executing module 110 may, as part of computing device 202, cause computing device 202 to direct MMU 144 to execute an additional MMO using additional filter matrix 224 and activation matrix 206.

In some examples, primary activation vectors 208 may still be included in activation matrix 206 and/or multiplicand registers 214 after replacing module 108 replaces secondary activation vectors 210 with additional activation vectors 226. Therefore, when directing module directs MMU 144 to execute the additional MMO using additional filter matrix 224 and activation matrix 206, MMU 144 may reuse primary activation vectors 208 during the additional MMO. This may be referred to as "spatial reuse" because MMU 144 may reuse many of the same cached activation values (e.g., $x_{1,2}$ to $x_{1,8}$) in two consecutive MMOs to determine partial output values for two adjoining filter weight values (e.g., $w_{1,1}$ and $w_{1,2}$).

Executing module 110 may cause computing device 202 to direct MMU 144 to execute the additional MMO using additional filter matrix 224 and activation matrix 206 in a variety of contexts. For example, directing module 106 may produce a secondary result matrix (e.g., secondary result matrix 228) by directing MMU 144 to execute the additional MMO using additional filter matrix 224 as multiplier matrix 216 and activation matrix 206 as multiplicand matrix 218. Executing module 110 may cause computing device 202 to direct MMU 144 to execute the additional MMO in any suitable way including, but not limited to, any of the ways of directing MMU 144 to execute an MMO described herein.

In some embodiments, executing module 110 may cause MMU 144 to execute the additional MMO by causing MMU 144 to determine dot products of the activation vectors included in activation matrix 206 and the filter vectors included in additional filter matrix 224. In some examples, directing module 106 may cause MMU 144 to execute the MMU by determining dot products of the activation vector(s) included in activation matrix 206 (including additional activation vectors 226) and the filter vectors included in additional filter matrix 224. In some examples, executing module 110 may cause MMU 144 to execute the additional MMU in such a way that values within secondary result matrix 228 and values within primary result matrix 222 may align with each other such that, when secondary result matrix 228 may be accumulated with (e.g., added to) primary result matrix 222, a result of accumulating secondary result matrix 228 with primary result matrix 222 may form at least part of output activations 230. For example, directing module 106 may direct MMU 144 to execute an MMO by broadcasting each activation vector included in primary activation vectors 208 to each filter vector included in additional filter matrix 224 prior to broadcasting each activation vector included in primary activation vectors 208 to each filter vector included in additional filter matrix 224.

In some examples, in order to accomplish the foregoing alignment of primary result matrix 222 and secondary result matrix 228, one or more of modules 102 (e.g., directing module 106, replacing module 108, executing module 110, etc.) may update, in response to replacing module 108 replacing secondary activation vectors 210 with additional activation vectors 226, a read offset associated with the secondary set of activation vectors to indicate (e.g., point to, reference, indicate a location within LMD 142 of, etc.) an activation vector included in primary activation vectors 208.

This updating of the read offset may cause MMU 144 to, during an MMO operation using additional filter matrix 224 as multiplier matrix 216 and activation matrix 206 (including primary activation vectors 208 and additional activation vectors 226) as multiplicand matrix 218, broadcast each of the activation vectors included in primary activation vectors 208 to each of the filer vectors included in additional filter matrix 224 prior to broadcasting additional activation vectors 226 to each of the filter vectors included in additional filter matrix 224. One or more of modules 102 (e.g., replacing module 108, directing module 106, etc.) may further, once MMU 144 has broadcast each of primary activation vectors 208 to each filter vector included in additional filter matrix 224 during the MMO, direct MMU 144 to broadcast additional activation vectors 226 to each of additional activation vectors 226 during the MMO.

Figure 11:
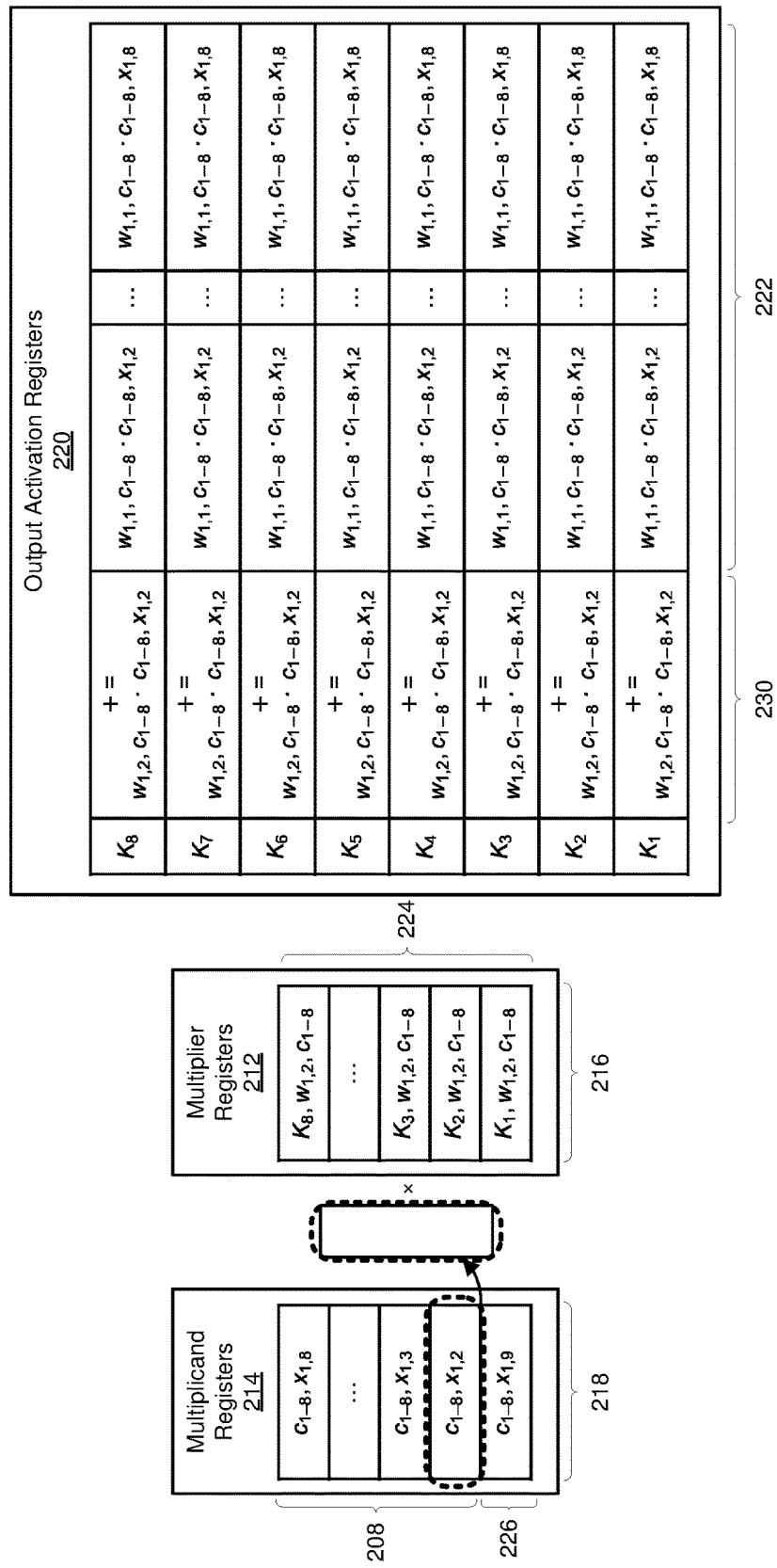

By way of illustration, FIG. 11 shows a view 1100 of a ninth cycle associated with hardware accelerator 140, MMU 144, and/or computing device 202 continuing from the eighth cycle illustrated by FIG. 8. As shown, replacing module 108 has replaced filter matrix 204 within multiplier registers 212 with additional filter matrix 224 and secondary activation vectors 210 within multiplicand registers 214 with additional activation vectors 226 as described in greater detail above. Furthermore, or more of modules 102 (e.g., directing module 106, replacing module 108, executing module 110, etc.) has updated the read offset associated with secondary activation vectors 210 to indicate an activation vector included in primary activation vectors 208 (e.g., $c_{1-8}$, $x_{1,2}$). Hence, as shown in FIG. 11, during the ninth cycle, directing module 106 has broadcast the indicated activation vector $c_{1-8}$, $x_{1,2}$ to each of filter vectors $K_{1-8}$, $w_{1,2}$, $c_{1-8}$ included in filters $K_1$ to $K_8$. At a conclusion of the ninth cycle, MMU 144 may have generated dot product values corresponding to activation vector $c_{1-8}$, $x_{1,2}$ and each of the filter vectors included in additional filter matrix 224. These values may correspond to at least a portion of secondary result matrix 228.

Furthermore, as shown in FIG. 11, executing module 110 may further accumulate values included in corresponding locations in secondary result matrix 228 and primary result matrix 222 to form output activations 230. In some examples, an "output activation" or "output activation value" may include at least part of an output value for a particular location in an activation volume (e.g., activation volume 154, activation volume 404, etc.) that has been convolved with a filter (e.g., filter 402). For example, returning to output table 406 in FIG. 9, output value $O_{1,1}$ may be a sum of an element-wise multiplication of weight values included in filter 402 and activation vectors corresponding to location 408 when the filter is at location 408 (e.g., $w_{1,1} \times x_{1,1} + w_{1,2} \times x_{1,2} + w_{1,3} \times x_{1,3} + w_{2,1} \times x_{2,1} + w_{2,2} \times x_{2,2} + w_{2,3} \times x_{2,3} + w_{3,1} \times x_{3,1} + w_{3,2} \times x_{3,2} + w_{3,3} \times x_{3,3}$). Furthermore, as described above, the systems and methods described herein may determine values for at least row 410, partial row 902, and entry 904. The systems and methods described herein may include these values as part of primary result matrix 222 and secondary result matrix 228.

Executing module 110 may determine output activations 230 based on a result of accumulating secondary result matrix 228 and primary result matrix 222. As noted above, primary result matrix 222 and secondary result matrix 228 may each include partial products for output activations corresponding to a set of filters. Additionally, where a matrix A and a matrix B may have the same dimensions, a sum of matrix A and matrix B may be denoted by A+B, and may be determined by adding corresponding elements of A and B. Hence, corresponding elements in primary result matrix 222 and secondary result matrix 228 may be added together to at least partially determine a corresponding output activation value included in output activations 230.

In some examples, executing module 110 may store secondary result matrix 228 within a set of registers included in LMD 142 that may be distinct from output activation registers 220. Once executing module 110 has produced secondary result matrix 228, directing module 106 may then accumulate (e.g., add) secondary result matrix 228 and primary result matrix 222 and store a result of accumulating secondary result matrix 228 and primary result matrix 222 within output activation registers 220.

Figure 12:
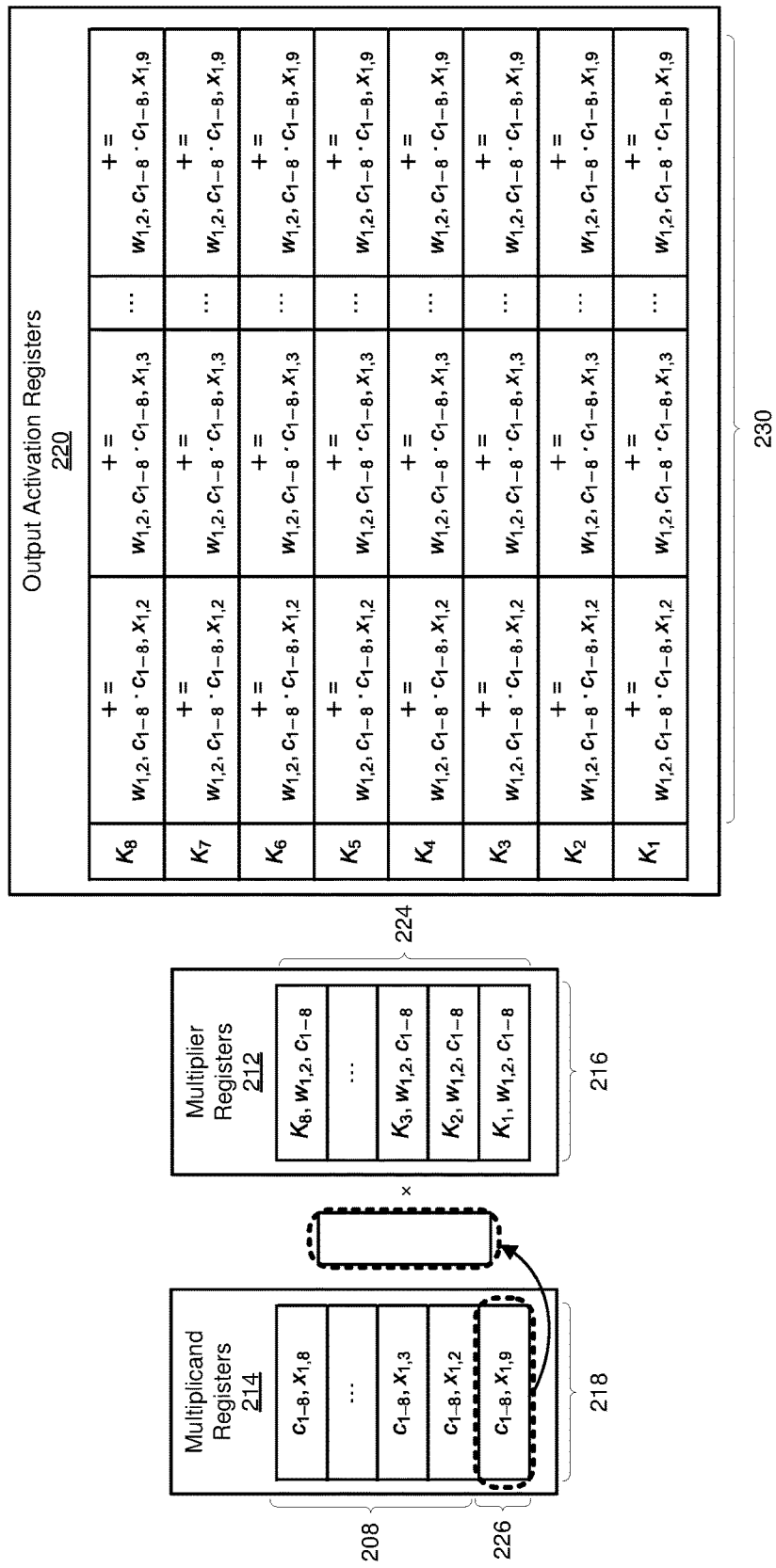

In some embodiments, executing module 110 may accumulate secondary result matrix 228 and primary result matrix 222 in-place within output activation registers 220. For example, as shown in FIGS. 11 and 12, as MMU 144 executes the MMO using additional filter matrix 224 as multiplier matrix 216 and activation matrix 206 (including additional activation vectors 226 and primary activation vectors 208) as multiplicand matrix 218, directing module 106 may accumulate values of secondary result matrix 228 with values stored in output activation registers 220 that correspond to respective values included in primary result matrix 222. This may conserve limited memory resources within output activation registers 220 while also efficiently and accurately accumulating partial products to at least partially determine output activation values (e.g., output activations 230) corresponding to the filters and the activation volume.

By way of illustration, FIG. 11 includes a view 1100 that shows output activation registers 220 after directing module 106 has caused MMU 144 to broadcast activation vector ($c_{1-8}$, $x_{1,2}$) to each filter vector included in additional filter matrix 224. As shown, executing module 110 may accumulate these dot product values with respective dot product values in primary result matrix 222. Such an accumulation may be indicated in FIGS. 11-12 and 15-16 by a "+=" symbol. A "+=" symbol may be included in each cell (e.g., register or set of registers) of output activation registers 220 that includes a dot product value included in secondary result matrix 228 that has or may be accumulated with a corresponding dot product value included in primary result matrix 222 to form a corresponding output activation value in output activations 230.

For example, as shown in FIG. 8, at a conclusion of the MMO (e.g., the MMO involving filter matrix 204 and activation matrix 206), a set of registers included in output activation registers 220 may include a value corresponding to an eighth column and eighth row in primary result matrix 222. This value may correspond to ($K_1$, $w_{1,1}$, $c_{1-8} \cdot c_{1-8}$, $x_{1,8}$). At the conclusion of the additional MMO (e.g., an MMO involving additional filter matrix 224 and activation matrix 206), as shown in FIG. 12, that set of registers may include a value that corresponds to a value of $(K_1, w_{1,1}, c_{1-8} \cdot c_{1-8}, x_{1,8}) + (K_1, w_{1,2}, c_{1-8} \cdot c_{1-8}, x_{1,9})$.

Hence, executing module 110 may accumulate each value included in secondary result matrix 228 with a corresponding value in primary result matrix 222 in-place within output activation registers 220, and may store a result of accumulating the secondary result matrix 228 with primary result matrix 222 within output activation registers 220. Thus, at a conclusion of the MMO based on filter matrix 204 and activation matrix 206, output activation registers 220 may include output activations 230.

During cycles subsequent to the ninth cycle illustrated by FIG. 11, executing module 110 may cause MMU 144 to further update the read offset such that, during each cycle, MMU 144 may broadcast at least one of the remaining activation vectors included in primary activation vectors 208 to each of the filter vectors included in additional filter matrix 224. Thus, after seven cycles of the additional MMO, MMU 144 may have broadcast all the activation vectors included in primary activation vectors 208 to all the filter vectors included in additional filter matrix 224. Executing module 110 may further update the read offset to indicate additional activation vectors 226. Thus, directing module 106 may cause MMU 144 to broadcast activation vectors included in additional activation vectors 226 to additional filter matrix 224.

To illustrate, FIG. 12 includes a view 1200 that illustrates a sixteenth cycle associated with hardware accelerator 140, MMU 144, and/or computing device 202. As shown, executing module 110 may have caused MMU 144 to broadcast (e.g., during one or more of a tenth cycle through a fifteenth cycle) each activation vector included in primary activation vectors 208 to each filter vector included in additional filter matrix 224, thereby producing seven columns of output activations 230 (e.g., by accumulating values included in secondary result matrix 228 with corresponding values in primary result matrix 222). Furthermore, executing module 110 may have further updated the read offset to indicate additional activation vectors 226, and directed MMU 144 to broadcast additional activation vectors 226 (e.g., $c_{1-8}$, $x_{1,9}$) to each filter vector included in additional filter matrix 224, thereby producing an eighth column of output activations 230 (e.g., by accumulating values included in an eighth column of secondary result matrix 228 with corresponding values in an eighth column of primary result matrix 222).

In at least this way, one or more of modules 102 (e.g., executing module 110) may determine, via MMU 144, dot products for each of the activation vectors included in primary activation vectors 208 prior to determining dot products for each of the activation vectors included in additional activation vectors 226. This may enable values in secondary result matrix 228 to align with values in primary result matrix 222 such that, as will be described in greater detail below, one or more of modules 102 (e.g., executing module 110) may accumulate secondary result matrix 228 and primary result matrix 222 to form output activations 230 within output activation registers 220.

Although some examples herein may illustrate convolutional layers and/or filters having a stride length of one, in additional examples, the systems and methods described herein may be applied to convolutional layers, activation volumes, and/or filters that may have any suitable stride length. FIGS. 13-16 show example views that may illustrate an application of the systems and methods described herein to a convolutional layer, activation volume, and/or set of filters having a stride length of two.

Figure 13:
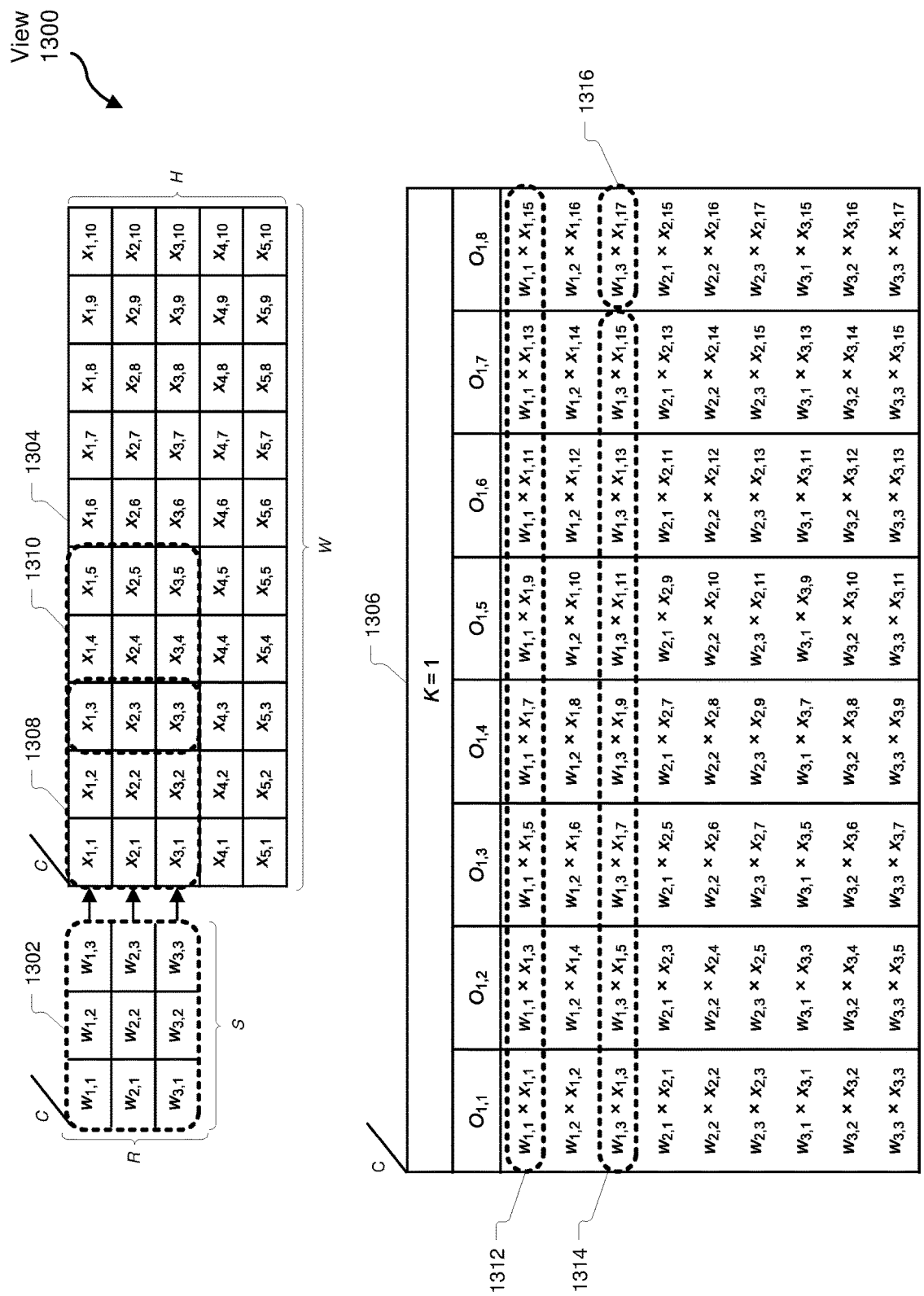
FIGS. 13-16 illustrate determining, via an MMU included in a hardware accelerator, a set of output activation values for a convolutional layer of an artificial neural network using a set of filter matrices, an activation volume, and a stride of 2 as described herein.

FIG. 13 shows a view 1300 that includes a filter 1302 and an activation volume 1304 that may be similar to filter 402 and activation volume 404 in FIG. 4. However, in FIG. 13, filter 1302 and/or a convolutional layer associated with filter 1302 may have a stride length of two. Note that, as mentioned above in reference to activation volume 404, although activation volume 1304 may only show 5×10 activations in FIG. 13, activation volume 1304 may have any suitable dimensions and may extend any distance in any direction.

FIG. 13 also includes an output table 1306 that includes calculations corresponding to a pass of filter 1302 across activation volume 1304 with a stride length of two (e.g., two pixels). As shown, to determine output values for a first row of activation volume 1304 and filter 1302 (e.g., values $O_{1,1}$ to $O_{1,8}$), filter 1302 may be virtually placed at a set of locations within activation volume 1304. When filter 1302 may be placed at location 1308, filter 402 may be convolved with activation vectors included in activation volume 1304 corresponding to location 1308, similar to operations described above in reference to FIG. 4. However, as filter 1302 continues to be passed across activation volume 1304 with a stride of two instead of one, filter 1302 may be convolved with a different set of activation vectors than in the example illustrated in FIG. 4.

For example, as shown in output table 1306, output value $O_{1,1}$, corresponding to location 1308, may be determined in accordance with $w_{1,1} \times x_{1,1} + w_{1,2} \times x_{1,2} + w_{1,3} \times x_{1,3} + w_{2,1} \times x_{2,1} + w_{2,2} \times x_{2,2} + w_{2,3} \times x_{2,3} + w_{3,1} \times x_{3,1} + w_{3,2} \times x_{3,2} + w_{3,3} \times x_{3,3}$. However, output value $O_1$, corresponding to location 1310, may be determined in accordance with $w_{1,1} \times x_{1,3} + w_{1,2} \times x_{1,4} + w_{1,3} \times x_{1,5} + w_{2,1} \times x_{2,3} + w_{2,2} \times x_{2,4} + w_{2,3} \times x_{2,3} + w_{3,1} \times x_{3,1} + w_{3,2} \times x_{3,2} + w_{3,3} \times x_{3,3}$.

As may be clear from a comparison of row 1312 and partial row 1314, there may be reuse of activation values included in elements included in row 1312 in elements included in partial row 1314. For example, the second column from the left in row 1312 includes $w_{1,1} \times x_{1,3}$, and the leftmost column in partial row 1314 includes $w_{1,1} \times x_{1,3}$, which may indicate an opportunity for reuse of the activation value of $x_{1,3}$. Indeed, the only activation value included in row 1312 and not included in partial row 1314 may be an activation value associated with location $x_{1,17}$ shown in entry 1316.

It may also be apparent from the foregoing that, in accordance with the systems and methods described herein, an amount of reuse available for a particular convolution operation may be related to a stride length. For example, as shown in output table 1306 in FIG. 13, each of the top three rows of partial output values in output table 1306 correspond to weight values in a top row of filter 1302 (e.g., row $w_{1,*}$). As shown, activation values in row 1312 overlap with activation values in partial row 1314, but not activation values in the intervening row. This may indicate that, when a stride length of a 3×3 filter (e.g., filter 1302) is two, there may be reuse of activation values for only one of three rows corresponding to row $w_{1,*}$.

This may be contrasted with output table 406, where it may be apparent that, when a stride length is one, there may be activation value reuse for two of the three rows in filter 402 (e.g., activation values used in determining partial output values for weight values in row $w_{1,*}$, may be reused in determining partial output values for weight values in rows $w_{2,*}$, and $w_{3,*}$). Likewise, when a filter has dimensions of 5×5 and a stride of one, there may be reuse for four out of five of the rows of the filter. When a 5×5 filter has a stride of two, there may be reuse for three out of five rows of the filter.

In order to accommodate different stride lengths, in some embodiments, one or more of modules 102 (e.g., maintaining module 104, replacing module 108, replacing module 108, etc.) may select primary activation vectors 208, secondary activation vectors 210, additional filter matrix 224, and/or additional activation vectors 226 based on a predetermined stride length associated with a convolutional layer of an ANN.

Figure 14:
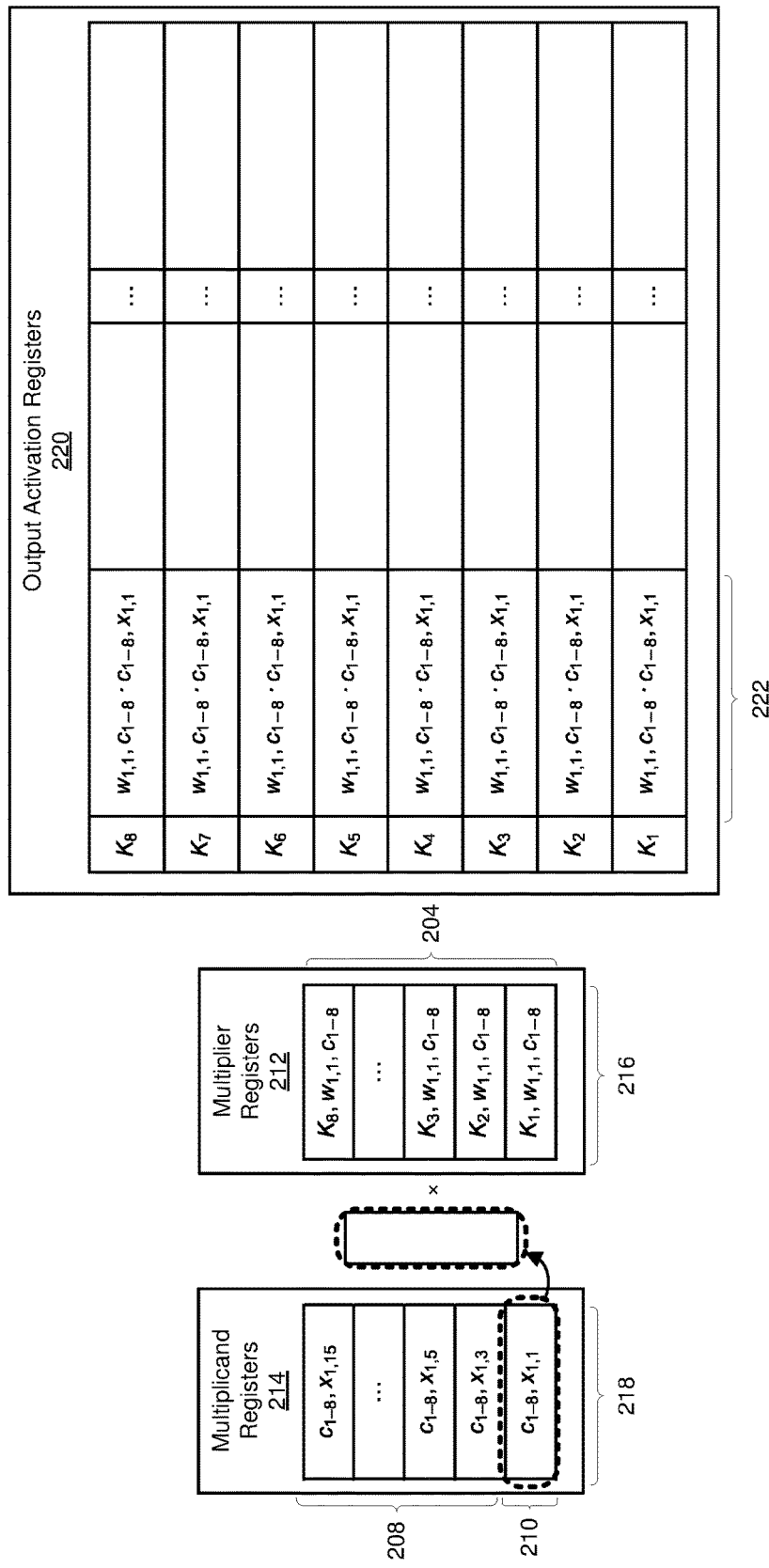
Figure 15:
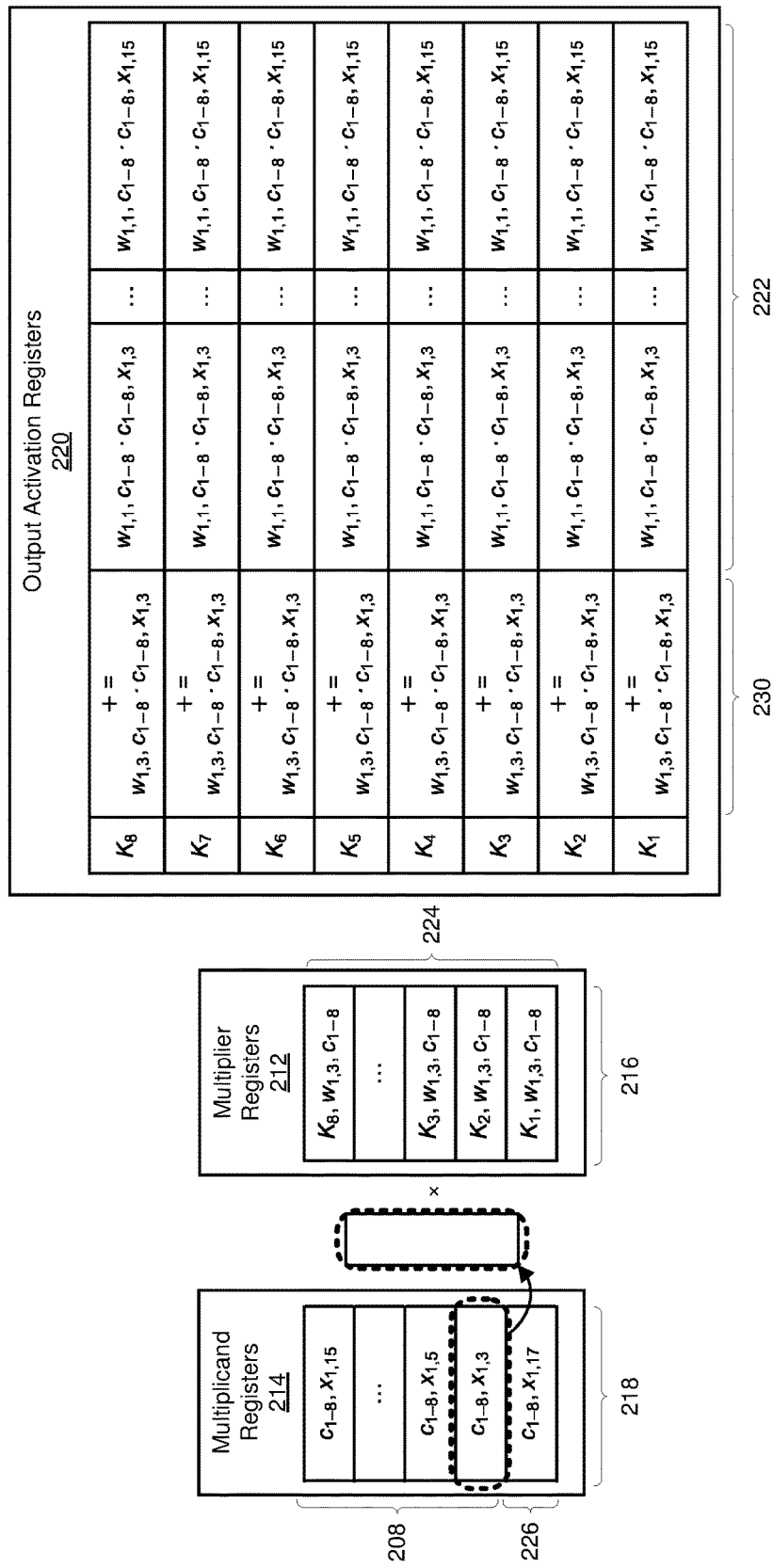
Figure 16:
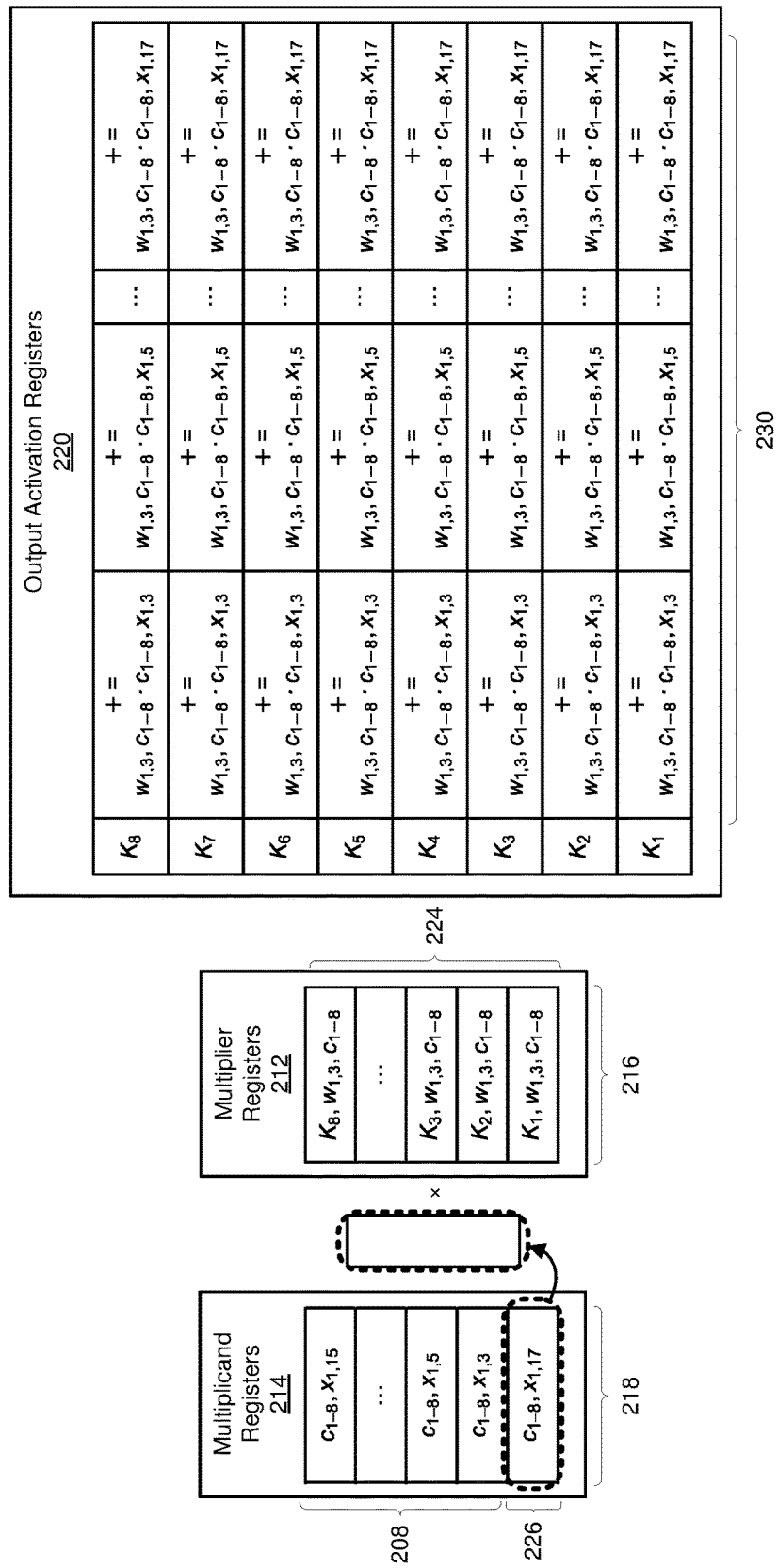

To illustrate, FIGS. 14-16 show a configuration of components included in hardware accelerator 140 (e.g., multiplier registers 212, multiplicand registers 214, and output activation registers 220) over a set of sixteen cycles. FIG. 14 includes a view 1400 of multiplier registers 212, multiplicand registers 214, and output activation registers 220 after a first cycle. As shown, one or more of modules 102 (e.g., maintaining module 104, replacing module 108, replacing module 108, etc.) may have selected filter matrix 204, activation matrix 206 (e.g., primary activation vectors 208 and secondary activation vectors 210) based on a stride length of two. For example, maintaining module 104 may have selected filter matrix 204 and activation matrix 206 based on a stride length of two and may have retrieved, from data store 150, filter matrix 204 into multiplier registers 212 and activation matrix 206 into multiplicand registers 214.

Continuing with this example, filter matrix 204 may include filter vectors corresponding to filter location $w_{1,1}$ in eight filters ($K_1$ to $K_8$), each filter having a channel depth of eight channels (e.g., $c_1$ to $c_8$). Likewise, instead of locations $x_{1,1}$ to $x_{1,8}$ as in other examples herein that illustrate stride lengths of one, secondary activation vectors 210 in FIG. 14 may include an activation vector corresponding to location $x_{1,1}$, while primary activation vectors 208 may include activation vectors corresponding to locations $x_{1,3}$, $x_{1,5}$, $x_{1,7}$, $x_{1,9}$, $x_{1,11}$, $x_{1,13}$, and $x_{1,15}$. Each of these locations may correspond to positions of filter location $w_{1,1}$ as filter 1302 is passed over activation volume 1304.

FIG. 14 also shows a first column of primary result matrix 222. Directing module 106 may have generated this portion of primary result matrix 222 by directing MMU 144 to execute an MMO using filter matrix 204 as multiplier matrix 216 and activation matrix 206 as multiplicand matrix 218. MMU 144 may have broadcast secondary activation vectors 210 (e.g., $c_{1-8}$, $x_{1,1}$) to each of the filter vectors included in filter matrix 204, thereby generating each value of primary result matrix 222 shown in FIG. 14. Directing module 106 may then have stored primary result matrix 222 within output activation registers 220.

FIG. 15 includes a view 1500 of components of hardware accelerator 140 after a ninth cycle where a stride length may be two. During the second through eighth cycles, MMU 144 may have continued executing the MMO by broadcasting each of primary activation vectors 208 to each filter vector included in filter matrix 204. Directing module 106 may have continued storing each newly generated portion of primary result matrix 222 within output activation registers 220.

Then, replacing module 108 may have selected additional filter matrix 224 based on the stride length of two and fetched, from data store 150 to multiplier registers 212, additional filter matrix 224. Likewise, replacing module 108 may have selected additional activation vectors 226 based on the stride length of two and replaced, within multiplicand registers 214 included in LMD 142, primary activation vectors 208 with additional activation vectors 226.

Executing module 110 may have also updated a read offset associated with secondary activation vectors 210 to indicate an activation vector included in primary activation vectors 208 (e.g., $c_{1-8}$, $x_{1,3}$). Executing module 110 may then have begun generating secondary result matrix 228 by directing MMU 144 to execute an additional MMO using additional filter matrix 224 as multiplier matrix 216 and activation matrix 206 (including primary activation vectors 208 and additional activation vectors 226) as multiplicand matrix 218. As shown in FIG. 15, MMU 144 may have begun to execute the additional MMO by broadcasting an activation vector included in primary activation vectors 208 (e.g., $c_{1-8}$, $x_{1,3}$) to each filter vector included in additional filter matrix 224. Directing module 106 may then have determined a portion of output activations 230 by accumulating the generated portion of secondary result matrix 228 with a corresponding portion of primary result matrix 222 stored in output activation registers 220, as described above.

Continuing with this example, FIG. 16 shows a view 1600 of components of hardware accelerator 140 after a sixteenth cycle where a stride length may be two. During the tenth through fifteenth cycles, MMU 144 may have continued executing the additional MMO by broadcasting each of primary activation vectors 208 to each filter vector included in additional filter matrix 224. Executing module 110 may have continued determining a portion of output activations 230 by accumulating newly generated portions of secondary result matrix 228 with corresponding portions of primary result matrix 222 stored in output activation registers 220.

During the sixteenth cycle, one or more of modules 102 (e.g., directing module 106, executing module 110, etc.) may have updated the read offset to indicate additional activation vectors 226, and MMU 144 may have concluded the additional MMO by broadcasting additional activation vectors 226 to each filter vector included in additional filter matrix 224. Executing module 108 may then have completed determining output activations 230 by accumulating the newly generated portion of secondary result matrix 228 and primary result matrix 222 stored in output activation registers 220, as described above.

In some embodiments, one or more of modules 102 may utilize one or more elements included in example system 100 and/or example system 200 to realize further reuse during convolution operations by executing a set of MMOs in accordance with an outer product sequence of operations. For example, one or more of modules 102 may, when executed by computing device 202, enable computing device 202 to perform one or more operations to execute a set of MMOs in accordance with an outer product sequence of operations.

In some examples, an "outer product sequence of operations" or "outer product MMO" may include a sequence of matrix operations modeled after a method of determination of an outer product of two coordinate vectors. An outer product of two vectors u and v may be a tensor product u⊗v, which may be a matrix w, where $w_{i,j}=u_iv_j$. In some examples, each tensor vector u and v may each include a set of one or more matrices. Thus, an outer product sequence of operations may include a sequence of MMOs that produce a matrix w such that $w_{i,j}=u_iv_j$, where each $w_{i,j}$ is a result matrix produced by an MMO using a matrix corresponding to $u_i$ as a multiplier matrix and a matrix corresponding to $v_j$ as a multiplicand matrix.

FIGS. 17-26 illustrate an example set of MMOs that one or more of modules 102 may cause MMU 144 to execute in accordance with an outer product sequence of operations. In the examples illustrated in FIGS. 17-26, all MMOs may be executed by MMU 144, which may include an 8×8×8 matrix multiplication block. Hence, MMU 144 may be configured to execute GEMM operations using a multiplier matrix having dimensions of m×k and a multiplicand matrix having dimensions of k×n, such that m=k=n=8. Additionally, all filters and/or activation volumes in the examples illustrated in FIGS. 17-26 may have a channel depth of eight channels (e.g., $c_1$ to $c_8$). Note that the examples illustrated in FIGS. 17-26 are illustrative only, and not intended to limit the scope of this disclosure. In other examples, MMU 144 may be configured to execute any suitable MMO, using any suitable matrices having any suitable dimensionality as a multiplier matrix and/or a multiplicand matrix. Additionally, in some examples, alternative outer product formulations may be used, such as outer product formulations involving a different number of input matrices.

Figure 17:
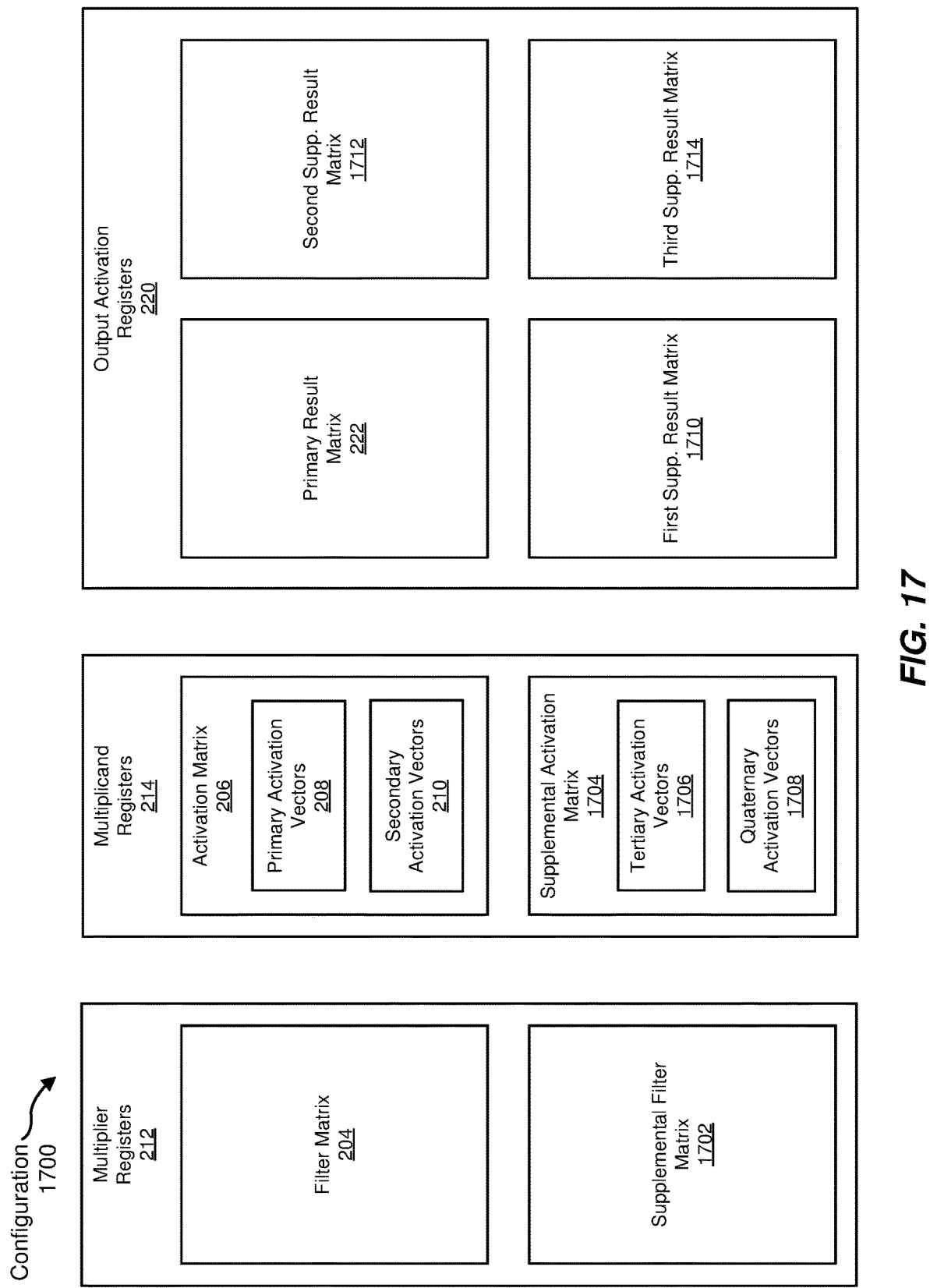
FIGS. 17-26 illustrate determining a set of output activation values for a convolutional layer of an artificial neural network by determining, via an MMU, a result of one or more outer product multiplication operations as described herein.

FIG. 17 illustrates a configuration 1700 of hardware accelerator 140 that includes additions to multiplier registers 212, multiplicand registers 214, and output activation registers 220 that may further enable an outer product sequence of operations as described herein. As shown, multiplier registers 212 may include sufficient additional registers to accommodate a supplemental filter matrix 1702. Supplemental filter matrix 1702 may include a supplemental set of filter vectors corresponding to the filter location included in the set of filters associated with the convolutional layer of the ANN.

In other words, supplemental filter matrix 1702 may include a supplemental filter matrix that may include a set of filter vectors that may correspond to the same filter location as filter matrix 204, but an additional set of m filters. For example, as shown in FIG. 18, when filter matrix 204 includes a set of filter vectors corresponding to filter location $w_{1,1}$ included in each of filters $K_1$ to $K_8$, supplemental filter matrix 1702 may include a set of filter vectors that may also correspond to filter location $w_{1,1}$, but as included in each of filters $K_9$ to $K_{16}$.

As further shown in FIG. 17, multiplicand registers 214 may include sufficient additional registers to accommodate a supplemental activation matrix 1704 that may include tertiary activation vectors 1706 and quaternary activation vectors 1708. Like supplemental filter matrix 1702, supplemental activation matrix 1704 may include a supplemental set of activation vectors that may correspond to an additional set of locations within an activation volume (e.g., activation volume 154) that may be different from the set of locations within the activation volume included in activation matrix 206. The activation vectors included in supplemental activation matrix 1704 may be divided into a tertiary set of activation vectors (e.g., tertiary activation vectors 1706) and a quaternary set of activation vectors (e.g., quaternary activation vectors 1708), much as activation matrix 206 may be divided into a primary set of activation vectors (e.g., primary activation vectors 208) and a secondary set of activation vectors (e.g., secondary activation vectors 210).

Figure 18:
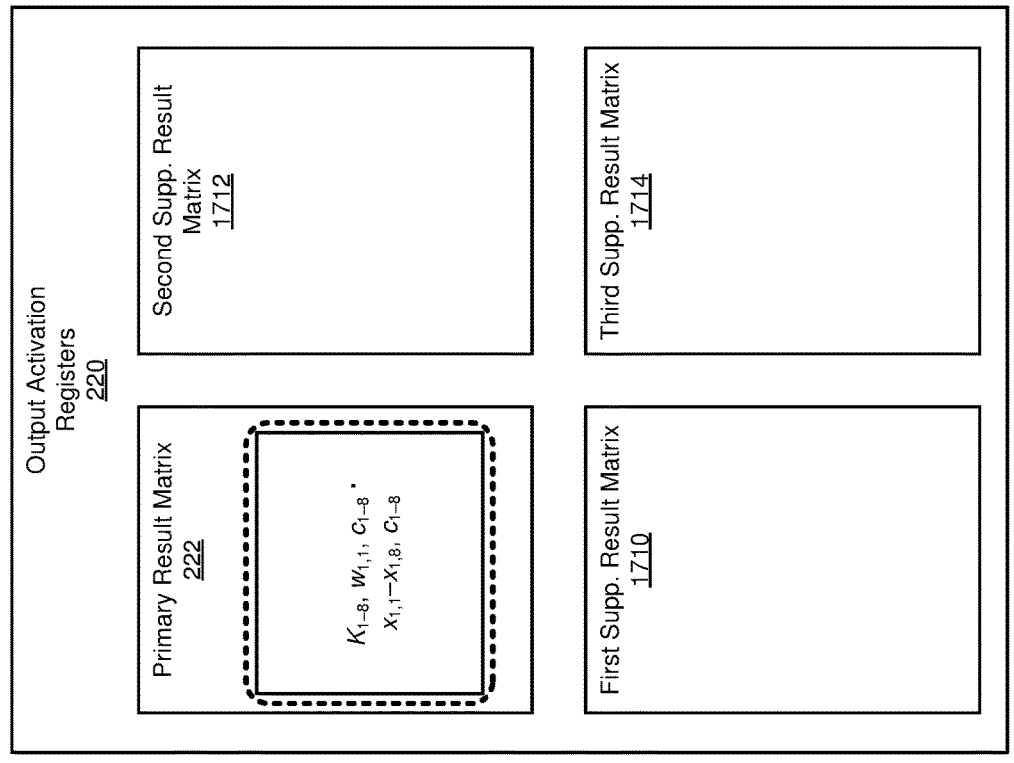
Figure 19:
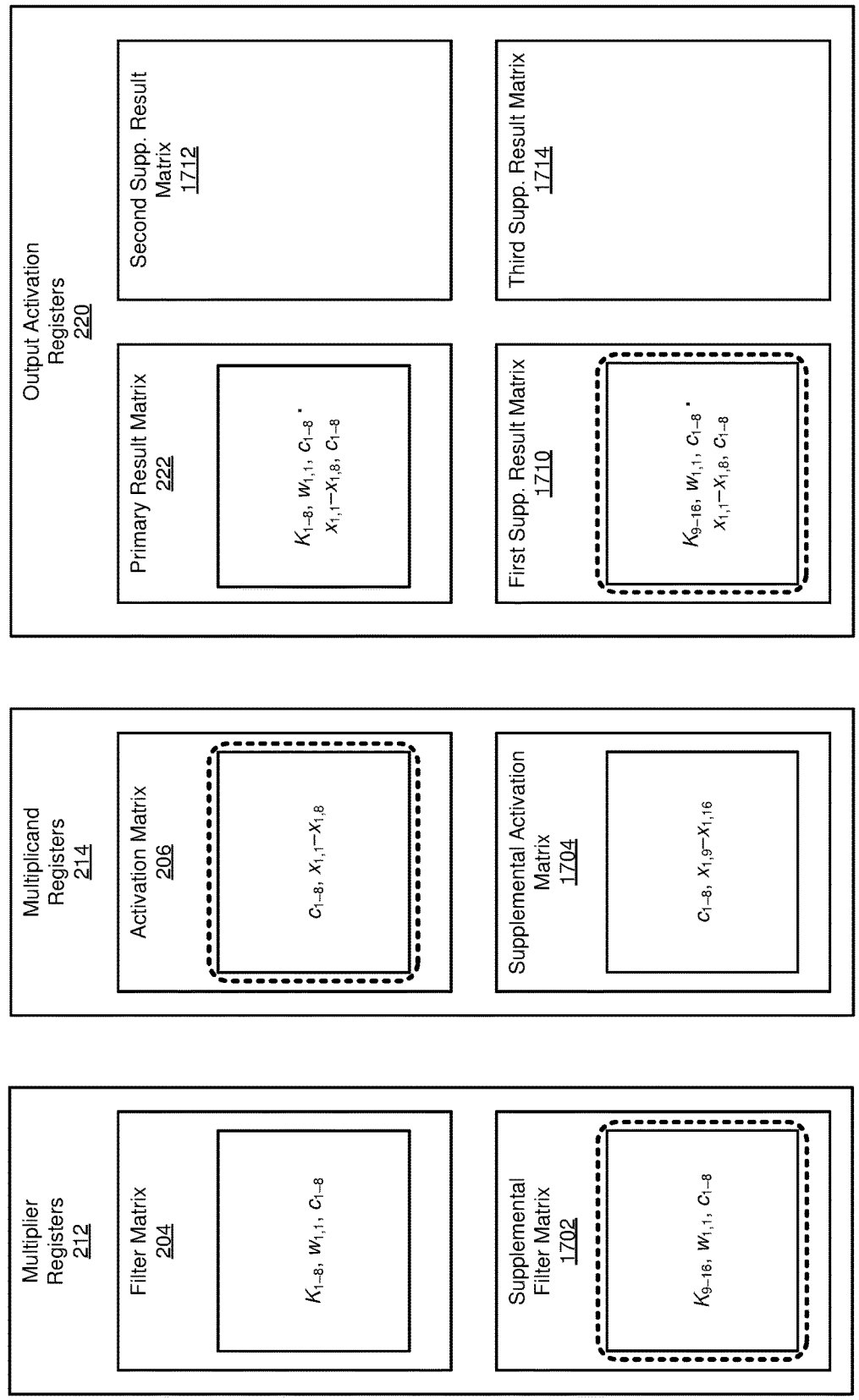
Figure 20:
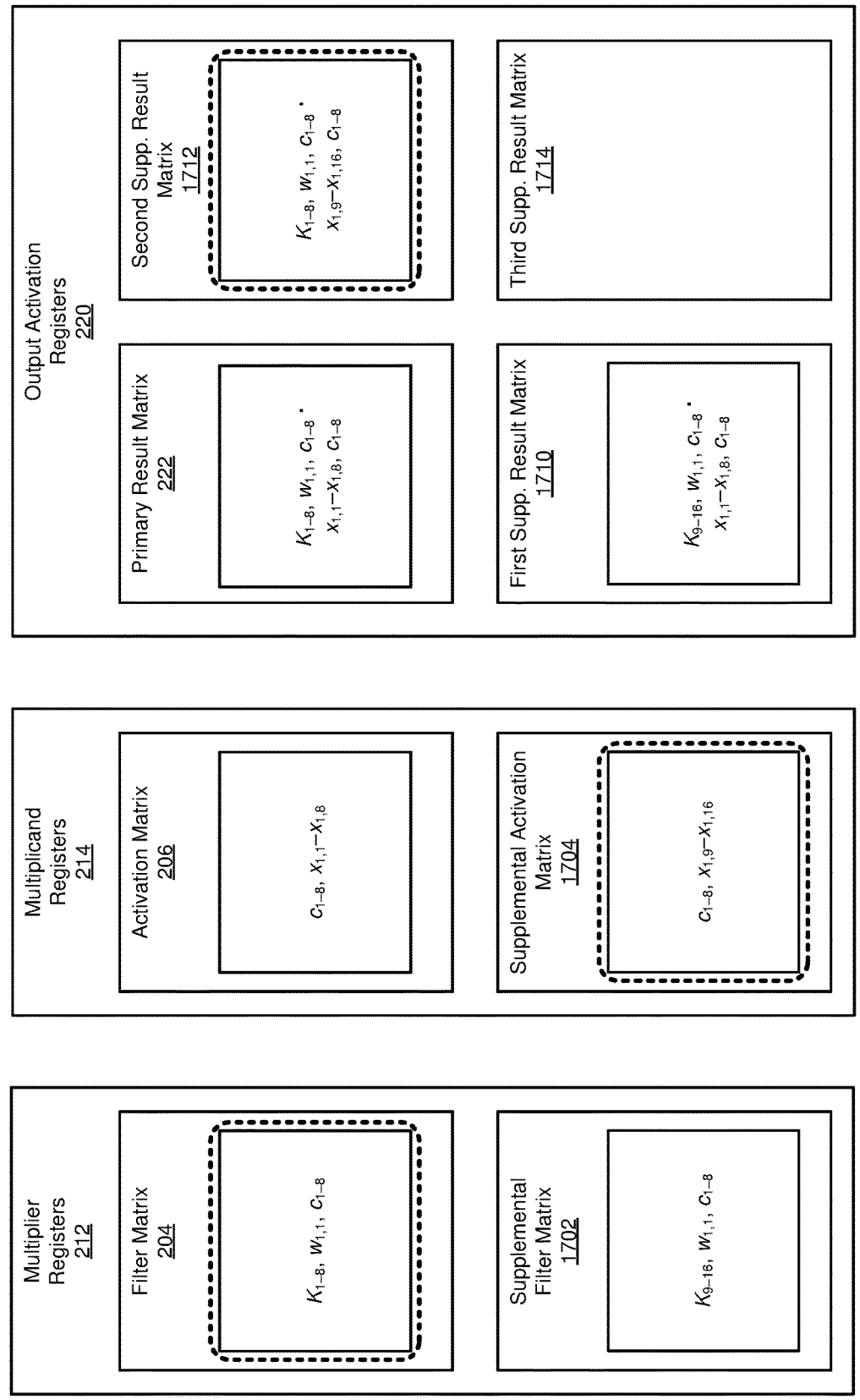
Figure 21:
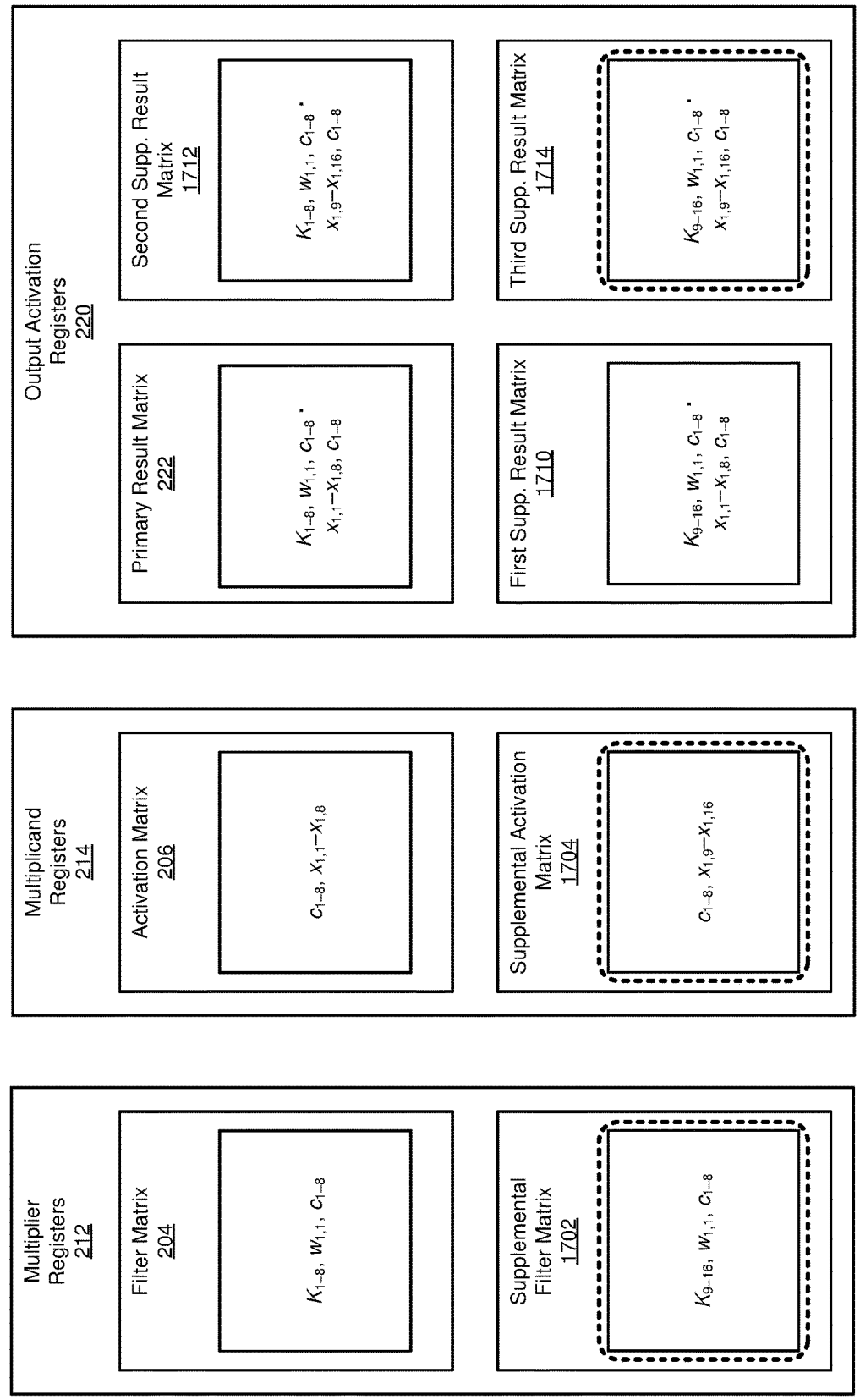

As an illustration, FIG. 18 shows a view 1800 of configuration 1700. In this illustration, when activation matrix 206 includes activation vectors corresponding to activation locations $x_1$ to $x_8$, supplemental activation matrix 1704 may include activation vectors corresponding to activation locations $x_{1,9}$ to $x_{1,16}$.

Additionally, output activation registers 220 may include sufficient registers to accommodate, in addition to primary result matrix 222, a first supplemental result matrix 1710, a second supplemental result matrix 1712, and a third supplemental result matrix 1714.

In some embodiments, one or more of modules 102 (e.g., maintaining module 104, replacing module 108, etc.) may retrieve, from data store 150 into LMD 142 included in hardware accelerator 140, supplemental filter matrix 1702 and supplemental activation matrix 1704 in any suitable way including, without limitation, any of the ways described herein in reference to maintaining module 104 retrieving filter matrix 204 and/or activation matrix 206 from data store 150 into LMD 142 (e.g., into multiplier registers 212 and/or multiplicand registers 214).

In additional embodiments, once maintaining module 104 has retrieved filter matrix 204, supplemental filter matrix 1702, activation matrix 206, and supplemental activation matrix 1704, one or more of modules 102 (e.g., directing module 106) may determine the set of output activation values for the convolutional layer of the ANN by determining, via MMU 144, a result of an outer product multiplication operation based on filter matrix 204, supplemental filter matrix 1702, activation matrix 206, and supplemental activation matrix 1704.

For example, as shown in FIG. 18, an MMU (e.g., MMU 144) may be configured to perform MMOs in a form of 8×8×8. Filter matrix 204 may include a set of filter vectors corresponding to a filter location $w_{1,1}$ within filters $K_1$ to $K_8$, where each filter may have a corresponding channel depth of eight channels (e.g., $c_1$ to $c_8$). Likewise, activation matrix 206 may correspond to locations $x_{1,1}$ to $x_{1,8}$ within an activation volume (e.g., activation volume 154) having a channel depth of eight channels (e.g., $c_1$ to $c_8$).

Like filter matrix 204, supplemental filter matrix 1702 may include a set of filter vectors corresponding to filter location $w_{1,1}$ with a channel depth of eight (e.g., $c_1$ to $c_8$). However, the filter vectors in supplemental filter matrix 1702 may correspond to a different set of filters (e.g., $K_9$ to $K_{16}$) than the filter vectors included in filter matrix 204.

Also, supplemental activation matrix 1704 may include activation vectors that correspond to different locations within the activation volume from locations corresponding to activation matrix 206. As shown, supplemental activation matrix 1704 may include activation vectors corresponding to locations $x_{1,9}$ to $x_{1,16}$.

Executing module 110 may further determine the result of the outer product multiplication operation by generating primary result matrix 222 in any of the ways describe herein. For example, executing module 110 may cause directing module 106 to direct MMU 144 to execute an MMO using filter matrix 204 as multiplier matrix 216 and activation matrix 206 as multiplicand matrix 218 in any of the ways described herein. At the conclusion of the MMO, primary result matrix 222 may include results of dot product operations involving each filter vector included in filter matrix 204 and each activation vector included in activation matrix 206. In other words, although denoted differently in FIG. 18 (e.g., $K_{1-8}$, $w_{1,1}$, $c_{1-8} \cdot x_{1,1} \text{-} x_{1,8}$, $c_{1-8}$), primary result matrix 222 in FIG. 18 may be similar to primary result matrix 222 in FIG. 8. Other MMOs described herein with reference to outer product multiplication operations may produce similar result matrices.

Executing module 110 may further determine the result of the outer product multiplication operation by generating first supplemental result matrix 1710. Executing module 110 may generate first supplemental result matrix 1710 by directing MMU 144 to execute a first supplemental MMO using supplemental filter matrix 1702 as multiplier matrix 216 and reusing activation matrix 206 as multiplicand matrix 218. As shown in view 1900 included in FIG. 19, at a conclusion of the first supplemental MMO, first supplemental result matrix 1710 may include results of dot product operations involving each filter vector included in supplemental filter matrix 1702 and each activation vector included in activation matrix 206 (e.g., $K_{9-16}$, $w_{1,1}$, $c_{1-8} \cdot x_{1,1} \text{-} x_{1,8}$, $c_{1-8}$ as denoted in FIG. 19).

Executing module 110 may further determine the result of the outer product multiplication operation by generating second supplemental result matrix 1712. Executing module 110 may generate second supplemental result matrix 1712 by directing MMU 144 to execute a second supplemental MMO reusing filter matrix 204 as multiplier matrix 216 and using supplemental activation matrix 1704 as multiplicand matrix 218. As shown in view 2000 included in FIG. 20, at a conclusion of the second supplemental MMO, second supplemental result matrix 1712 may include results of dot product operations involving each filter vector included in filter matrix 204 and each activation vector included in supplemental activation matrix 1704 (e.g., $K_{1-8}$, $w_{1,1}$, $c_{1-8} \cdot x_{1,9} \text{-} x_{1,16}$, $c_{1-8}$ as denoted in FIG. 20).

Executing module 110 may further determine the result of the outer product multiplication operation by generating third supplemental result matrix 1714. Executing module 110 may generate third supplemental result matrix 1714 by directing MMU 144 to execute a third supplemental MMO reusing supplemental filter matrix 1702 as multiplier matrix 216 and reusing supplemental activation matrix 1704 as multiplicand matrix 218. As shown in view 2100 in FIG. 21, at a conclusion of the third supplemental MMO, third supplemental result matrix 1714 may include results of dot product operations involving each filter vector included in supplemental filter matrix 1702 and each activation vector included in supplemental activation matrix 1704 (e.g., $K_{1-8}$, $w_{1,1}$, $c_{1-8} \cdot x_{1,9} \text{-} x_{1,16}$, $c_{1-8}$ as denoted in FIG. 21).

Additionally, in some embodiments, one or more of modules 102 may perform one or more additional operations in order to realize additional reuse. For example, FIG. 22 includes a configuration 2200 that illustrates a possible configuration for multiplier registers 212, activation matrix 206, and output activation registers 220 that may enable further reuse.

Figure 22:
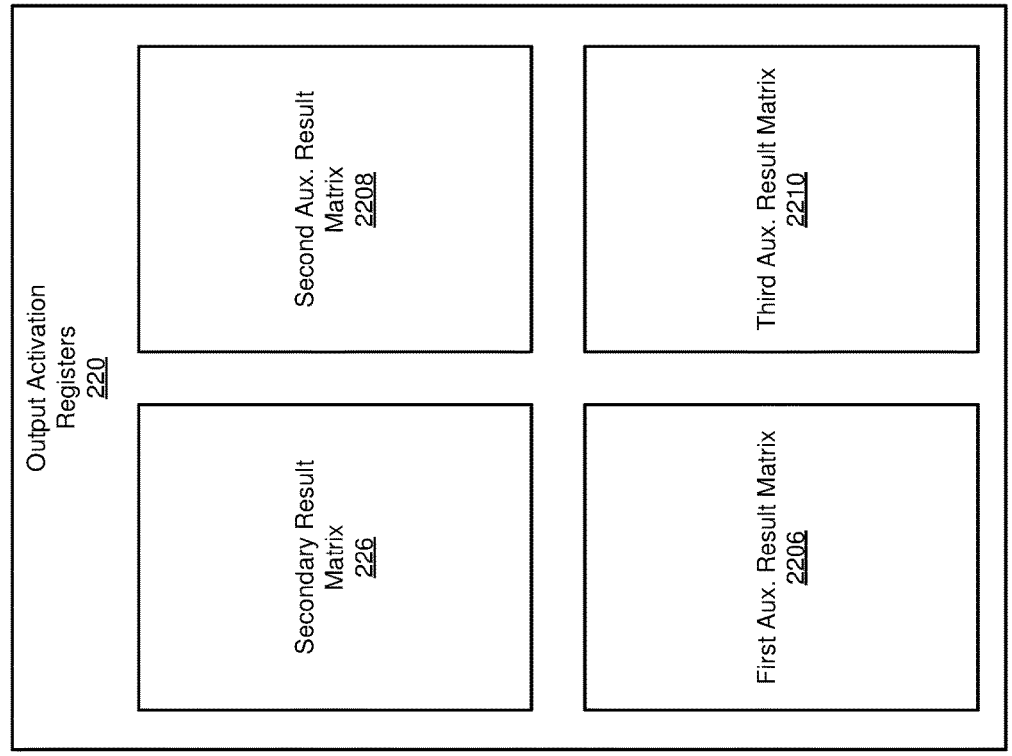
Figure 22:
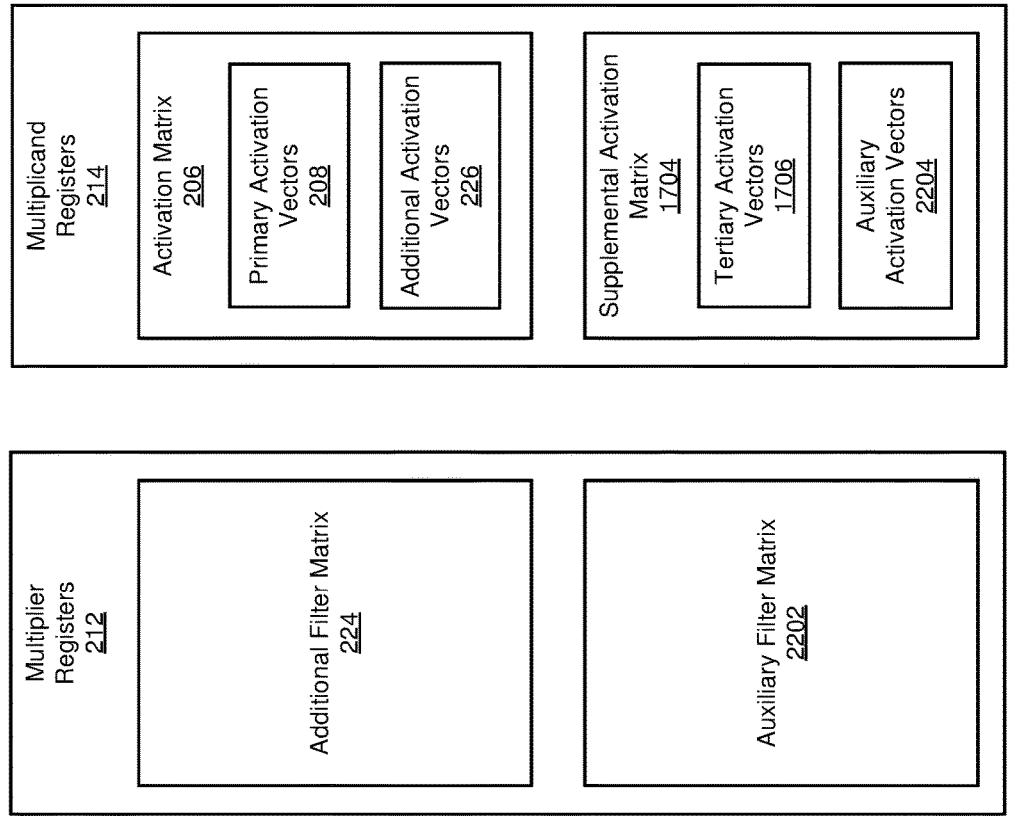

As shown in FIG. 22, subsequent to replacing module 108 replacing filter matrix 204 with additional filter matrix 224 and replacing module 108 replacing secondary activation vectors 210 with additional activation vectors 226, replacing module 108 may fetch, from data store 150 to LMD 142 (e.g., multiplier registers 212), an auxiliary filter matrix 2202 that may include an auxiliary set of filter vectors corresponding to the additional filter location included in each filter included in the set of filters. In other words, the auxiliary set of filter vectors included in auxiliary filter matrix 2202 may include weight values associated with the same filter location as the filter vectors included in additional filter matrix 224, but different filters.

Figure 23:
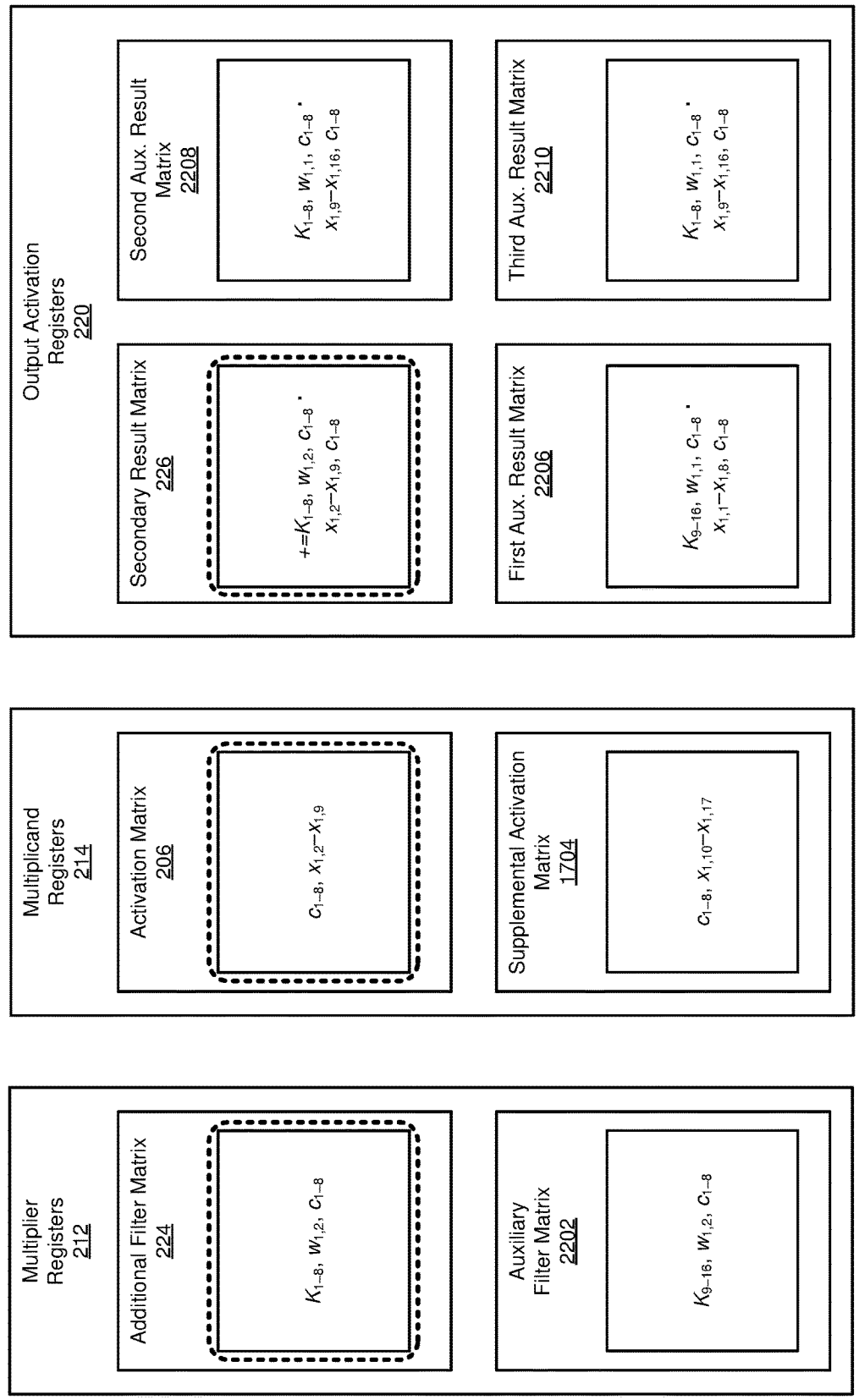

By way of illustration, FIG. 23 includes a view 2300 that includes additional filter matrix 224 and auxiliary filter matrix 2202. As shown, when filter vectors included in additional filter matrix 224 may correspond to a filter location of $w_{1,2}$ within filters $K_1$ to $K_8$, then filter vectors included in auxiliary filter matrix 2202 may correspond to the filter location of $w_{1,2}$ within filters $K_9$ to $K_{16}$.

Additionally, one or more of modules 102 (e.g., replacing module 108, executing module 110, etc.) may, subsequent to replacing module 108 replacing filter matrix 204 with additional filter matrix 224 and replacing secondary activation vectors 210 with additional activation vectors 226, replace the quaternary set of activation vectors (e.g., quaternary activation vectors 1708) with an auxiliary set of activation vectors (e.g., auxiliary activation vectors 2204) included in the activation volume.

To illustrate, as further shown in FIG. 23, when activation vectors included in activation matrix 206 may correspond to locations $x_{1,2}$ to $x_{1,9}$ in activation volume 154 (e.g., subsequent to replacing module 108 replacing secondary activation vectors 210 with additional activation vectors 226), auxiliary activation vectors 2204 may correspond to locations $x_{1,10}$ to $x_{1,17}$. This may be a result of one or more of modules 102 (e.g., replacing module 108, executing module 110, etc.) replacing an activation vector included in quaternary activation vectors 1708 that may correspond to a location within activation volume 154 of $x_{1,9}$ with auxiliary activation vectors 2204 that may correspond to a location within activation volume 154 of $x_{1,17}$.

In some embodiments, one or more of modules 102 (e.g., directing module 106, executing module 110, etc.) may further determine a set of output activation values for a convolutional layer of an artificial neural network (e.g., output activations 230) by determining, via MMU 144, a result of an additional outer product multiplication operation. In some examples, the result of the additional outer product multiplication operation may be based on additional filter matrix 224, auxiliary filter matrix 2202, activation matrix 206 (e.g., with secondary activation vectors 210 replaced with additional activation vectors 226), and supplemental activation matrix 1704 (e.g., with quaternary activation vectors 1708 replaced with auxiliary activation vectors 2204).

Furthermore, one or more of modules 102 (e.g., directing module 106, executing module 110, etc.) may further determine the set of output activation values for a convolutional layer of an artificial neural network (e.g., output activations 230) by accumulating a result of the outer product multiplication operation and the result of the additional outer product multiplication operation. Executing module 110 may accumulate the result of the outer product multiplication operation and the result of the additional outer product multiplication operation in any of the ways described herein, as may be described in greater detail below.

As further illustrated in FIG. 23, one or more of modules 102 (e.g., directing module 106, executing module 110, etc.) may further determine the result of the additional outer product multiplication operation by generating secondary result matrix 228 in any of the ways describe herein. For example, executing module 110 may direct MMU 144 to execute an MMO using additional filter matrix 224 as multiplier matrix 216 and activation matrix 206 as multiplicand matrix 218. At the conclusion of the MMO, secondary result matrix 228 may include results of dot product operations involving each filter vector included in additional filter matrix 224 and each activation vector included in activation matrix 206.

As further shown in FIG. 23, one or more of modules 102 (e.g., directing module 106, executing module 110, etc.) may further determine the result of the additional outer product multiplication operation by accumulating the result of the outer product multiplication operation and the result of the additional outer product multiplication operation. FIG. 23 shows that, in some examples, one or more of modules 102 (e.g., directing module 106, executing module 110, etc.) may accumulate secondary result matrix 228 and primary result matrix 222 in-place within a set of registers included in output activation registers 220, as denoted by the "+=" operator included in secondary result matrix 228. Hence, at the conclusion of the MMO using additional filter matrix 224 as multiplier matrix 216 and activation matrix 206 as multiplicand matrix 218, output activation registers 220 corresponding to secondary result matrix 228 may include an accumulation of secondary result matrix 228 and primary result matrix 222.

Figure 24:
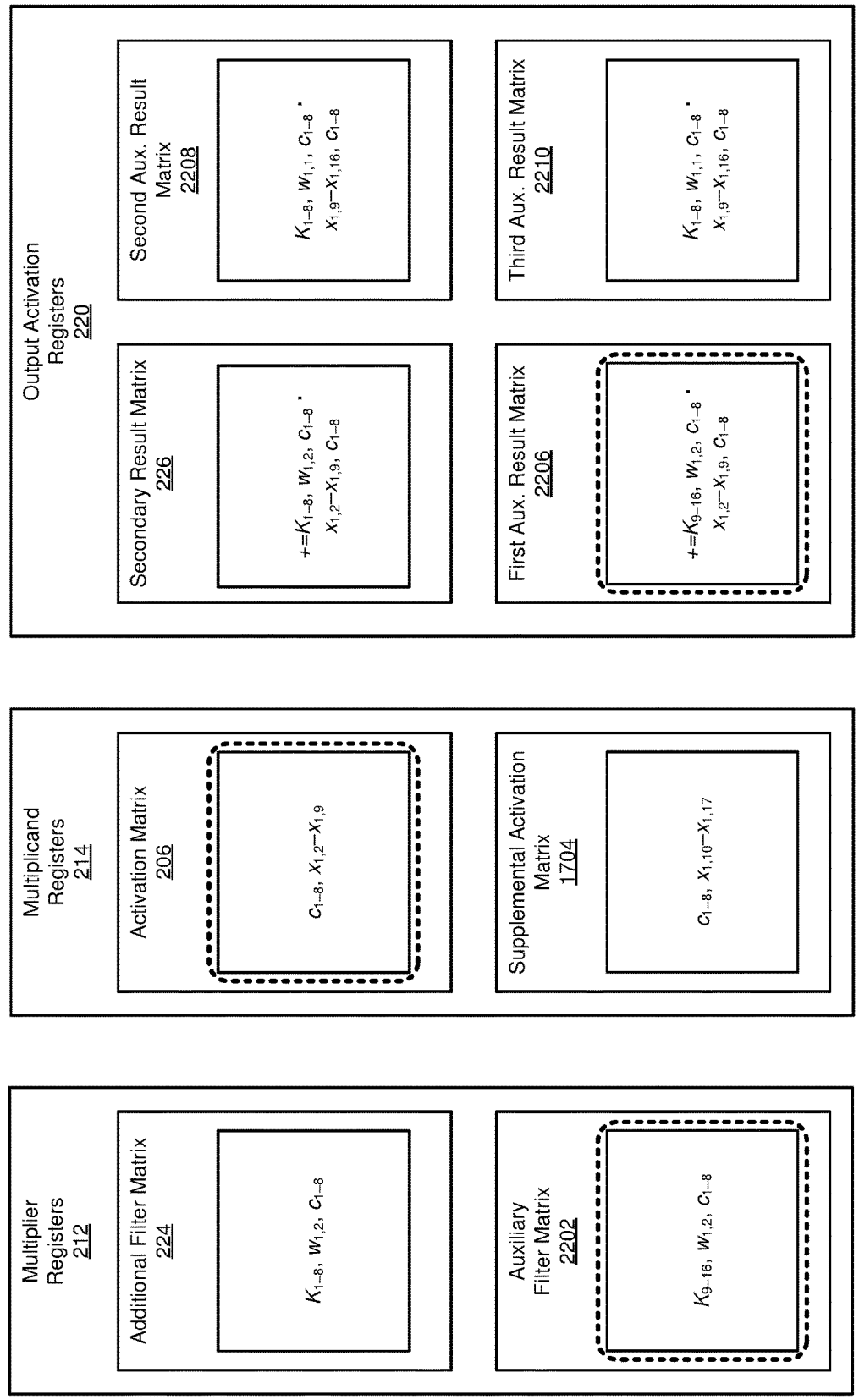

Continuing to view 2400 included in FIG. 24, one or more of modules 102 (e.g., directing module 106, executing module 110, etc.) may further determine the result of the additional outer product multiplication operation by generating first auxiliary result matrix 2206. For example, executing module 110 may generate first auxiliary result matrix 2206 by directing MMU 144 to execute a first auxiliary MMO using auxiliary filter matrix 2202 as multiplier matrix 216 and reusing activation matrix 206 as multiplicand matrix 218. At the conclusion of the first auxiliary MMO, first auxiliary result matrix 2206 may include results of dot product operations involving each filter vector included in auxiliary filter matrix 2202 and each activation vector included in activation matrix 206 (e.g., $K_{9-16}$, $w_{1,2}$, $c_{1-8} \cdot x_{1,2} \text{-} x_{1,9}$, $c_{1-8}$).

Executing module 110 may further accumulate first auxiliary result matrix 2206 and first supplemental result matrix 1710 in-place within a set of registers included in output activation registers 220. This may be denoted by the "+=" operator included in first auxiliary result matrix 2206 in FIG. 24. Hence, at the conclusion of the first auxiliary MMO, output activation registers 220 corresponding to first auxiliary result matrix 2206 may include an accumulation of first auxiliary result matrix 2206 and first supplemental result matrix 1710.

Figure 25:
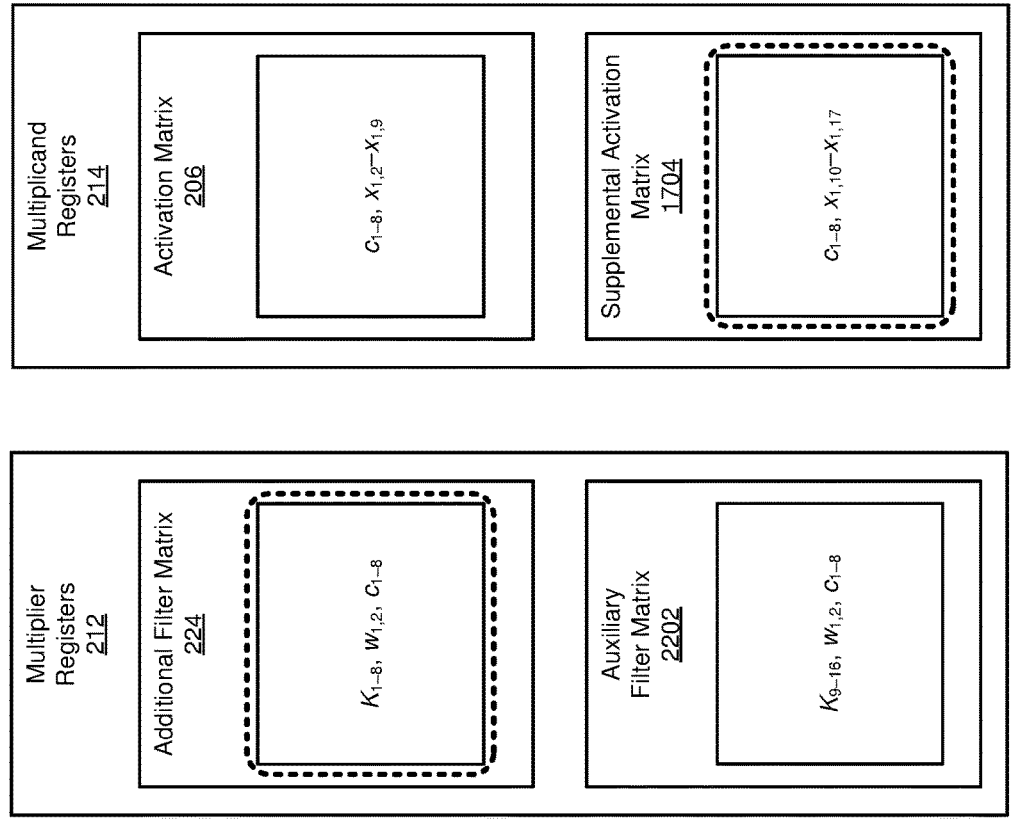

Continuing to view 2500 in FIG. 25, one or more of modules 102 (e.g., determining module 106, executing module 110, etc.) may further determine the result of the additional outer product multiplication operation by generating second auxiliary result matrix 2208. For example, executing module 110 may generate second auxiliary result matrix 2208 by directing MMU 144 to execute a second auxiliary MMO reusing additional filter matrix 224 as multiplier matrix 216 and using supplemental activation matrix 1704 as multiplicand matrix 218. At the conclusion of the second auxiliary MMO, second auxiliary result matrix 2208 may include results of dot product operations involving each filter vector included in additional filter matrix 224 and each activation vector included in supplemental activation matrix 1704 (e.g., $K_{1-8}$, $w_{1,2}$, $c_{1-8} \cdot x_{1,10} \text{-} x_{1,17}$, $c_{1-8}$).

Executing module 110 may further accumulate second auxiliary result matrix 2208 and second supplemental result matrix 1712 in-place within a set of registers included in output activation registers 220. This may be denoted by the "+=" operator included in second auxiliary result matrix 2208 in FIG. 25. Hence, at the conclusion of the second auxiliary MMO, output activation registers 220 corresponding to second auxiliary result matrix 2208 may include an accumulation of second auxiliary result matrix 2208 and second supplemental result matrix 1712.

Figure 26:
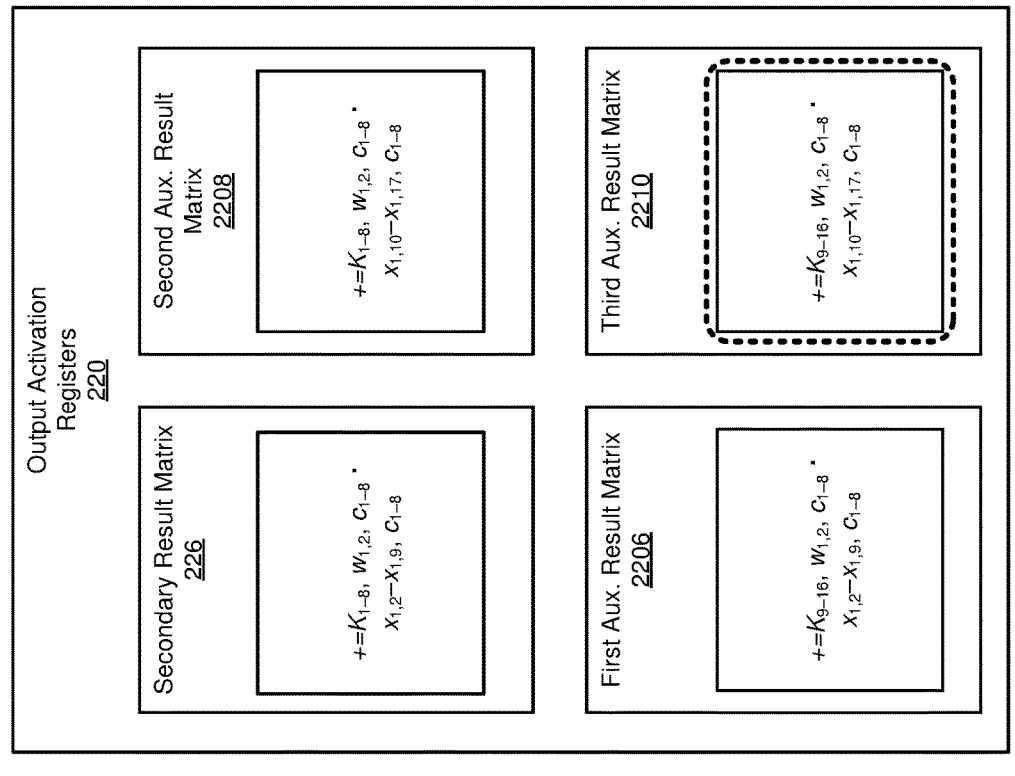
Figure 26:
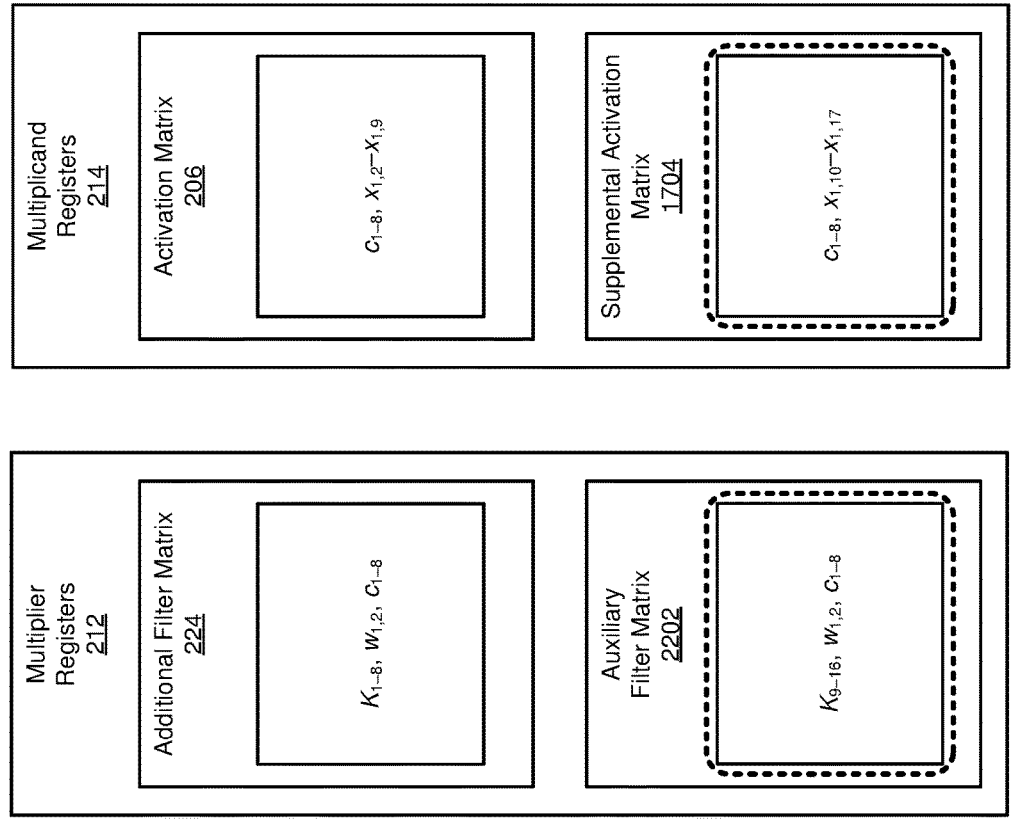

Continuing to view 2600 in FIG. 26, one or more of modules 102 (e.g., directing module 106, executing module 110, etc.) may further determine the result of the additional outer product multiplication operation by generating third auxiliary result matrix 2210. For example, executing module 110 may generate third auxiliary result matrix 2210 by directing MMU 144 to execute a third auxiliary MMO reusing auxiliary filter matrix 2202 as multiplier matrix 216 and reusing supplemental activation matrix 1704 as multiplicand matrix 218. At the conclusion of the third auxiliary MMO, third auxiliary result matrix 2210 may include results of dot product operations involving each filter vector included in auxiliary filter matrix 2202 and each activation vector included in supplemental activation matrix 1704 (e.g., $K_{9-16}$, $w_{1,2}$, $c_{1-8} \cdot x_{1,10} \text{-} x_{1,17}$, $c_{1-8}$).

Executing module 110 may further accumulate third auxiliary result matrix 2210 and third supplemental result matrix 1714 in-place within a set of registers included in output activation registers 220. This may be denoted by the "+=" operator included in third auxiliary result matrix 2210 in FIG. 26. Hence, at the conclusion of the third auxiliary MMO, output activation registers 220 corresponding to third auxiliary result matrix 2210 may include an accumulation of third auxiliary result matrix 2210 and third supplemental result matrix 1714.

By executing MMOs using filter matrices and activation matrices in accordance with outer product multiplication operations as described herein, the systems and methods described herein may realize additional reuse of activation values and/or filter weight values that have been retrieved from slow, power inefficient memory and/or data storage media into fast, power-efficient memory local to an MMO (e.g., LMD 142). By reusing these values and/or retrieving and/or fetching few new values per operation into LMD 142, the systems and methods described herein may realize significant electrical power savings over traditional systems and methods for performing convolution operations for ANNs.

As discussed throughout the instant disclosure, the systems and methods described herein may provide one or more advantages over traditional options for performing convolution operations for ANNs. For example, traditional and/or conventional systems for performing convolution operations may convert convolutional layers to matrix multiplication blocks by rearranging discrete image blocks to columns, such as via an im2col operation. This may require element-wise steering, necessitating elaborate muxing mechanisms that may consume power and complicate designs of such systems.

Additionally, rearranging image blocks via an im2col operation may result in large matrix sizes, leading to large data transfers between system components (e.g., between a CPU and a GPU, between the CPU and a memory device, between a memory device and a data store, etc.). Such large data transfers may further increase power consumption of such systems. Furthermore, such systems may fail to take advantage of spatial reuse that may be available for convolution operations.

By leveraging spatial reuse that exists in convolution operations, the systems and methods described herein may reduce a number of accesses or reads from power-inefficient data storage devices that may be remote from a hardware accelerator. Also, by maximizing reuse of activation values already retrieved from power-inefficient data storage devices, the systems and methods described herein may favor power efficient memory operations and/or memory devices that may be local to an MMU.

Additionally, the systems and methods described herein may translate strides of convolution operations into simple line reads that may be much less expensive in terms of hardware complexity and/or electrical power requirements that the complicated hardware and/or software muxing schemes of traditional convolution operation systems.

Furthermore, the systems and methods described herein may efficiently perform convolutions involving multiple filters in parallel via the hardware accelerator rather than in sequence and/or in parallel via multiple processors, which may result in more efficient (e.g., in terms of power consumption, execution time, processor usage, memory usage, etc.) computation of convolutions of multiple filters than conventional systems and methods for performing convolution operations involving multiple filters. Hence, the systems and methods described herein may vastly reduce power requirements for performing convolution operations for ANNs.

EXAMPLE EMBODIMENTS

Example 1: A computer-implemented method comprising maintaining, within an LMD included in a hardware accelerator, a filter matrix and an activation matrix. The filter matrix may comprise a set of filter vectors corresponding to a filter location included in each of a set of filters of a convolutional layer of an ANN, and the activation matrix may comprise a primary set of activation vectors and a secondary set of activation vectors, each activation vector included in an activation volume inputted into the convolutional layer. The computer-implemented method may also comprise (1) directing an MMU included in the hardware accelerator to execute a MMO using the filter matrix and the activation matrix, (2) replacing (a) the filter matrix with an additional filter matrix corresponding to an additional filter location, and (b) the secondary set of activation vectors with an additional set of activation vectors included in the activation volume, and (3) directing the MMU to execute an additional MMO using the additional filter matrix and the activation matrix.

Example 2: The computer-implemented method of example 1, wherein (1) the LMD comprises (a) a set of multiplier registers associated with the MMU and (b) a set of multiplicand registers associated with the MMU, (2) maintaining the filter matrix within the LMD comprises retrieving, from a data store, the filter matrix to the set of multiplier registers, (3) maintaining the activation matrix within the LMD comprises retrieving, from the data store, the activation matrix to the set of multiplicand registers, (4) directing the MMU to execute the MMO using the filter matrix and the activation matrix comprises directing the MMU to execute the MMO using the filter matrix as a multiplier matrix and the activation matrix as a multiplicand matrix, and (5) directing the MMU to execute the additional MMO using the additional filter matrix and the activation matrix comprises directing the MMU to execute the additional MMO using the additional filter matrix as the multiplier matrix and the activation matrix as the multiplicand matrix.

Example 3: The computer-implemented method of example 1, wherein (1) the multiplier matrix comprises (a) a multiplier matrix height dimension (m), and (b) a multiplier matrix width dimension (k), and (2) the multiplicand matrix comprises (a) a multiplicand matrix height dimension comprising the multiplier matrix width dimension (k), and (b) a multiplicand matrix width dimension (n).

Example 4: The computer-implemented method of example 3, wherein (1) the set of filter vectors comprises at most the multiplier matrix height dimension (m) of filter vectors, and (2) each filter vector included in the set of filter vectors comprises a predetermined number of filter weight values, wherein (a) the predetermined number of filter weight values is at most the multiplier matrix width dimension (k), and (b) each filter weight value included in the filter vector corresponds to a different channel included in a set of channels associated with each of the set of filters.

Example 5: The computer-implemented method of any of examples 3 and 4, wherein (1) a total number of activation vectors included in the primary set of activation vectors and the secondary set of activation vectors is at most the multiplicand matrix width dimension (n), (2) each activation vector included in the primary set of activation vectors comprises a predetermined number of activation channel values that is at most the multiplicand matrix height dimension (k), and (3) each activation vector included in the secondary set of activation vectors comprises at most the predetermined number of activation channel values (k).

Example 6: The computer-implemented method of any of examples 1-5, wherein (1) the hardware accelerator further comprises a set of output activation registers associated with the MMU, and (2) directing the MMU to execute the MMO using the filter matrix and the activation matrix further comprises (a) generating a primary result matrix by directing the MMU to execute the MMO using the filter matrix as a multiplier matrix and the activation matrix as a multiplicand matrix, and (b) storing the primary result matrix within the set of output activation registers.

Example 7: The computer-implemented method of example 6, wherein (1) directing the MMU to execute the additional MMO using the additional filter matrix and the activation matrix further comprises (a) producing a secondary result matrix by directing the MMU to execute the additional MMO using the additional filter matrix as the multiplier matrix and the activation matrix as the multiplicand matrix, such that the MMU reuses the primary set of activation vectors during the additional MMO, (b) accumulating the secondary result matrix and the primary result matrix, and (c) storing a result of accumulating the secondary result matrix and the primary result matrix within the set of output activation registers, and (2) the computer-implemented method further comprises determining, based on the result of accumulating the secondary result matrix and the primary result matrix, a set of output activation values for the convolutional layer of the ANN.

Example 8: The computer-implemented method of example 7, wherein (1) the computer-implemented method further comprises retrieving, from a data store into the LMD, (a) a supplemental filter matrix comprising a supplemental set of filter vectors corresponding to the filter location included in the set of filters associated with the convolutional layer of the ANN, and (b) a supplemental activation matrix comprising (i) a tertiary set of activation vectors included in the activation volume, and (ii) a quaternary set of activation vectors included in the activation volume, and (2) determining the set of output activation values for the convolutional layer of the ANN further comprises determining, via the MMU, a result of an outer product multiplication operation based on the filter matrix, the supplemental filter matrix, the activation matrix, and the supplemental activation matrix.

Example 9: The computer-implemented method of example 8, wherein determining, via the MMU, the result of the outer product multiplication operation based on the filter matrix, the supplemental filter matrix, the activation matrix, and the supplemental activation matrix comprises generating (1) the primary result matrix by directing the MMU to execute the MMO, using the filter matrix as the multiplier matrix and using the activation matrix as the multiplicand matrix, (2) a first supplemental result matrix by directing the MMU to execute a first supplemental MMO, using the supplemental filter matrix as the multiplier matrix and reusing the activation matrix as the multiplicand matrix, (3) a second supplemental result matrix by directing the MMU to execute a second supplemental MMO, reusing the filter matrix as the multiplier matrix and using the supplemental activation matrix as the multiplicand matrix, and (4) a third supplemental result matrix by directing the MMU to execute a third supplemental MMO, reusing the supplemental filter matrix as the multiplier matrix and reusing the supplemental activation matrix as the multiplicand matrix.

Example 10: The computer-implemented method of example 9, wherein (1) the computer-implemented method further comprises, subsequent to replacing the filter matrix with the additional filter matrix and replacing the secondary set of activation vectors with the additional set of activation vectors, (a) fetching, from the data store to the LMD, an auxiliary filter matrix comprising an auxiliary set of filter vectors corresponding to the additional filter location included in each filter included in the set of filters, and (b) replacing, within the LMD, the quaternary set of activation vectors with an auxiliary set of activation vectors included in the activation volume, and (2) determining the set of output activation values for the convolutional layer of the ANN further comprises (a) determining, via the MMU, a result of an additional outer product multiplication operation based on the additional filter matrix, the auxiliary filter matrix, the activation matrix, and the supplemental activation matrix, and (b) accumulating the result of the outer product multiplication operation and the result of the additional outer product multiplication operation.

Example 11: The computer-implemented method of example 10, wherein determining, via the MMU, the result of the additional outer product multiplication operation based on the additional filter matrix, the auxiliary filter matrix, the activation matrix, and the supplemental activation matrix comprises generating (1) the secondary result matrix by directing the MMU to execute the MMO using the additional filter matrix as the multiplier matrix and the activation matrix as the multiplicand matrix, (2) a first auxiliary result matrix by directing the MMU to execute a first auxiliary MMO using the auxiliary filter matrix as the multiplier matrix and reusing the activation matrix as the multiplicand matrix, (3) a second auxiliary result matrix by directing the MMU to execute a second auxiliary MMO, reusing the additional filter matrix as the multiplier matrix and using the supplemental activation matrix as the multiplicand matrix, and (4) a third auxiliary result matrix by directing the MMU to execute a third auxiliary MMO using the auxiliary filter matrix as the multiplier matrix and using the supplemental activation matrix as the multiplicand matrix.

Example 12: The computer-implemented method of example 11, wherein accumulating the result of the outer product multiplication operation and the result of the additional outer product multiplication operation comprises accumulating (1) the secondary result matrix and the primary result matrix, (2) the first auxiliary result matrix and the first supplemental result matrix, (3) the second auxiliary result matrix and the second supplemental result matrix, and (4) the third auxiliary result matrix and the third supplemental result matrix.

Example 13: The computer-implemented method of any of examples 1-12, wherein the MMO and the additional MMO each comprise a generalized matrix multiplication (GEMM) operation.

Example 14: The computer-implemented method of any of examples 1-12, further comprising updating, in response to replacing the secondary set of activation vectors with the additional set of activation vectors, a read offset associated with the secondary set of activation vectors to indicate an activation vector included in the primary set of activation vectors.

Example 15: The computer-implemented method of example 1-12, further comprising selecting the primary set of activation vectors, the secondary set of activation vectors, the additional filter matrix, and the additional set of activation vectors based on a predetermined stride length associated with the convolutional layer of the ANN.

Example 16: A system comprising (1) a hardware accelerator comprising: (a) an MMU, and (b) an LMD, (2) a maintaining module, stored in memory, that maintains, within the LMD: (a) a filter matrix comprising a set of filter vectors corresponding to a filter location included in each of a set of filters of a convolutional layer of an ANN, and (b) an activation matrix comprising: (i) a primary and a secondary set of activation vectors, each activation vector included in an activation volume inputted into the convolutional layer, (ii) a directing module, stored in memory, that directs the MMU to execute an MMO using the filter matrix and the activation matrix, (3) a replacing module, stored in memory, that replaces: (a) the filter matrix with an additional filter matrix corresponding to an additional filter location, and (b) the secondary set of activation vectors with an additional set of activation vectors included in the activation volume, (4) an executing module, stored in memory, that directs the MMU to execute an additional MMO using the additional filter matrix and the activation matrix, and (5) a physical processor that executes the maintaining module, the directing module, and the replacing module.

Example 17: The system of example 16, wherein (1) the hardware accelerator further comprises a set of output activation registers associated with the MMU, (2) the directing module directs the MMU to execute the MMO using the filter matrix and the activation matrix by (a) generating a primary result matrix by directing the MMU to execute the MMO using the filter matrix as a multiplier matrix and the activation matrix as a multiplicand matrix, and (b) storing the primary result matrix within the set of output activation registers, (3) the executing module directs the MMU to execute the additional MMO using the additional filter matrix and the activation matrix by (a) producing a secondary result matrix by directing the MMU to execute the additional MMO using the additional filter matrix as the multiplier matrix and the activation matrix as the multiplicand matrix, such that the MMU reuses the primary set of activation vectors during the additional MMO, (b) accumulating the secondary result matrix and the primary result matrix, and (c) storing a result of accumulating the secondary result matrix and the primary result matrix within the set of output activation registers, and (4) the executing module further determines, based on the result of accumulating the secondary result matrix and the primary result matrix, a set of output activation values for the convolutional layer of the ANN.

Example 18: The system of example 17, wherein (1) the maintaining module further retrieves, from a data store into the LMD, (a) a supplemental filter matrix comprising a supplemental set of filter vectors corresponding to the filter location included in the set of filters associated with the convolutional layer of the ANN, and (b) a supplemental activation matrix comprising: (i) a tertiary set of activation vectors included in the activation volume, and (ii) a quaternary set of activation vectors included in the activation volume, and (2) the executing module further determines the set of output activation values for the convolutional layer of the ANN by determining, via the MMU, a result of an outer product multiplication operation based on the filter matrix, the supplemental filter matrix, the activation matrix, and the supplemental activation matrix.

Example 19: The system of example 18, wherein, subsequent to the replacing module replacing the filter matrix with the additional filter matrix and the secondary set of activation vectors with the additional set of activation vectors, (1) the replacing module further fetches, from the data store to the LMD, an auxiliary filter matrix comprising an auxiliary set of filter vectors corresponding to the additional filter location included in each filter included in the set of filters, (2) the replacing module further replaces, within the local memory device, the quaternary set of activation vectors with an auxiliary set of activation vectors included in the activation volume, and (3) the executing module further determines the set of output activation values for the convolutional layer of the ANN by: (a) determining, via the MMU, a result of an additional outer product multiplication operation based on the additional filter matrix, the auxiliary filter matrix, the activation matrix, and the supplemental activation matrix, and (b) accumulating the result of the outer product multiplication operation and the result of the additional outer product multiplication operation.

Example 20: A non-transitory, computer-readable medium comprising computer-readable instructions that, when executed by at least one processor of a computing device, cause the computing device to (1) maintain, within a local memory device (LMD) included in a hardware accelerator: (a) a filter matrix comprising a set of filter vectors corresponding to a filter location included in each of a set of filters of a convolutional layer of an ANN, and (b) an activation matrix comprising a primary and a secondary set of activation vectors, each activation vector included in an activation volume inputted into the convolutional layer, (2) direct an MMU included in the hardware accelerator to execute an MMO using the filter matrix and the activation matrix, (3) replace: (a) the filter matrix with an additional filter matrix corresponding to an additional filter location, (b) the secondary set of activation vectors with an additional set of activation vectors included in the activation volume, and (4) direct the MMU to execute an additional MMO using the additional filter matrix and the activation matrix.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive filter data and/or activation (e.g., image) data to be transformed, transform the filter data and/or activation data, output a result of the transformation to perform a convolution operation for a convolutional layer of an ANN, use the result of the transformation to provide input to one or more additional layers of the ANN, and store the result of the transformation to make predictions regarding additional inputs to the ANN. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    retrieving, via a remote data bus, from a data store remote from a hardware accelerator to a local memory device (LMD) included in the hardware accelerator:
        a filter matrix comprising a set of filter vectors corresponding to a filter location included in each of a set of filters of a convolutional layer of an artificial neural network (ANN); and
        an activation matrix comprising a primary and a secondary set of activation vectors, each activation vector included in an activation volume inputted into the convolutional layer;
    directing a hardware matrix multiplication unit (MMU) included in the hardware accelerator and communicatively coupled to the LMD via a local data bus, to execute a matrix multiplication operation (MMO) using the filter matrix and the activation matrix;
    replacing:
        the filter matrix with an additional filter matrix corresponding to an additional filter location; and
        the secondary set of activation vectors with an additional set of activation vectors included in the activation volume; and
    directing the MMU to execute an additional MMO using the additional filter matrix and the activation matrix.

2. The computer-implemented method of claim 1, wherein:
    the LMD comprises:
        a set of multiplier registers associated with the MMU; and
        a set of multiplicand registers associated with the MMU;
    retrieving the filter matrix comprises retrieving the filter matrix from the data store to the set of multiplier registers;
    retrieving the activation matrix comprises retrieving the activation matrix from the data store to the set of multiplicand registers;
    directing the MMU to execute the MMO using the filter matrix and the activation matrix comprises directing the MMU to execute the MMO using the filter matrix as a multiplier matrix and the activation matrix as a multiplicand matrix; and
    directing the MMU to execute the additional MMO using the additional filter matrix and the activation matrix comprises directing the MMU to execute the additional MMO using the additional filter matrix as the multiplier matrix and the activation matrix as the multiplicand matrix.

3. The computer-implemented method of claim 2, wherein:
    the multiplier matrix comprises:
        a multiplier matrix height dimension; and
        a multiplier matrix width dimension; and
    the multiplicand matrix comprises:
        a multiplicand matrix height dimension comprising the multiplier matrix width dimension; and
        a multiplicand matrix width dimension.

4. The computer-implemented method of claim 3, wherein:
    the set of filter vectors comprises at most the multiplier matrix height dimension of filter vectors; and
    each filter vector included in the set of filter vectors comprises a predetermined number of filter weight values, wherein:
        the predetermined number of filter weight values is at most the multiplier matrix width dimension; and
        each filter weight value included in the filter vector corresponds to a different channel included in a set of channels associated with each of the set of filters.

5. The computer-implemented method of claim 3, wherein:
    a total number of activation vectors included in the primary set of activation vectors and the secondary set of activation vectors is at most the multiplicand matrix width dimension;
    each activation vector included in the primary set of activation vectors comprises a predetermined number of activation channel values that is at most the multiplicand matrix height dimension; and
    each activation vector included in the secondary set of activation vectors comprises at most the predetermined number of activation channel values.

6. The computer-implemented method of claim 1, wherein:
    the hardware accelerator further comprises a set of output activation registers associated with the MMU; and
    directing the MMU to execute the MMO using the filter matrix and the activation matrix further comprises:
        generating a primary result matrix by directing the MMU to execute the MMO using the filter matrix as a multiplier matrix and the activation matrix as a multiplicand matrix; and
        storing the primary result matrix within the set of output activation registers.

7. The computer-implemented method of claim 6, wherein:
    directing the MMU to execute the additional MMO using the additional filter matrix and the activation matrix further comprises:
        producing a secondary result matrix by directing the MMU to execute the additional MMO using the additional filter matrix as the multiplier matrix and the activation matrix as the multiplicand matrix, such that the MMU reuses the primary set of activation vectors during the additional MMO;
        accumulating the secondary result matrix and the primary result matrix; and
        storing a result of accumulating the secondary result matrix and the primary result matrix within the set of output activation registers; and
    the computer-implemented method further comprises determining, based on the result of accumulating the secondary result matrix and the primary result matrix, a set of output activation values for the convolutional layer of the ANN.

8. The computer-implemented method of claim 7, wherein:
    the computer-implemented method further comprises retrieving, from the data store into the LMD:
        a supplemental filter matrix comprising a supplemental set of filter vectors corresponding to the filter location included in the set of filters associated with the convolutional layer of the ANN; and a supplemental activation matrix comprising:
- a tertiary set of activation vectors included in the activation volume; and
- a quaternary set of activation vectors included in the activation volume; and determining the set of output activation values for the convolutional layer of the ANN further comprises determining, via the MMU, a result of an outer product multiplication operation based on the filter matrix, the supplemental filter matrix, the activation matrix, and the supplemental activation matrix.

9. The computer-implemented method of claim 8, wherein determining, via the MMU, the result of the outer product multiplication operation based on the filter matrix, the supplemental filter matrix, the activation matrix, and the supplemental activation matrix comprises generating:
- the primary result matrix by directing the MMU to execute the MMO, using the filter matrix as the multiplier matrix and using the activation matrix as the multiplicand matrix;
- a first supplemental result matrix by directing the MMU to execute a first supplemental MMO, using the supplemental filter matrix as the multiplier matrix and reusing the activation matrix as the multiplicand matrix;
- a second supplemental result matrix by directing the MMU to execute a second supplemental MMO, reusing the filter matrix as the multiplier matrix and using the supplemental activation matrix as the multiplicand matrix; and
- a third supplemental result matrix by directing the MMU to execute a third supplemental MMO, reusing the supplemental filter matrix as the multiplier matrix and reusing the supplemental activation matrix as the multiplicand matrix.

10. The computer-implemented method of claim 9, wherein:
the computer-implemented method further comprises, subsequent to replacing the filter matrix with the additional filter matrix and replacing the secondary set of activation vectors with the additional set of activation vectors:
- fetching, from the data store to the LMD, an auxiliary filter matrix comprising an auxiliary set of filter vectors corresponding to the additional filter location included in each filter included in the set of filters; and
- replacing, within the LMD, the quaternary set of activation vectors with an auxiliary set of activation vectors included in the activation volume; and determining the set of output activation values for the convolutional layer of the ANN further comprises:
- determining, via the MMU, a result of an additional outer product multiplication operation based on the additional filter matrix, the auxiliary filter matrix, the activation matrix, and the supplemental activation matrix; and
- accumulating the result of the outer product multiplication operation and the result of the additional outer product multiplication operation.

11. The computer-implemented method of claim 10, wherein determining, via the MMU, the result of the additional outer product multiplication operation based on the additional filter matrix, the auxiliary filter matrix, the activation matrix, and the supplemental activation matrix comprises generating:
- the secondary result matrix by directing the MMU to execute the MMO using the additional filter matrix as the multiplier matrix and the activation matrix as the multiplicand matrix;
- a first auxiliary result matrix by directing the MMU to execute a first auxiliary MMO using the auxiliary filter matrix as the multiplier matrix and reusing the activation matrix as the multiplicand matrix;
- a second auxiliary result matrix by directing the MMU to execute a second auxiliary MMO, reusing the additional filter matrix as the multiplier matrix and using the supplemental activation matrix as the multiplicand matrix; and
- a third auxiliary result matrix by directing the MMU to execute a third auxiliary MMO using the auxiliary filter matrix as the multiplier matrix and using the supplemental activation matrix as the multiplicand matrix.

12. The computer-implemented method of claim 11, wherein accumulating the result of the outer product multiplication operation and the result of the additional outer product multiplication operation comprises accumulating:
- the secondary result matrix and the primary result matrix;
- the first auxiliary result matrix and the first supplemental result matrix;
- the second auxiliary result matrix and the second supplemental result matrix; and
- the third auxiliary result matrix and the third supplemental result matrix.

13. The computer-implemented method of claim 1, wherein the MMO and the additional MMO each comprise a generalized matrix multiplication (GEMM) operation.

14. The computer-implemented method of claim 1, further comprising updating, in response to replacing the secondary set of activation vectors with the additional set of activation vectors, a read offset associated with the secondary set of activation vectors to indicate an activation vector included in the primary set of activation vectors.

15. The computer-implemented method of claim 1, further comprising selecting the primary set of activation vectors, the secondary set of activation vectors, the additional filter matrix, and the additional set of activation vectors based on a predetermined stride length associated with the convolutional layer of the ANN.

16. A system comprising:
- a hardware accelerator comprising:
  - a hardware matrix multiplication unit (MMU); and
  - a local memory device (LMD) communicatively coupled to the MMU via a local data bus;
- a maintaining module, stored in memory, retrieves, via a remote data bus, from a data store remote from the hardware accelerator to the LMD:
  - a filter matrix comprising a set of filter vectors corresponding to a filter location included in each of a set of filters of a convolutional layer of an artificial neural network (ANN); and
  - an activation matrix comprising
    - a primary and a secondary set of activation vectors, each activation vector included in an activation volume inputted into the convolutional layer;
- a directing module, stored in memory, that directs the MMU to execute a matrix multiplication operation (MMO) using the filter matrix and the activation matrix;
- a replacing module, stored in memory, that replaces:
  - the filter matrix with an additional filter matrix corresponding to an additional filter location; and the secondary set of activation vectors with an additional set of activation vectors included in the activation volume;
an executing module, stored in memory, that directs the MMU to execute an additional MMO using the additional filter matrix and the activation matrix; and
a physical processor that executes the maintaining module, the directing module, the replacing module, and the executing module.

17. The system of claim 16, wherein:
the hardware accelerator further comprises a set of output activation registers associated with the MMU;
the directing module directs the MMU to execute the MMO using the filter matrix and the activation matrix by:
  generating a primary result matrix by directing the MMU to execute the MMO using the filter matrix as a multiplier matrix and the activation matrix as a multiplicand matrix; and
  storing the primary result matrix within the set of output activation registers;
the executing module directs the MMU to execute the additional MMO using the additional filter matrix and the activation matrix by:
  producing a secondary result matrix by directing the MMU to execute the additional MMO using the additional filter matrix as the multiplier matrix and the activation matrix as the multiplicand matrix, such that the MMU reuses the primary set of activation vectors during the additional MMO;
  accumulating the secondary result matrix and the primary result matrix; and
  storing a result of accumulating the secondary result matrix and the primary result matrix within the set of output activation registers; and
the executing module further determines, based on the result of accumulating the secondary result matrix and the primary result matrix, a set of output activation values for the convolutional layer of the ANN.

18. The system of claim 17, wherein:
the maintaining module further retrieves, from a data store into the LMD:
  a supplemental filter matrix comprising a supplemental set of filter vectors corresponding to the filter location included in the set of filters associated with the convolutional layer of the ANN; and
  a supplemental activation matrix comprising:
    a tertiary set of activation vectors included in the activation volume; and
    a quaternary set of activation vectors included in the activation volume; and
the executing module further determines the set of output activation values for the convolutional layer of the ANN by determining, via the MMU, a result of an outer product multiplication operation based on the filter matrix, the supplemental filter matrix, the activation matrix, and the supplemental activation matrix.

19. The system of claim 18, wherein, subsequent to the replacing module replacing the filter matrix with the additional filter matrix and the secondary set of activation vectors with the additional set of activation vectors:
the replacing module further fetches, from the data store to the LMD, an auxiliary filter matrix comprising an auxiliary set of filter vectors corresponding to the additional filter location included in each filter included in the set of filters;
the replacing module further replaces, within the local memory device, the quaternary set of activation vectors with an auxiliary set of activation vectors included in the activation volume; and
the executing module further determines the set of output activation values for the convolutional layer of the ANN by:
  determining, via the MMU, a result of an additional outer product multiplication operation based on the additional filter matrix, the auxiliary filter matrix, the activation matrix, and the supplemental activation matrix; and
  accumulating the result of the outer product multiplication operation and the result of the additional outer product multiplication operation.

20. A non-transitory, computer-readable medium comprising computer-readable instructions that, when executed by at least one processor of a computing device, cause the computing device to:
retrieve, via a remote data bus, from a data store remote from a hardware accelerator to a local memory device (LMD) included in a hardware accelerator:
  a filter matrix comprising a set of filter vectors corresponding to a filter location included in each of a set of filters of a convolutional layer of an artificial neural network; and an activation matrix comprising a primary and a secondary set of activation vectors, each activation vector included in an activation volume inputted into the convolutional layer;
direct a hardware matrix multiplication unit (MMU) included in the hardware accelerator and communicatively coupled to the LMD via a local data bus, to execute a matrix multiplication operation (MMO) using the filter matrix and the activation matrix;
replace:
  the filter matrix with an additional filter matrix corresponding to an additional filter location;
  the secondary set of activation vectors with an additional set of activation vectors included in the activation volume; and
direct the MMU to execute an additional MMO using the additional filter matrix and the activation matrix.

* * * * *